(12) United States Patent
Yang et al.

(10) Patent No.: US 7,547,347 B2
(45) Date of Patent: Jun. 16, 2009

(54) SYNTHESIS OF NANO-MATERIALS IN IONIC LIQUIDS

(75) Inventors: Hong Yang, Rochester, NY (US); Yong Wang, Rochester, NY (US)

(73) Assignee: University of Rochester, Rochester, NY (US)

( * ) Notice: Subject to any disclaimer, the term of this patent is extended or adjusted under 35 U.S.C. 154(b) by 316 days.

(21) Appl. No.: 11/433,360

(22) Filed: May 15, 2006

(65) Prior Publication Data

US 2008/0245186 A1 Oct. 9, 2008

Related U.S. Application Data

(60) Provisional application No. 60/680,505, filed on May 13, 2005.

(51) Int. Cl.
*B22F 9/24* (2006.01)
(52) U.S. Cl. ............................. 75/351; 75/365; 75/371; 977/896
(58) Field of Classification Search .................. None
See application file for complete search history.

(56) References Cited

U.S. PATENT DOCUMENTS

| | | | |
|---|---|---|---|
| 6,645,444 B2 * | 11/2003 | Goldstein | 423/1 |
| 7,078,276 B1 * | 7/2006 | Zurcher et al. | 438/151 |
| 2004/0147618 A1 * | 7/2004 | Lee et al. | 516/78 |
| 2004/0247503 A1 * | 12/2004 | Hyeon | 423/1 |
| 2006/0083694 A1 * | 4/2006 | Kodas et al. | 424/46 |
| 2006/0159603 A1 * | 7/2006 | Vanheusden et al. | 423/1 |
| 2006/0225534 A1 * | 10/2006 | Swihart et al. | 75/343 |

FOREIGN PATENT DOCUMENTS

WO WO-2004/073021 A2 * 8/2004

OTHER PUBLICATIONS

Ott, L.S. et al., "Nanoclusters in Ionic Liquids: Evidence for N-Heterocyclic Carbene Formation from Imidazolium-Based Ionic Liquids Detected by 2H NMR", J. Am. Chem. Soc., vol. 127, pp. 5758-5759, published on Web Apr. 5, 2005.*

* cited by examiner

*Primary Examiner*—George Wyszomierski
(74) *Attorney, Agent, or Firm*—Oliff & Berridge, Plc.

(57) ABSTRACT

A method of synthesizing nanoparticles includes: combining at least one stabilizing agent, at least one precursor and an ionic liquid to form a reaction mixture; heating the reaction mixture to a predetermined temperature to form the nanoparticles and cause the nanoparticles to self-separate from the reaction mixture; and collecting the nanoparticles from the reaction mixture. Ionic liquid from which the nanoparticles are separated may be reused.

6 Claims, 50 Drawing Sheets

SYNTHESIS OF NANO-MATERIALS IN IONIC LIQUIDS

CROSS-REFERENCE TO RELATED APPLICATION

This non-provisional application claims priority to U.S. Provisional Application No. 60/680,505, filed May 13, 2005, the disclosure of which is incorporated herein by reference in its entirety.

This invention was made with United States government support from the National Science Foundation under Agreements Nos. CTS-0417722 and DMR-0449849. The United States government may have certain rights in this invention.

BACKGROUND

Efforts have been made relating to the syntheses of nano-structured materials. In particular, efforts have been made to synthesize nanoparticles of various metals, metal oxides and semiconductors. Some syntheses have been successful, but have required large numbers of reaction stages and/or complex preparation conditions. For example, according to some synthetic techniques, size, shape and dispersity of nanoparticles are controlled by conducting decompositions of organic-metal precursors in high temperature solvents in the presence of high concentrations of surfactants.

For some systems, such as the Pt/Fe or Pt/Co alloy systems, however, obtaining crystalline phases is essential to preparation of nanoparticles. Unfortunately, to affect phase transfer in such systems, precursors must be heated to extremely high temperatures—temperatures that can not be sustained by organic solvents conventionally used in nanoparticle synthesis. Although it is feasible that phase conversion could be achieved by conducting a solid-state reaction, the aggregation of particles and the loss of capping layers that are by-products of such solid-state reactions greatly limit the potential applications of resulting particles.

Recently, research relating to ionic liquids has made it possible to use such ionic liquids in various applications. Compared with the conventional solvents, ionic liquids are nonvolatile, non-flammable and thermally stable. These features make ionic solvents desirable, for example, by improving safety during use and reducing environmental hazards relating to their disposal.

Ionic liquids can include a variety of cations and anions. With respect to nanoparticle synthesis, this variety potentially makes it possible to select a solvent in which a particular precursor has greater solubility in comparison to the solubility of that precursor in conventional solvents. As a result, greater tunability with respect to the final nanoparticle product can be achieved.

Some progress has been made in synthesizing nanoparticles using ionic liquids. However, this progress has been limited with respect to the types of nanoparticles that have be made and the ease with which the nanoparticles can be separated from other reaction products, thus limiting the practical applicability of the known approaches. Also, the cost of ionic liquids can be prohibitively high, so procedures for recycling ionic liquids after use could increase the practical applicability of those liquids.

SUMMARY

In various exemplary embodiments, a method of synthesizing nanoparticles includes combining at least one stabilizing agent, at least one precursor and an ionic liquid to form a reaction mixture; heating the reaction mixture to a predetermined temperature to form the nanoparticles and cause the nanoparticles to self-separate from the reaction mixture; and collecting the nanoparticles from the reaction mixture.

In various exemplary embodiments, a method of synthesizing nanoparticles includes: combining at least one stabilizing agent, at least one precursor and an ionic liquid to form a reaction mixture; heating the reaction mixture to a first predetermined temperature to form the nanoparticles; heating the reaction mixture to a second predetermined temperature to cause the nanoparticles separate from the ionic liquid; collecting the nanoparticles from the reaction mixture; and reusing the separated ionic liquid.

These and other optional features and possible advantages of various aspects of this invention are described in, or are apparent from, the following detailed description of exemplary embodiments of systems and methods that implement this invention.

BRIEF DESCRIPTION OF THE DRAWINGS

Various exemplary embodiments of the invention will be described in detail with reference to the following figures, wherein.

DETAILED DESCRIPTION OF EMBODIMENTS

Figure 1A:
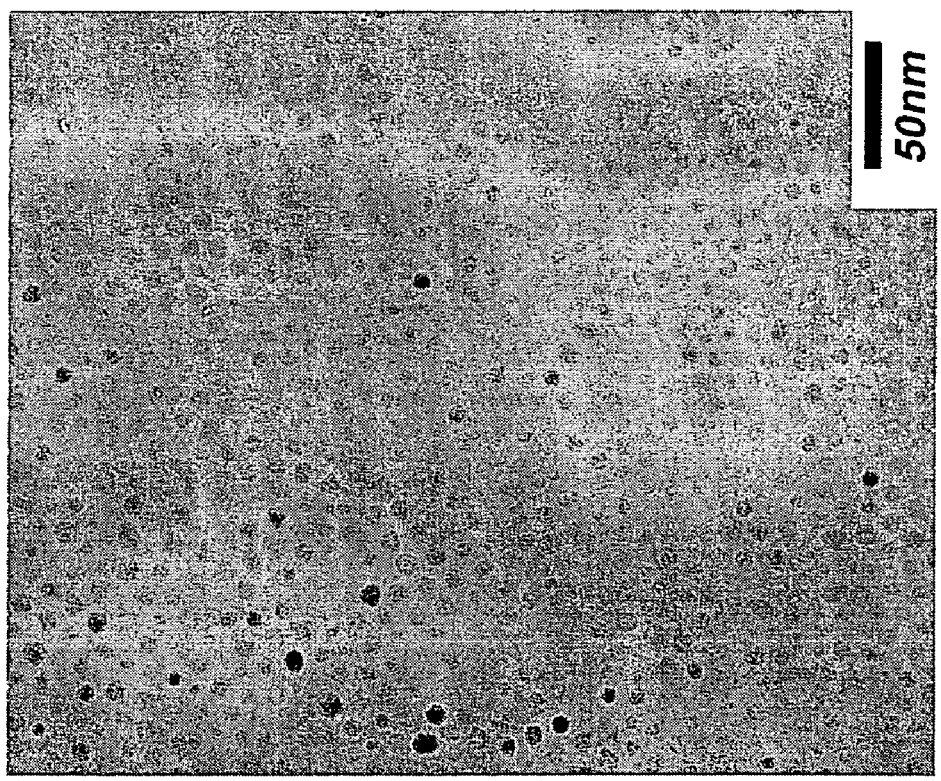
FIG. 1A is a TEM micrograph of exemplary nanoparticles according to this invention.

In various exemplary embodiments, methods for synthesizing nanoparticles may include combining a stabilizing agent, a precursor and an ionic liquid to form a reaction mixture, heating the reaction mixture to a predetermined temperature to form the nanoparticles that self-separate from the reaction mixture, and collecting the nanoparticles from the reaction mixture. In embodiments, such methods may be used to synthesize a variety of nanoparticles of different shapes and sizes. For example, nanoparticles synthesized by the methods described herein may include spherical nanoparticles, spheroid (substantially spherical) nanoparticles, nano-cubes, nano-rods and hyper-branched nano-rods. In embodiments, after heating the reaction mixture to a predetermined temperature, the reaction mixture may be further heated to a second predetermined temperature to form such shape-controlled nanoparticles and/or to induce self-separation of the nanoparticles from the reaction mixture.

In embodiments, the methods described herein may be used to synthesize nanoparticles formed of a number of different materials. For example, nanoparticles may be formed of metals, metal oxides, alloys, intermetallics, and semiconductors. Exemplary metals may include platinum, cobalt, gold, iron, nickel, copper, zinc, silver, rhodium, ruthenium, silicon and germanium. Exemplary metal oxides may include iron oxide, cobalt oxide, nickel oxide, tin oxide, indium oxide, titanium oxide, zinc oxide, cerium oxide, vanadium oxide, silicon oxide, tungsten oxide, yttrium oxide, molybdenum oxide, europium oxide and gadolinium oxide. Exemplary alloys include platinum alloys given by the formula PtM, where M may be one or more metals selected from the group of iron, copper, nickel, gold, silver, rhodium, palladium, ruthenium, cobalt, bismuth, lead, ruthenium and iridium. Further exemplary alloys include ternary and quaternary metal alloy materials including Pt—Ru—Os or Pt—Ru—Os—Ir, such as disclosed in J. Phys. Chem. B 1998, 102, 9997-10003. Palladium alloys given by the formula PdM, where M may be one or more metal selected from the group of platinum, gold, silver, cobalt, nickel and iron may also be synthesized. Other desirable alloys may include, but are not limited to, gold-silver alloys and samarium-cobalt alloys. Exemplary semiconductors include CdS, CdSe, PbSe, PbS, ZnSe, ZnS, GaAs, InAs, InP, AlAs and SiGe.

Particularly desirable nanoparticles include $Fe_2O_3$ nanoparticles, $Fe_2O_3$ nano-cubes, $Fe_2O_3$ nano-rods, $CoPt_3$ nanoparticles, CoPt nano-rods, CoPt hyper-branched nano-rods, Co nanoparticles, FePt nanoparticles, Pt nanoparticles, $SnO_2$ nanoparticles, CdS nanoparticles, Ag nanoparticles and CdSe nanoparticles.

The size of nanoparticles synthesized using exemplary embodiments of the methods accordingly to this invention is not particularly limited. In various exemplary embodiments, spherical and/or spheroid nanoparticles may synthesized to have an average size of less than about 100 nm, less than about 50 nm, less than about 25 nm, less than about 15 nm, less than about 10 nm or less than about 5 nm. In still further embodiments, spherical and/or spheroid nanoparticles may be synthesized to have an average size of or of about 1, 5, 10, 15, 25, 50 or 100 nm, or ranges therebetween.

In various exemplary embodiments, nano-cubes may synthesized to have an average size of less than about 200 nm, less than about 150 nm, less than about 100 nm, less than about 50 nm, less than about 20 nm, less than about 10 nm or less than about 5 nm. In still further embodiments, nano-cubes may be synthesized to have an average size of or of about 2, 3, 5, 10, 20, 50, 100, 150 or 200 nm, or ranges therebetween.

In various exemplary embodiments, nano-rods may synthesized to have a diameter of less than about 50 nm, less than about 25 nm, less than about 15 nm, less than about 10 nm or less than about 5 nm. In still further embodiments, nano-rods may be synthesized to have a diameter of or of about 1, 2, 5, 10, 25, 50 or 100 nm, or ranges therebetween.

In various exemplary embodiments, nano-rods may synthesized to have an aspect ratio of at least about 2, at least about 10, at least about 100, at least about 1,000 or at least about 10,000. In still further embodiments, nano-rods may be synthesized to have an aspect ratio of or of about 2, 10, 100, 200, 300, 400, 500, 600, 700, 800, 900, 1,000 or 10,000, or ranges therebetween.

In various exemplary embodiments, the reactions described herein are employed to obtain monodisperse and/or ordered nanoparticle compositions.

In various exemplary embodiments, any suitable stabilizing agent may be used that permits nanoparticles to be synthesized in ionic liquids. Exemplary stabilizing agents may include long chain alkyl surfactants, such as long chain alkyl carboxylate acids, long chain alkyl amines and polymers. Stabilizing agents that have been found to be particularly useful include, for example, oleic acid, bis-(2,4,4-trimethylpentyl)phosphinic acid, stearic acid, oleylamine, hexadecylamine, 1,2-hexandecandiol, cetyltrimethylammonium bromide, N,N-dimethlylhexadecyl amine, tri-n-octylphosphine oxide, ethylene glycol and poly(vinylpyrrolidone). Further possible stabilizing agents may include various other diols, polyols and long chain amines.

In various exemplary embodiments, any precursor may be used, so long as the precursor can yield nanoparticles in ionic liquids. In various exemplary embodiments, precursors are organometallic precursors. In some such embodiments, precursors are reducible metal salts. Precursors that have been found to be particularly useful include, for example, iron pentacarbonyl, platinum acetylacetonate, cobalt acetylacetonate, tin chloride, cadmium dimethyldicarbamate, cadmium oxide, selenium trioctylphosphine and silver trifluoroacetate. Various other metal acetylacetonates, fluorocarboxylates, halides, nitrates, carbonyls and acetates may also be employed.

In various exemplary embodiments, any ionic liquid that is suitable for the synthesis of nanoparticles may be used. Ionic liquids include, for example, complexes that include large, organic cations and various anions. Ionic liquids may have a melting point at or below 150° C. Ionic liquids that are liquid at room temperature may be known as room temperature ionic liquids. The large, organic cations present in ionic liquids may include, for example, quaternary ammonium cations, heterocyclic aromatic cations and various imidazolium and pyrrolidinium cations. The anions present in ionic liquids are not particularly limited. For example, suitable anions may include halogen ions, sulfate ions, nitrate ions, hexafluorophosphate ions, tetrafluoroborate ions, bis(triflylmethyl-sulfonyl) imide ions, etc. Physical and chemical properties of ionic liquids are dependent on the properties and interactions of the cations and anions present in the ionic liquids.

Ionic liquids, generally, are non-flammable, non-volatile and thermally stable. For these reasons, ionic liquids are safer and more environmentally friendly than conventional volatile, organic compounds, when used as solvents. As a result, use of ionic liquids in synthetic processes can reduce the complexity of synthetic reactions when it is possible to substitute such ionic liquids for conventional solvents.

In various exemplary embodiments, ionic liquids used in the methods of the present invention include, but are not limited to, 1-butyl-3-methylimidazolium bis(trifluoromethylsulfonyl)imide, 1-n-butyl-3-methylimidazolium hexafluorophosphate, 1,1,3,3-tetramethylguanidinium lactate, N-butylpyridinium tetrafluoroborate, 1-butyl-3-methylimidazolium tetrafluoroborate, 1-ethyl-3-methylimidazolium bis(trifluoromethyl sulfonyl)imide and thiol-functionalized ionic liquids.

The sequence in which the stabilizing agent, the metallic precursor and the ionic liquid are combined to form the reaction mixture is not particularly limited. Any sequence may be used that permits formation of nanoparticles. In various exemplary embodiments, the stabilizing agent, the metallic precursor and the ionic liquid are combined prior to heating. In further embodiments, one or more components of the reaction mixture may be combined and heated prior to adding one or more other components. This sequence may permit one or more of the components to melt, decompose or dissolve before one or more other components are combined. For example, the stabilizing agent and the ionic liquid may be combined and heated prior to adding the precursor.

The manner in which the reaction mixture is heated is not particularly limited, so long as the heating yields nanoparticles that self-separate from the reaction mixture. In various exemplary embodiments, the reaction mixture is heated to a predetermined temperature and maintained at the predetermined temperature for a predetermined time. The predetermined temperature and the predetermined time are selected with respect to the particular reaction mixture and the type of nanoparticle that is desired. For example, for a given reaction mixture, a particular reaction temperature will yield nanoparticles and a second higher or lower temperature can lead to the self-separation of nanoparticles from the reaction mixture or vice versa. Moreover, by tuning the reaction temperature and time, specific shapes and sizes of particles, e.g., spherical or spheroid nanoparticles, nano-cubes, nano-rods and hyper-branched nano-rods, may be obtained.

Self-separation often appears to occur at temperatures that are higher than those used in known syntheses of nanoparticles in ionic liquids. For example, it has been observed that it is possible to cause a reaction mixture to self-separate by heating the reaction mixture to a temperature of at least 200° C. Successful self-separation is also possible at temperatures as high as or higher than 350° C. In exemplary embodiments, self-separation may occur by heating a reaction mixture to a temperature of from about 180° C. to about 400° C. Desirable results have been obtained by heating a reaction mixture to a temperature of from about 220° C .to about 300° C. Even more desirable results have been obtained by heating a reaction mixture to a temperature of from about 260° C. to about 290° C. In various exemplary embodiments, self-separation of a reaction mixture can be obtained by heating to a temperature of or of about 260° C., 270° C., 280° C., 290° C., or ranges therebetween. It should be appreciated, however, that the reaction temperature is not limited to the temperatures set forth above, but rather is determined based upon the reactants used and the shape and type of nanoparticles that are to be synthesized.

While not being bound to a particular theory, it is believed that, during the course of the reactions discussed herein, the precursor (e.g., metallic or semiconductor precursors) forms a relatively stable complex with the stabilizing agent. The solubility of the stabilizing agent in the ionic liquid does not appear to be determinative. However, the stabilizing agent should have a functional group in a first region that has a strong affinity for the surface of the desired nanoparticle product and a functional group in a second region that has a polarity that differs greatly from the polarity of the ionic liquid. The stabilizing agent should not be highly reactive with the ionic liquid.

During the reaction, it is believed that as the reaction mixture is heated, monomers, from which the desired nanoparticles will be formed, are generated by decomposition of the precursor and/or formation of complexes between the precursor and the ionic liquid. The monomers have a stronger interaction with the functional group in the first region of the stabilizing agent than with the ionic liquid, and thus the monomers are capped by the stabilizing agent. This capping causes the functional group in the second region (having different polarity than the ionic liquid) to form the outer surface of the capped monomer. The differing polarities of the outer functional group and the ionic liquid cause the monomers to separate into a different phase from the ionic liquid.

In the separate phase, the monomers undergo further growth, and by kinetic and/or thermodynamic control, are formed into nanoparticles of designed morphology. By using ionic liquids, it is possible that a solvent environment can be prepared that is specifically designed for particular precursors and stabilizing agents by selecting particular combinations of cation and anion components of the ionic liquid. Accordingly, it appears that nanoparticles of any given composition and morphology can be produced by the synthetic pathways described herein.

The manner in which nanoparticles are collected from the reaction mixture (e.g., the remaining ionic liquid) is not particularly limited. It should be appreciated, however, that the methods described herein permit nanoparticles to be easily collected from the reaction mixture directly. In various exemplary embodiments, the process of collecting nanoparticles from the reaction mixture may involve use of a dispersion solvent. Because the methods described herein cause nanoparticles to self-separate from a reaction mixture during the course of synthesis, elaborate chemical schemes are not needed to remove the nanoparticles from the remaining ionic liquid of the reaction mixture.

In various exemplary embodiments, methods of synthesizing nanoparticles may include combining a stabilizing agent, a precursor and an ionic liquid to form a reaction mixture, heating the reaction mixture to a predetermined temperature to form the nanoparticles and cause the nanoparticles to self-separate from the ionic liquid of the reaction mixture, collecting the nanoparticles from the ionic liquid, and reusing the separated ionic liquid. Such methods may employ any one or more of the reactants and reaction conditions to obtain any one or more of the nanoparticles described above. The present inventors have discovered that, not only is it possible to obtain nanoparticles that are separable from the ionic liquids in which they are reacted by employing the methods described herein, but the remaining ionic liquid in the reaction mixture after the nanoparticles are removed can be purified and reused in subsequent nanoparticle syntheses and/or other uses to which ionic liquids can be applied. As discussed above, in reactions according to the present invention, nanoparticles may form into a separate phase from the ionic liquid of the reaction mixture as the nanoparticles are formed. Because the precursor and surfactant appear to be consumed and transferred into the second phase during the course of formation of the nanoparticles, after the nanoparticles are formed, the ionic liquid phase should be free from any residue of precursors or surfactants (i.e., impurities), and thus it is possible to reuse the ionic liquid phase. Ionic liquid recycled from the reactions described herein appears to retain the thermal stability characteristics of unrecycled, new ionic liquid. Moreover, it is possible to continue to reuse the ionic liquid through multiple iterations of the reactions described herein. For example, the reactions described herein can be repeated one, two, three, four, five or more times with the original ionic liquid.

In various exemplary embodiments, reusing separated ionic liquid involves purifying the separated ionic liquid. The manner in which the separated ionic liquid is purified is not particularly limited. In various exemplary embodiments, the separated ionic liquid may be purified by passing the ionic liquid through a column of an absorbent material, such as, for example, an alumina or silica gel. Also, volatile impurities can be removed from the separated ionic liquid by heating. Such heating can be conducted under a vacuum or at atmospheric pressure, and may be conducted in air or under protection of a gas such as nitrogen or argon.

The separated ionic liquid may be used in any suitable application. In various exemplary embodiments, the separated ionic liquid is used to repeat the nanoparticle synthetic methods described herein. Because of the manner in which ionic liquids an nanoparticles separate according to the synthetic pathways described herein, by using a continuous flow reactor, it should be possible to manufacture nanoparticles continuously.

This invention is illustrated by the following examples, which are merely for the purpose of illustration.

EXAMPLES

Example 1

Synthesis of 6 nm Iron Oxide Nanoparticles in Ionic Liquid 5 mL of freshly dried 1-butyl-3-methylimidazolium bis (trifluoromethylsulfonyl)imide ([BMIM][Tf$_2$N]) are mixed with 64 µL of 99.99% oleic acid (Aldrich), 13.2 µL of 70% oleylamine (Aldrich) and 97.5 mg of 90% 1-hexandecandiol (Aldrich) in a 15 mL flask. The mixture is heated with a heating mantle under argon protection. The mixture is stirred vigorously with a magnetic stirrer. The mixture turns into a colorless transparent solution when the 1-hexandecandiol dissolves (or melts) at 75° C. 32.5 µL of 99.999% iron pentacarbonyl (Aldrich) are injected into the flask using a syringe at 110° C. The reaction mixture turns to a black-reddish color very quickly and turns completely dark when the temperature is raised to 140° C. The reaction mixture is heated to 280° C. over two hours from time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 1B:
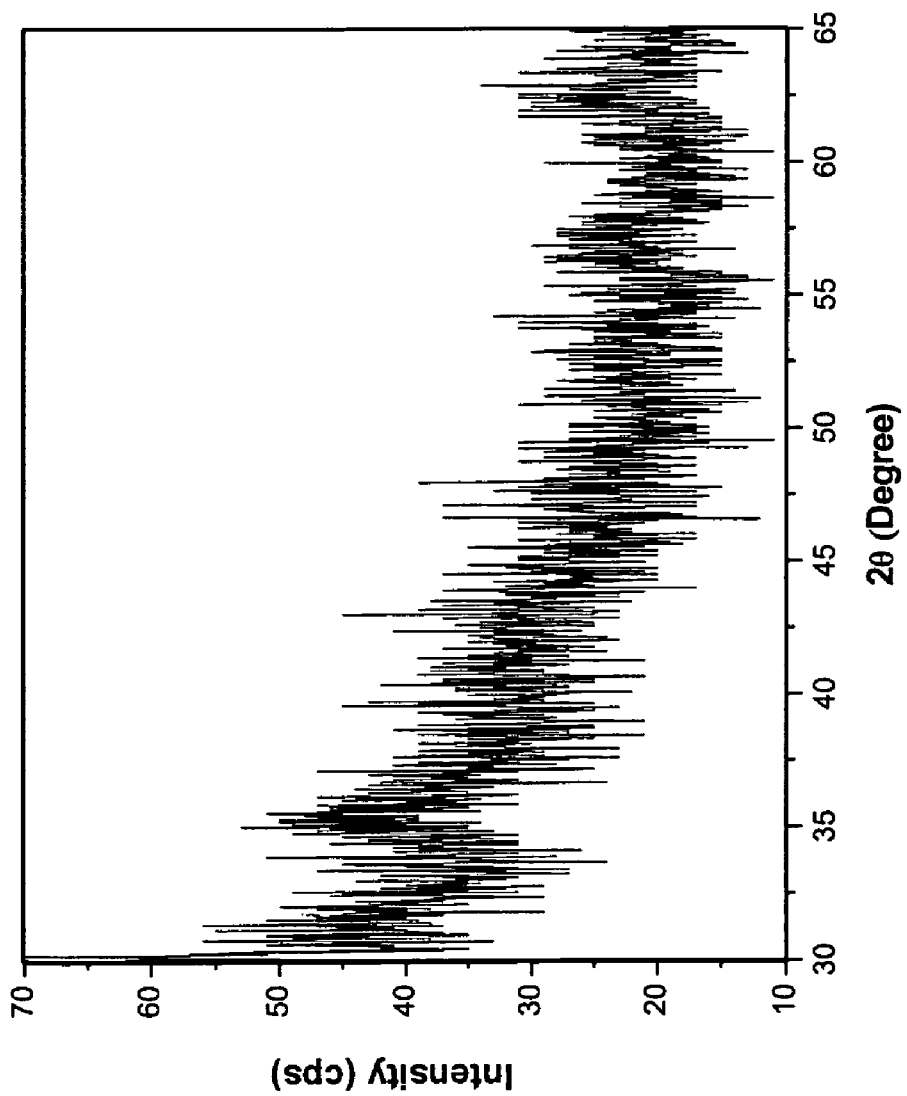
FIG. 1B is a graph showing XRD spectra of exemplary nanoparticles according to this invention.

Transmission Electron Microscopy (TEM), Energy-dispersive X-ray (EDX) and Powder X-ray Diffraction (XRD) are conducted to characterize the obtained iron oxide nanoparticles. FIG. 1A is a TEM micrograph of the resulting particles. The main product of the reaction is spherical particles with an average size of 6 nm. FIG. 1B shows XRD analysis of the resulting particles. XRD analysis shows that the final product is γ-$Fe_2O_3$ or $Fe_3O_4$. The presence of the iron oxide is confirmed by EDX.

Figure 1C:
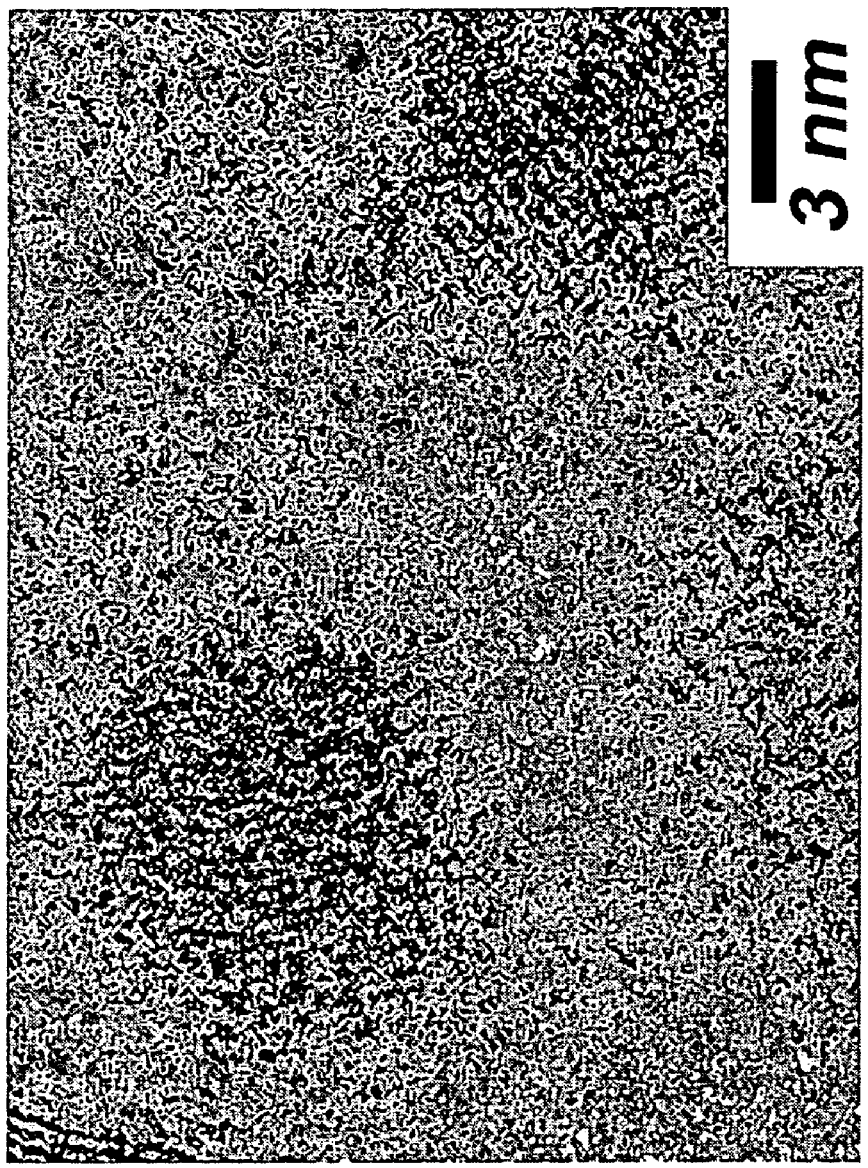
FIG. 1C is a high-resolution TEM micrograph of exemplary nanoparticles according to this invention.

FIG. 1C is a high-resolution TEM micrograph of the obtained $Fe_2O_3$ nanoparticles. High-resolution TEM shows fine structures of shell layers of the obtained $Fe_2O_3$ nanoparticles. The nanoparticles have the same types of fringes extending directly from the various iron oxide crystalline surfaces. The fringes shown in FIG. 1C have a spacing of about 3.1 Å, which closely matches the (220) planes of γ-$Fe_2O_3$ (cubic maghemite, $P4_232$).

Figure 1D:
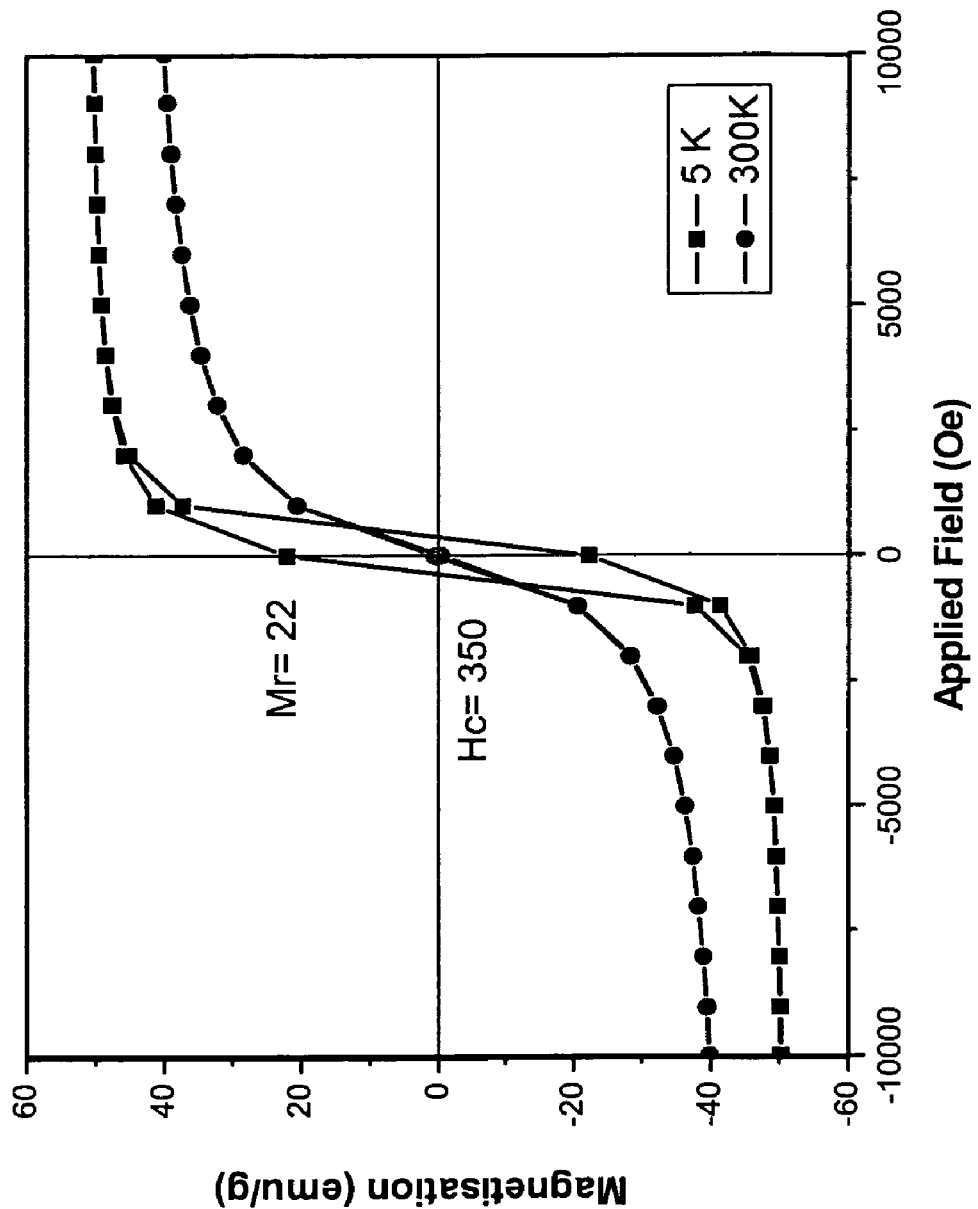
FIG. 1D is a graph showing M-H curves for exemplary nanoparticles according to this invention.
Figure 1E:
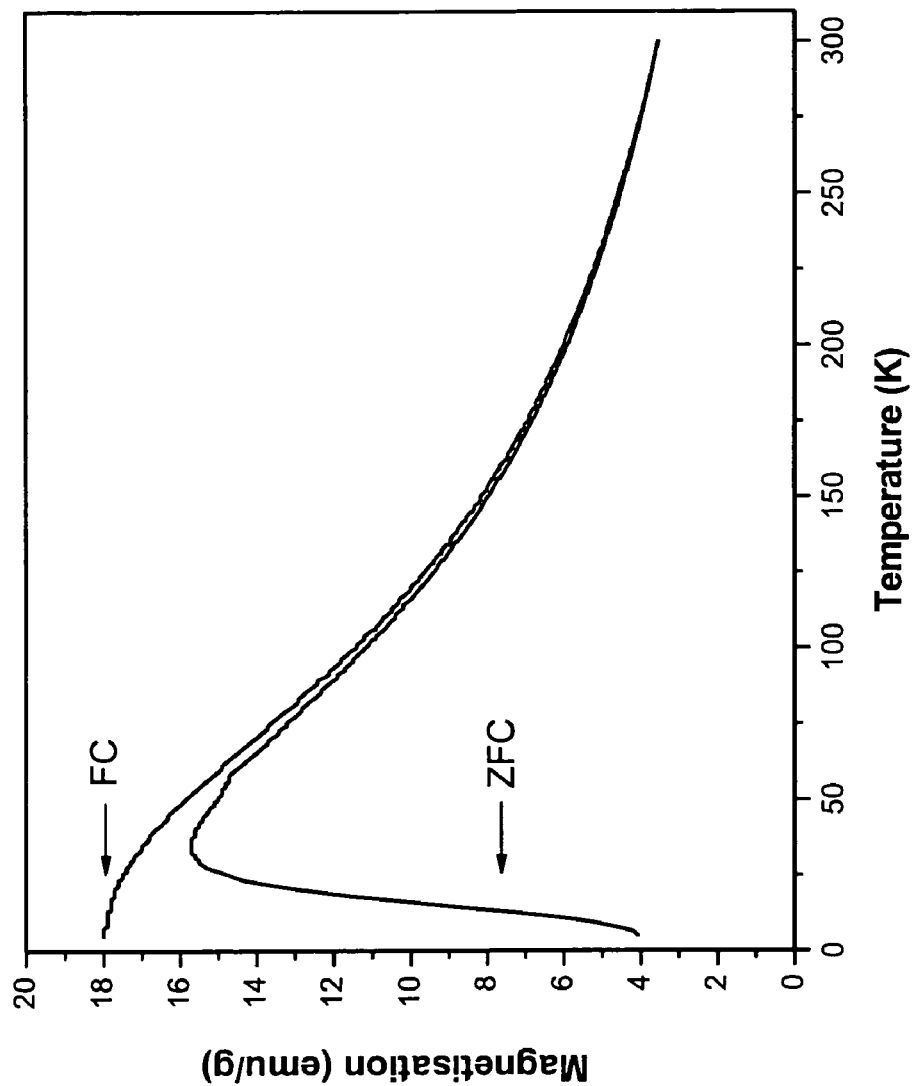
FIG. 1E is a graph showing a relationship of magnetization and temperature in an applied field for exemplary nanoparticles according to this invention.

The magnetic properties of the obtained $Fe_2O_3$ nanoparticles are examined using a Quantum Design AC and DC Superconducting Quantum Interface Device (AC/DC SQUID; model: MPMS XL) magnetometer. FIG. 1D shows the M-H curves of the $Fe_2O_3$ nanoparticles at 5 K and 300 K. The M-H measurement shows a characteristic hysteresis loop for superparamagnetic materials. The coercivities at low (5 K) and high (300 K) temperatures are 0.35 and 0.03 kOe, respectively. FIG. 1E shows a relationship between magnetization and temperature measured at an applied field of 100 Oe in the zero-field-cooled and field-cooled states for the nanoparticles. The particles exhibited a blocking temperature of $T_B$=26 K.

Example 2

Synthesis of 3 nm Iron Oxide Nanoparticles in Ionic Liquid 5 mL of freshly dried [BMIM][$Tf_2N$] are mixed with 64 μL of 99.99% oleic acid (Aldrich), 13.2 μL of 70% oleylamine (Aldrich) and 97.5 mg of 90% 1-hexandecandiol (Aldrich) in a 15 mL flask. The mixture is heated with a heating mantle under argon protection. The mixture is stirred vigorously with a magnetic stirrer. The mixture turns into a colorless transparent solution when the 1-hexandecandiol dissolves (or melts) at 75° C. 32.5 μL of 99.999% iron pentacarbonyl (Aldrich) are injected into the flask using a syringe at 110° C. The reaction mixture turns to a black-reddish color very quickly and turns completely dark when the temperature is raised to 140° C. The reaction mixture is heated to 270° C. over one hour and forty minutes from the time of the injection of the iron pentacarbonyl and that temperature is maintained for another two minutes before the reaction is terminated by removing the reaction mixture from heat and cooling the reaction mixture to room temperature. At termination of the reaction, oil-like black solid materials adhere to the wall of the flask and a light yellowish transparent ionic liquid can easily be separated out. The solid materials on the wall are collected by washing with hexane.

Figure 2:
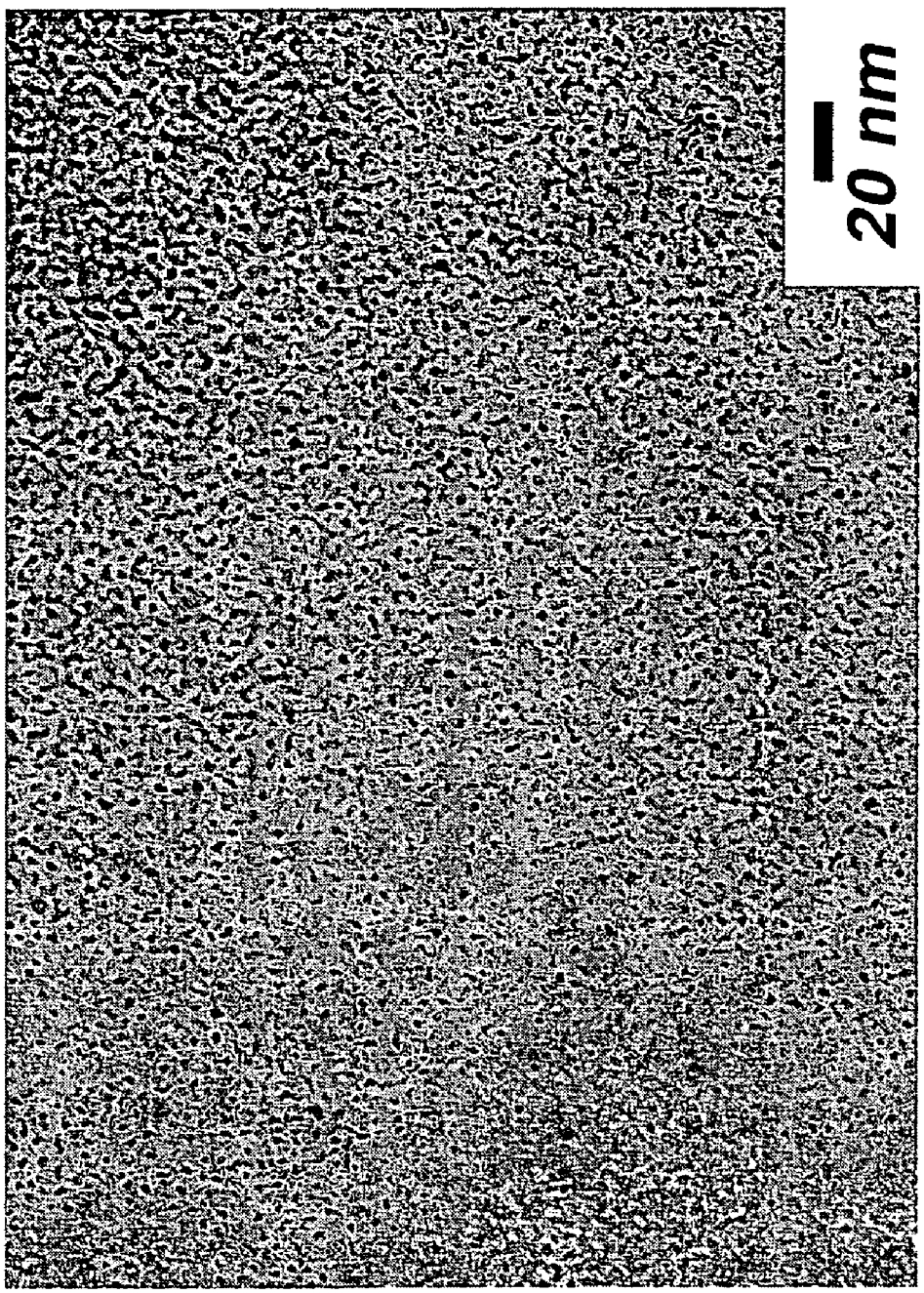
FIG. 2 is a TEM micrograph of exemplary nanoparticles according to this invention.

TEM is conducted to characterize the obtained iron oxide nanoparticles. FIG. 2 is a TEM micrograph of the resulting particles. The main product of the reaction is spherical particles with an average size of 3 nm.

Example 3

Synthesis of 10 nm Iron Oxide Nano-Cubes in Ionic Liquid 5 mL of freshly dried [BMIM][$Tf_2N$] are mixed with 80 μL of 99.99% oleic acid (Aldrich) in a 15 mL flask. The mixture is heated with a heating mantle under argon protection. The mixture is stirred vigorously with a magnetic stirrer. 32.5 μL of 99.999% iron pentacarbonyl (Aldrich) are injected into the flask using a syringe at 110° C. The reaction mixture turns light yellow after injection of the iron pentacarbonyl. The reaction mixture darkens and becomes completely dark at approximately 200° C. The reaction mixture is heated to 280° C. over two hours from the time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 3A:
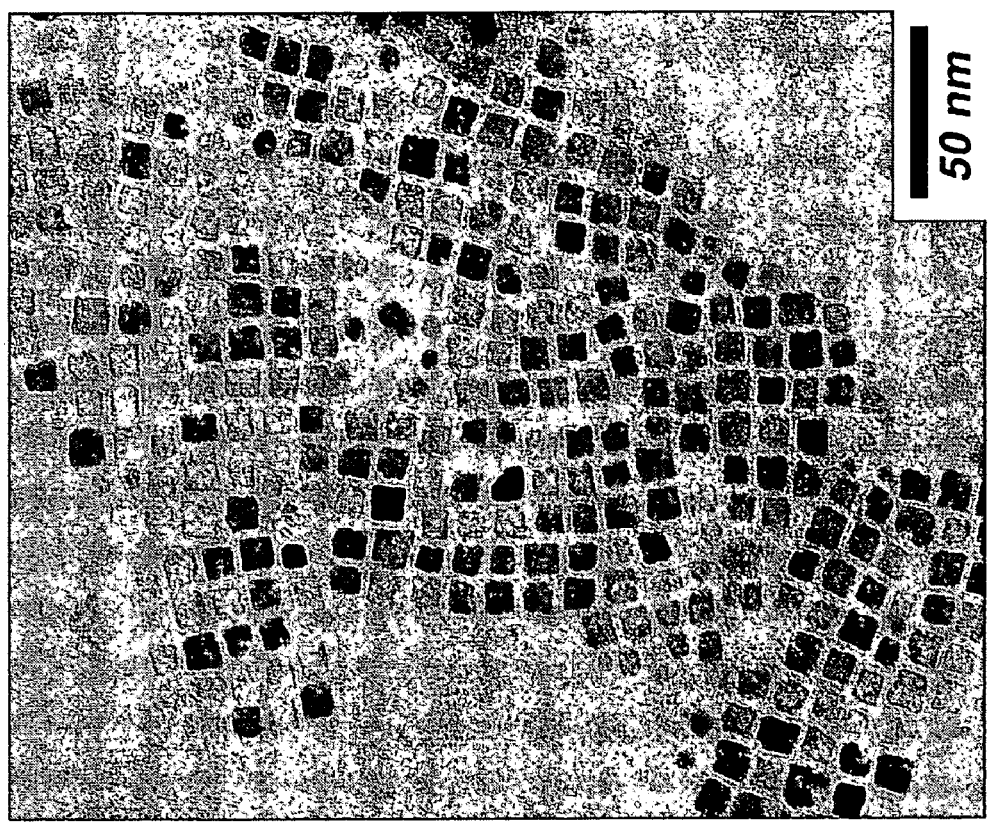
FIG. 3A is a TEM micrograph of exemplary nano-cubes according to this invention.
Figure 3B:
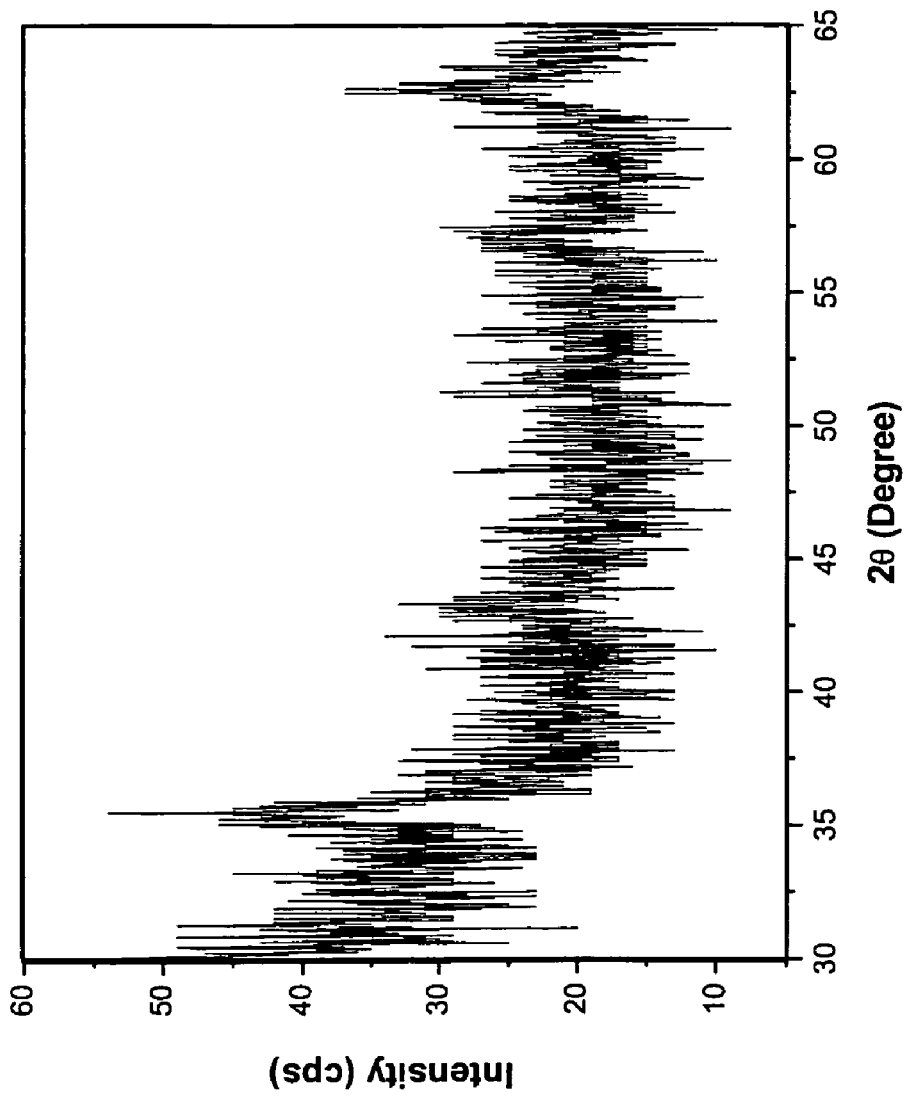
FIG. 3B is a graph showing XRD spectra of exemplary nano-cubes according to this invention.

TEM, EDX and XRD are conducted to characterize the obtained iron oxide nano-cubes. FIG. 3A is a TEM micrograph of the resulting nano-cubes. The main product of the reaction is cubic particles with an average size of 10 nm. FIG. 3B shows XRD analysis of the resulting particles. XRD analysis shows that the final product is γ-$Fe_2O_3$ or $Fe_3O_4$. The presence of the iron oxide is confirmed by EDX.

Figure 3C:
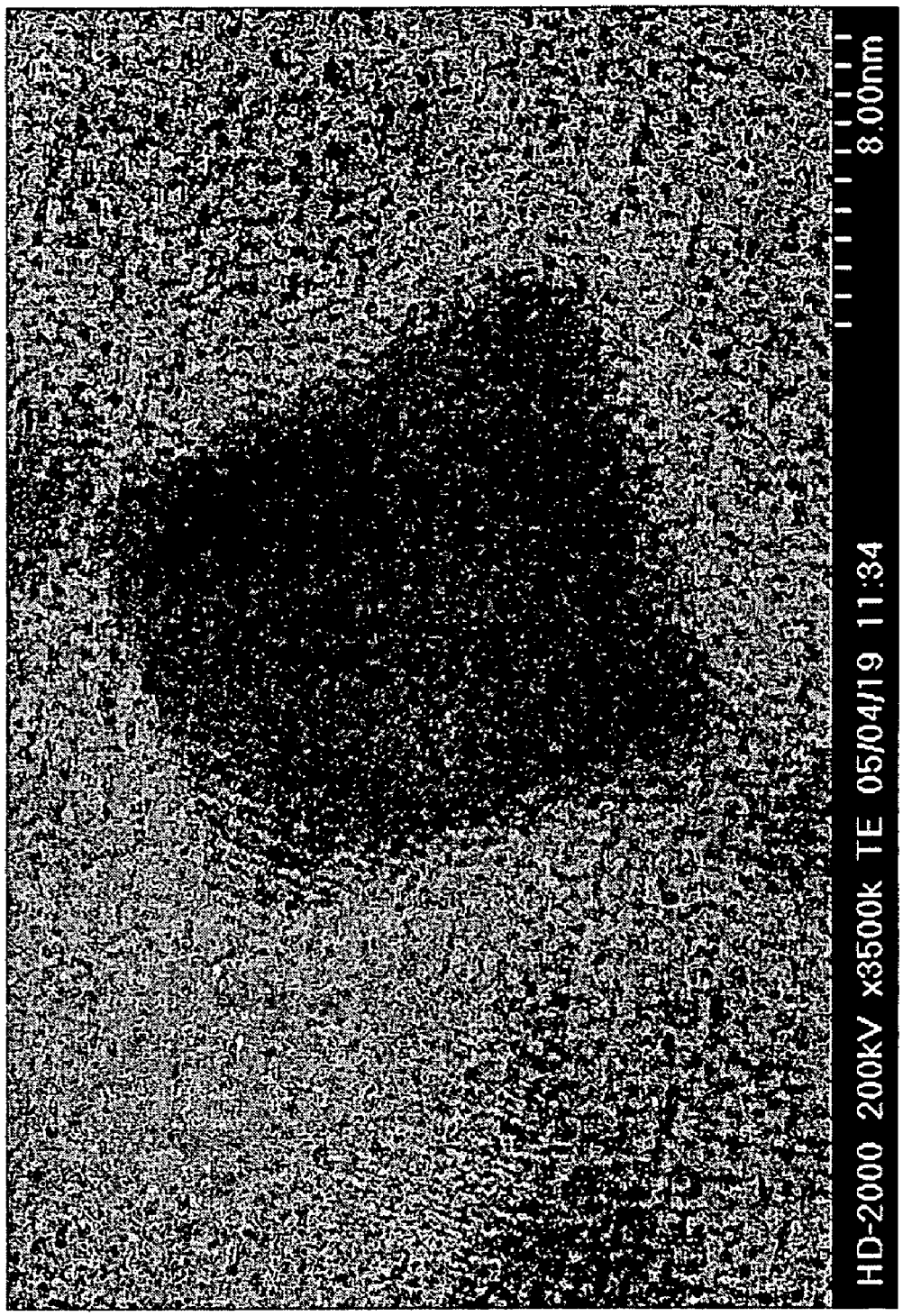
FIG. 3C is a high-resolution TEM micrograph of exemplary nano-cubes according to this invention.

FIG. 3C is a high-resolution TEM micrograph of the obtained $Fe_2O_3$ nano-cubes. The nano-cubes have the same types of fringes extending directly from the various iron oxide crystalline surfaces. The fringes shown in FIG. 3C have a spacing of about 3.1 Å, which closely matches the (220) planes of γ-$Fe_2O_3$ (cubic maghemite, $P4_232$).

Figure 3D:
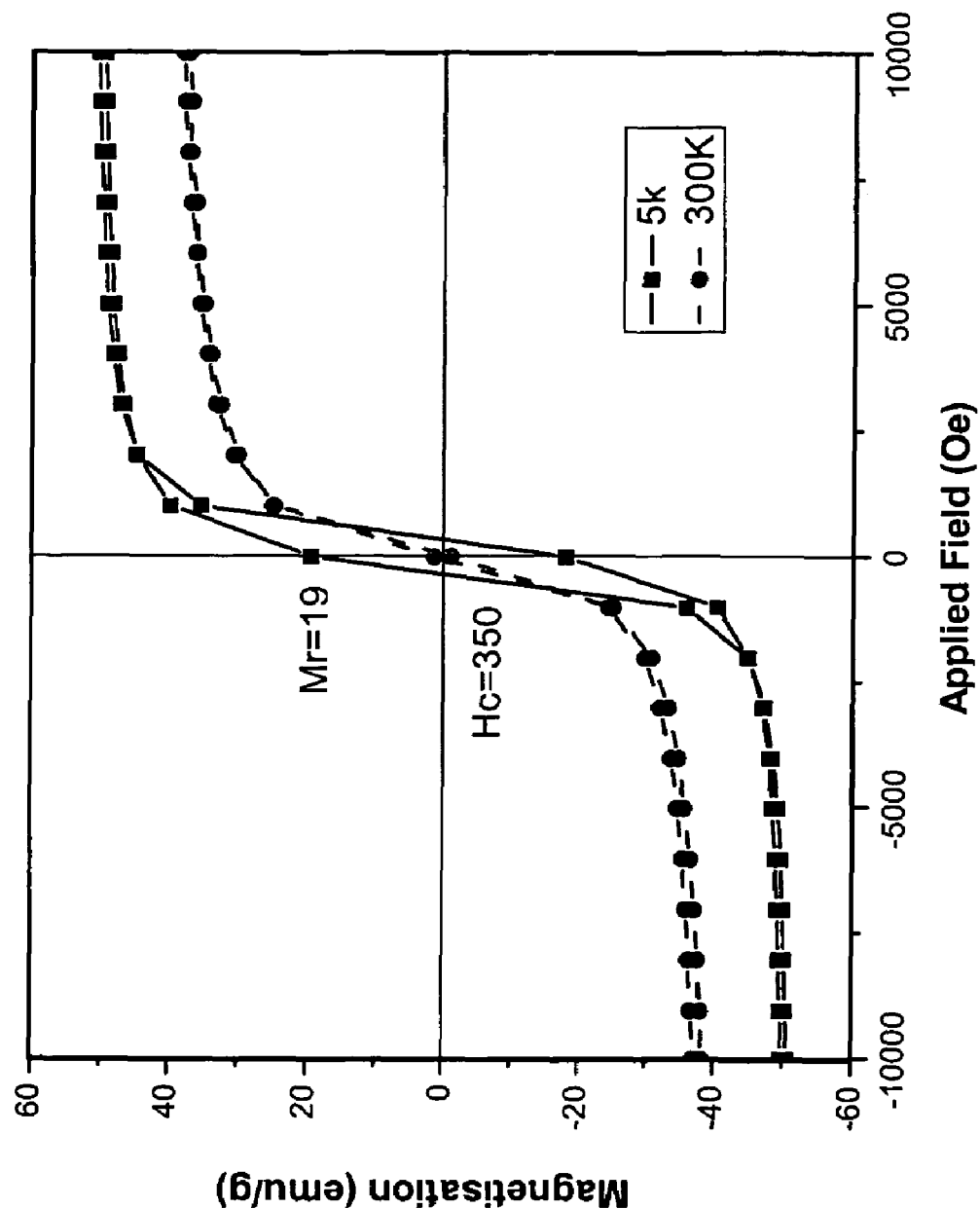
FIG. 3D is a graph showing M-H curves for exemplary nano-cubes according to this invention.
Figure 3E:
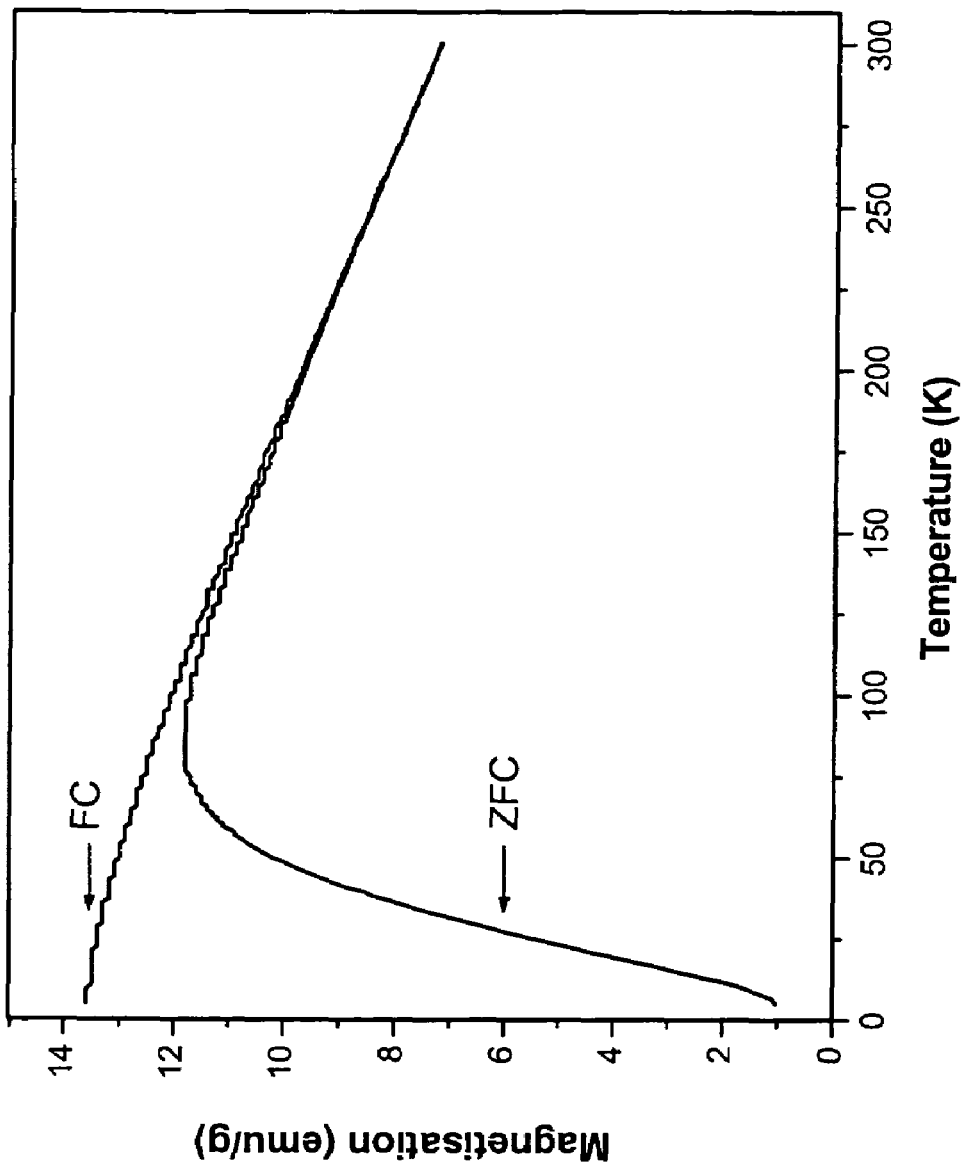
FIG. 3E is a graph showing a relationship of magnetization and temperature in an applied field for exemplary nano-cubes according to this invention.

The magnetic properties of the obtained $Fe_2O_3$ nano-cubes are examined using an AC/DC SQUID magnetometer. FIG. 3D shows the M-H curves of the $Fe_2O_3$ nano-cubes at 5 K and 300 K. The M-H measurement shows a characteristic hysteresis loop for superparamagnetic materials. The coercivities at low (5 K) and high (300 K) temperatures are 0.35 and 0.03 kOe, respectively. FIG. 3E shows a relationship between magnetization and temperature measured at an applied field of 100 Oe in the zero-field-cooled and field-cooled states for the nanoparticles. The particles exhibited a blocking temperature of $T_B$=56 K.

Example 4

Synthesis of 20 nm Iron Oxide Nano-Cubes in Ionic Liquid 5 mL of freshly dried [BMIM][$Tf_2N$] are mixed with 160 μL of 99.99% oleic acid (Aldrich) in a 15 mL flask. The mixture is heated with a heating mantle under argon protection. The mixture is stirred vigorously with a magnetic stirrer. 32.5 μL of 99.999% iron pentacarbonyl (Aldrich) are injected into the flask using a syringe at 110° C. The reaction mixture turns light yellow after injection of the iron pentacarbonyl. The reaction mixture darkens and becomes completely dark at approximately 200° C. The reaction mixture is heated to 280° C. over two hours from the time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 4:
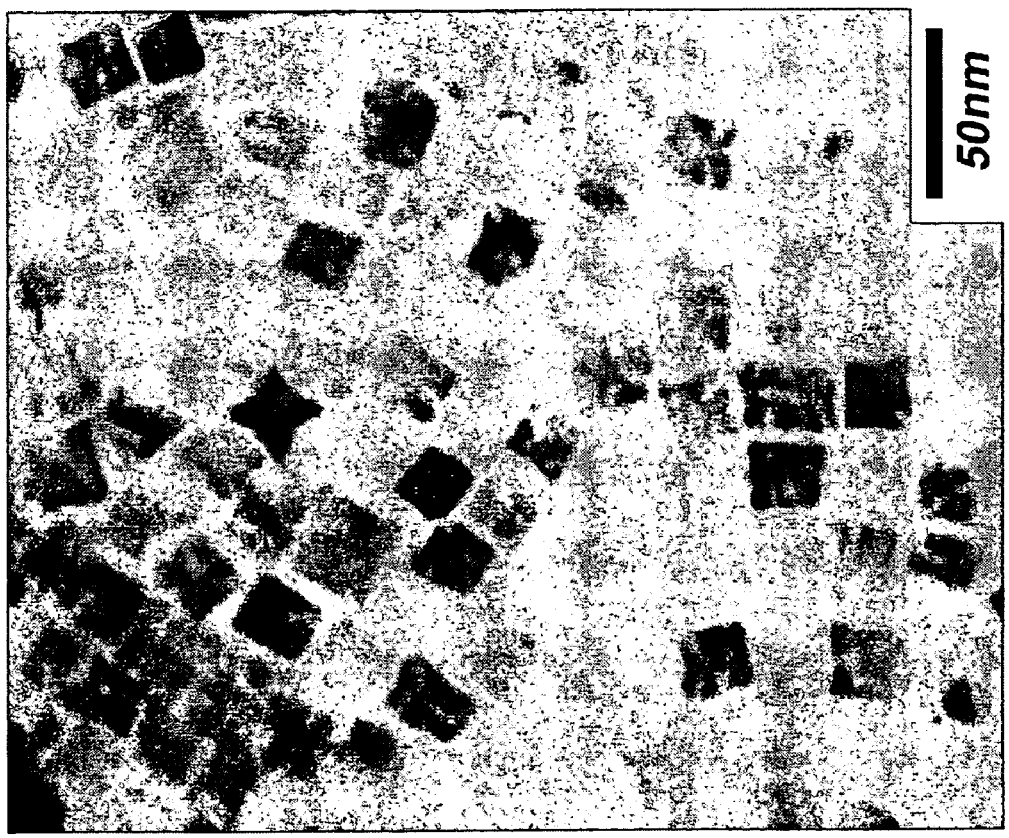
FIG. 4 is a TEM micrograph of exemplary nano-cubes according to this invention.

TEM, XRD and EDX are conducted to characterize the obtained iron oxide nano-cubes. FIG. 4 is a TEM micrograph of the resulting nano-cubes. The main product of the reaction is cubic particles with an average size of 20 nm. XRD analysis shows that the final product is γ-$Fe_2O_3$ or $Fe_3O_4$. The presence of the iron oxide is confirmed by EDX.

Example 5

Synthesis of Iron Oxide Nano-Rods Having a Diameter of 10 nm And Aspect Ratio of 11 In Ionic Liquid 5 mL of freshly dried [BMIM][Tf$_2$N] are mixed with 40 µL of 99.99% oleic acid (Aldrich), 42.5 µL of 70% oleylamine (Aldrich) and 97.5 mg of 90% 1-hexandecandiol (Aldrich) in a 15 mL flask. The mixture is heated with a heating mantle under argon protection. The mixture is stirred vigorously with a magnetic stirrer. The mixture turns into a colorless transparent solution when the 1-hexandecandiol dissolves (or melts) at 75° C. 32.5 µL of 99.999% iron pentacarbonyl (Aldrich) are injected into the flask using a syringe at 110° C. The reaction mixture turns to a black-reddish color very quickly and turns completely dark when the temperature is raised to 140° C. The reaction mixture is heated to approximately 300° C. over two hours from time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 5A:
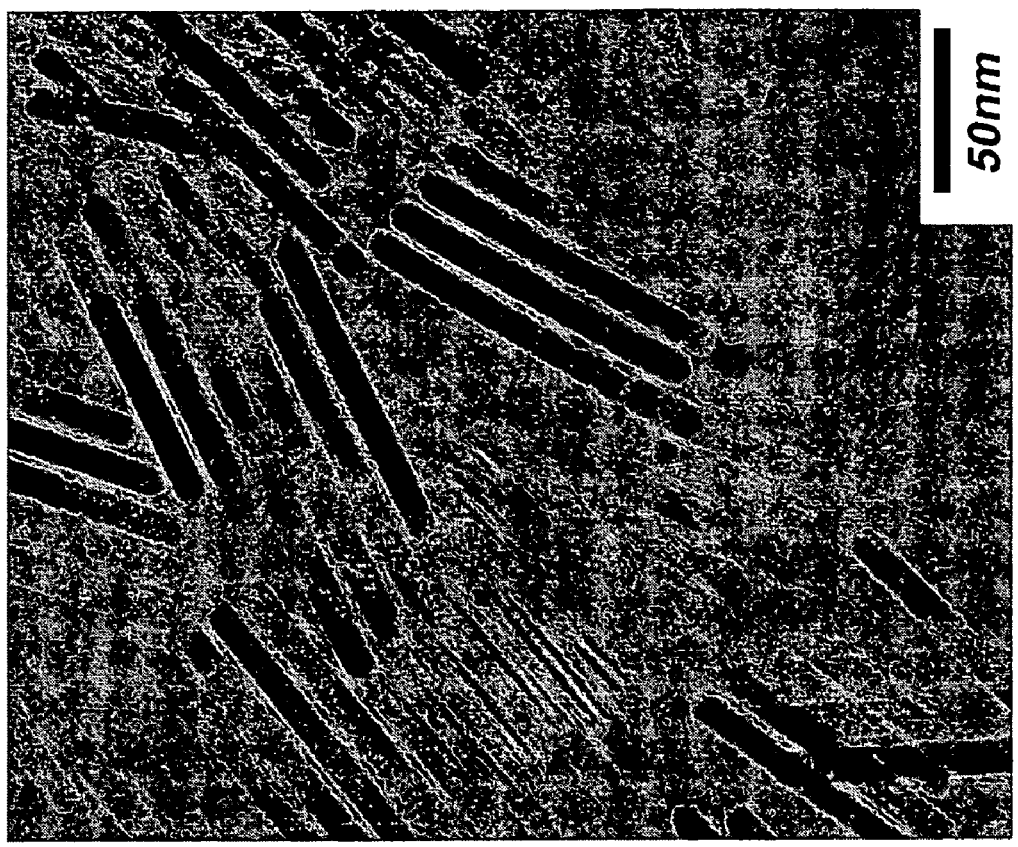
FIG. 5A is a TEM micrograph of exemplary nano-rods according to this invention.
Figure 5B:
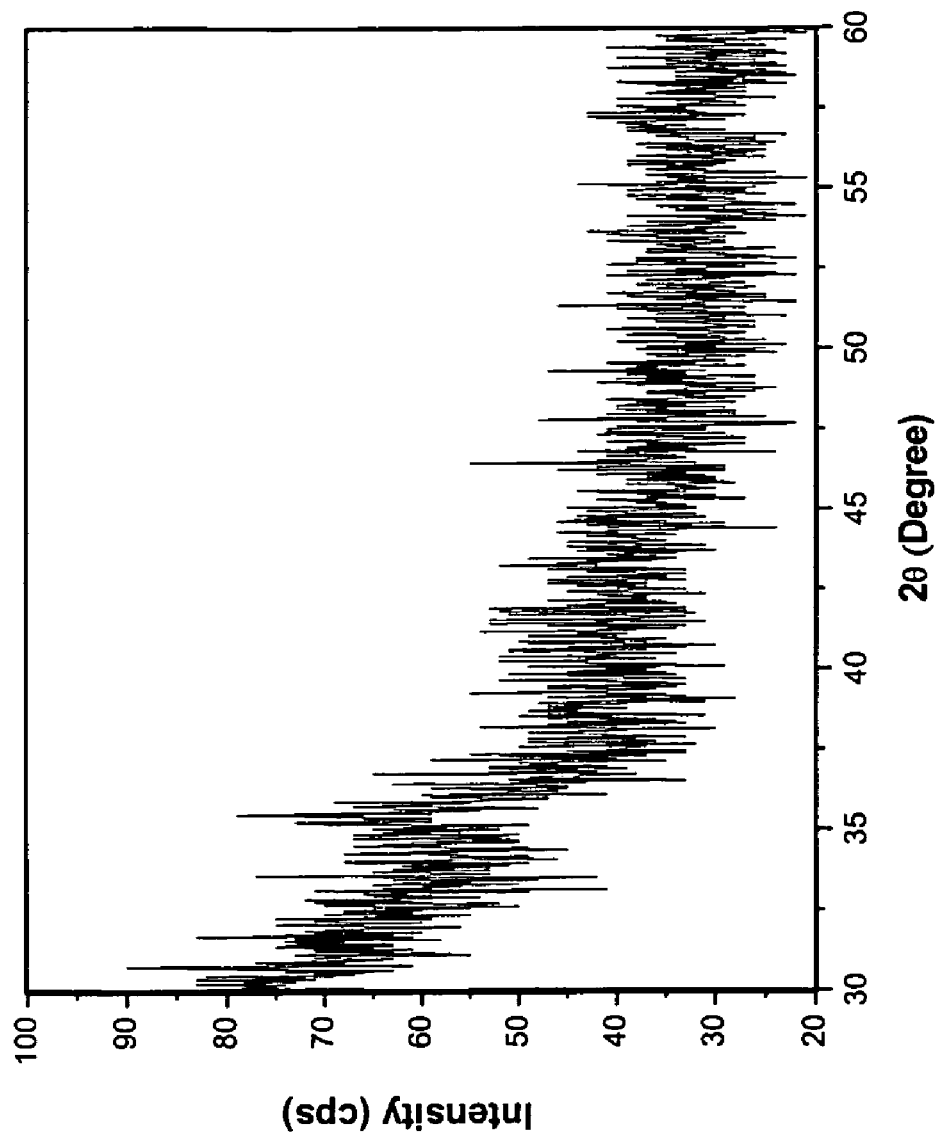
FIG. 5B is a graph showing XRD spectra of exemplary nano-rods according to this invention;.

TEM, XRD and EDX are conducted to characterize the obtained iron oxide nano-rods. FIG. 5A is a TEM micrograph of the resulting nano-rods. The main product of the reaction is rod-shaped particles with an average diameter of 10 nm and an aspect ratio of 11. FIG. 5B shows XRD analysis of the resulting particles. XRD analysis shows that the final product is γ-Fe$_2$O$_3$. The presence of the iron oxide is confirmed by EDX.

Figure 5C:
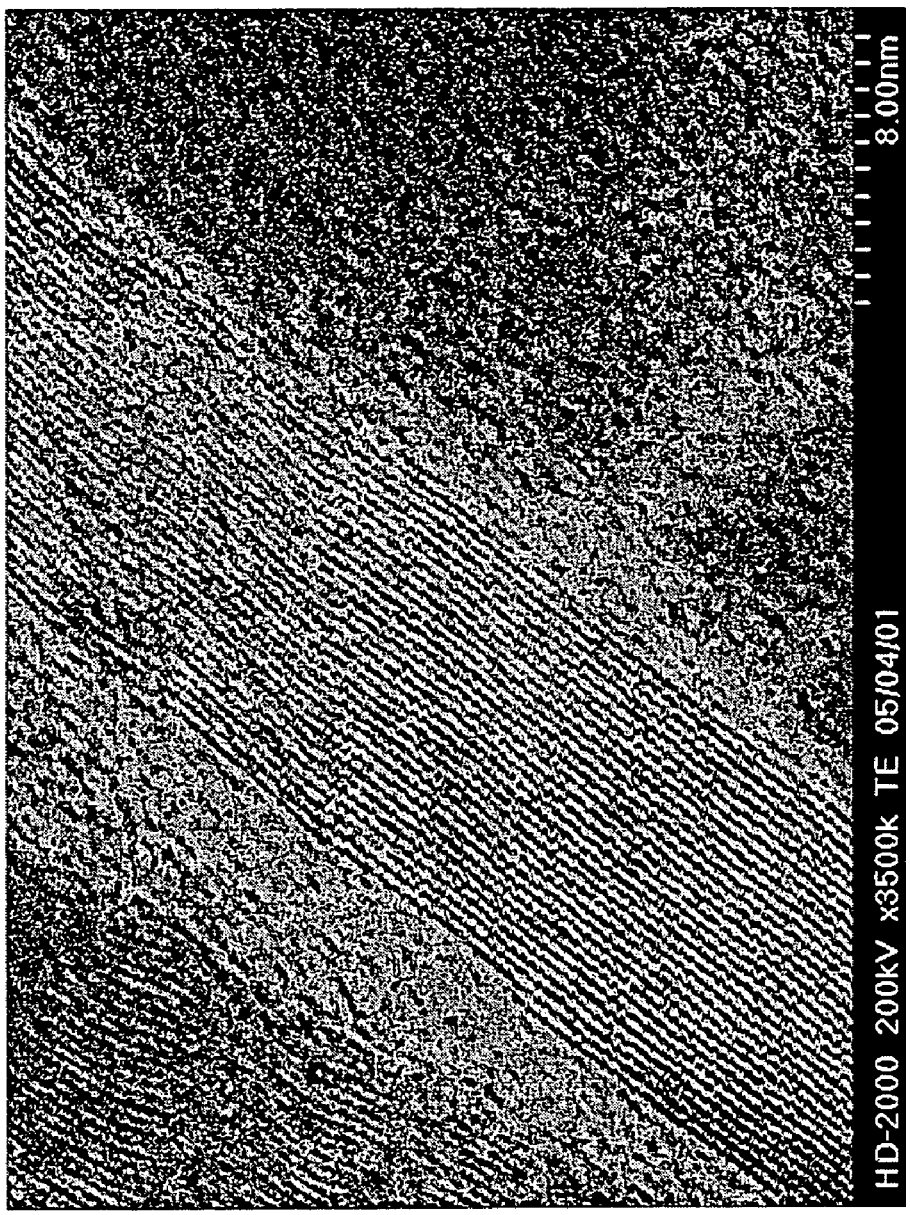
FIG. 5C is a high-resolution TEM micrograph of exemplary nano-rods according to this invention.

FIG. 5C is a high-resolution TEM micrograph of the obtained Fe$_2$O$_3$ nano-rods. The nano-rods have the same types of fringes extending directly from the various iron oxide crystalline surfaces. The fringes shown in FIG. 5C have a spacing of about 3.4 Å, which closely matches the (211) planes of γ-Fe$_2$O$_3$ (cubic maghemite, P4$_2$32).

Figure 5D:
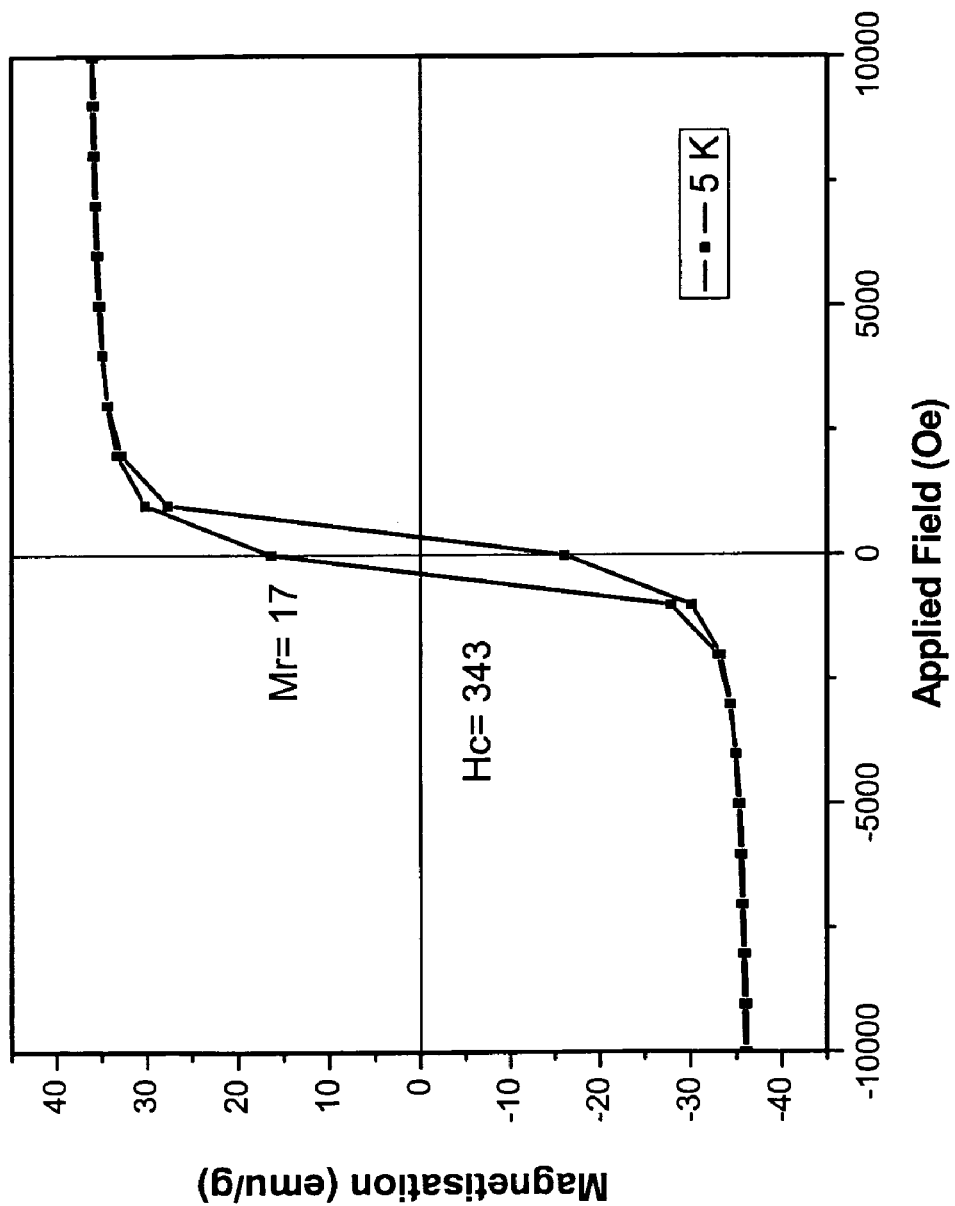
FIG. 5D is a graph showing M-H curves for exemplary nano-rods according to this invention.
Figure 5E:
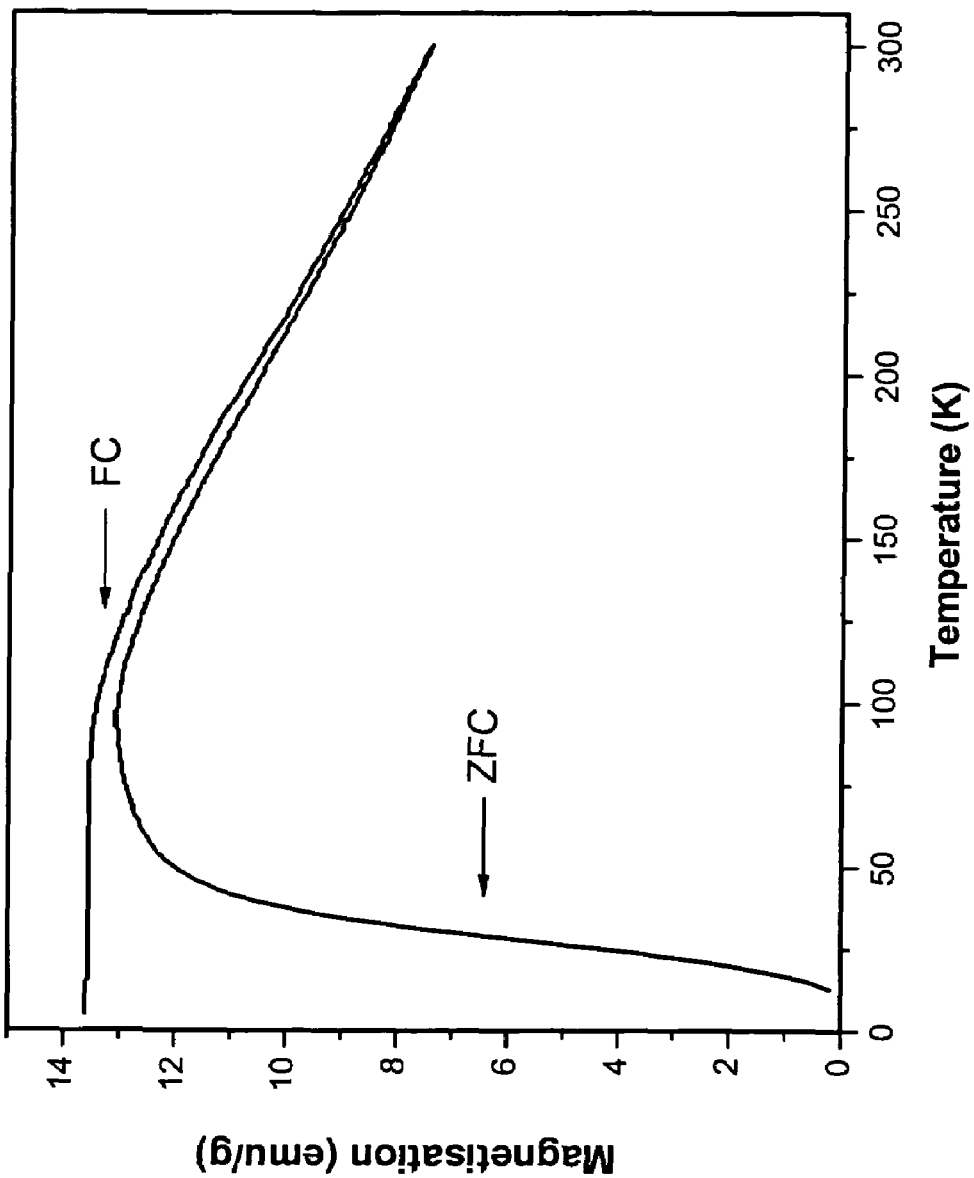
FIG. 5E is a graph showing a relationship of magnetization and temperature in an applied field for exemplary nano-rods according to this invention.

The magnetic properties of the obtained Fe$_2$O$_3$ nano-rods are examined using an AC/DC SQUID magnetometer. FIG. 5D shows the M-H curves of the Fe$_2$O$_3$ nano-rods at 5 K. The M-H measurement shows a characteristic hysteresis loop for superparamagnetic materials. The coercivity at low (5 K) temperature is 0.34 kOe. FIG. 5E shows a relationship between magnetization and temperature measured at an applied field of 100 Oe in the zero-field-cooled and field-cooled states for the nanoparticles. The particles exhibited a blocking temperature of $T_B$=50 K.

Example 6

Synthesis of Iron Oxide Nano-Rods Having a Diameter of 8 nm And Aspect Ratio of 13 In Ionic Liquid 5 mL of freshly dried [BMIM][Tf$_2$N] are mixed with 40 µL of 99.99% oleic acid (Aldrich), 42.5 µL of 70% oleylamine (Aldrich) and 97.5 mg of 90% 1-hexandecandiol (Aldrich) in a 15 mL flask. The mixture is heated with a heating mantle under argon protection. The mixture is stirred vigorously with a magnetic stirrer. The mixture turns into a colorless transparent solution when the 1-hexandecandiol dissolves (or melts) at 75° C. 100 µL of 99.999% iron pentacarbonyl (Aldrich) are injected into the flask using a syringe at 110° C. The reaction mixture turns to a black-reddish color very quickly and turns completely dark when the temperature is raised to 140° C. The reaction mixture is heated to approximately 300° C. over two hours from time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 6:
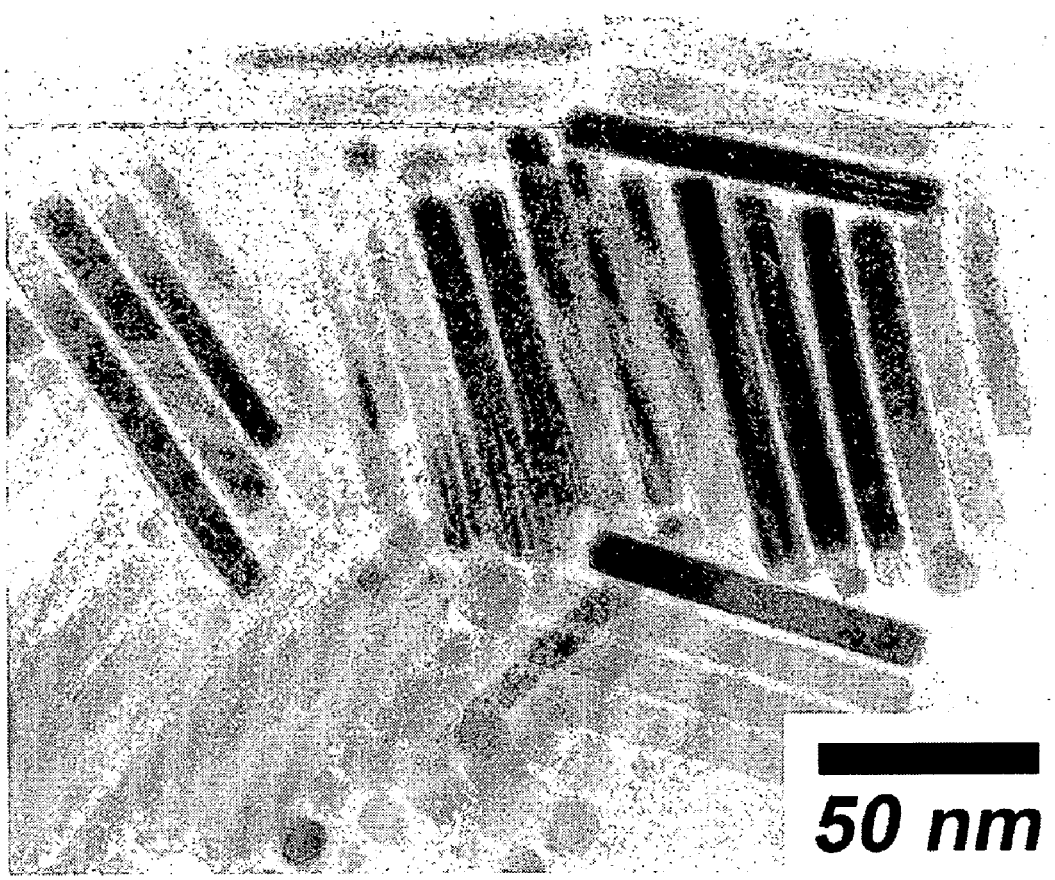
FIG. 6 is a TEM micrograph of exemplary nano-rods according to this invention.

TEM, XRD and EDX are conducted to characterize the obtained iron oxide nano-rods. FIG. 6 is a TEM micrograph of the resulting nano-rods. The main product of the reaction is rod-shaped particles with an average diameter of 8 nm and an aspect ratio of 13. XRD analysis shows that the final product is γ-Fe$_2$O$_3$. The presence of the iron oxide is confirmed by EDX.

Example 7

Synthesis of Iron Oxide Nano-Rods Having a Diameter of 10 nm in Ionic Liquid 3 mL of freshly dried [BMIM][Tf$_2$N] are mixed with 80 µL of 99.99% oleic acid (Aldrich) in a 15 mL flask. The mixture is heated with a heating mantle under argon protection. The mixture is stirred vigorously with a magnetic stirrer. 32.5 µL of 99.999% iron pentacarbonyl (Aldrich) are injected into the flask using a syringe at 110° C. The reaction mixture is heated to 210° C. over two hours from the time of the injection of the iron pentacarbonyl. The yellow reaction mixture becomes completely dark at 200° C. The reaction mixture is maintained at 210° C. for 20 minutes. Then, the temperature is raised to approximately 310° C. over ten minutes using a pre-heated thermal and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 7:
FIG. 7 is a TEM micrograph of exemplary nano-rods according to this invention.

Transmission Electron Microscopy was conducted to characterize final nanoparticles. FIG. 7 is a TEM micrograph of the resulting nano-rods with an average diameter of 10 nm and aspect ratio of 11. The existence of the iron oxide was also confirmed by EDAX.

TEM and EDX are conducted to characterize the obtained iron oxide nano-rods. FIG. 7 is a TEM micrograph of the resulting nano-rods. The main product of the reaction is rod-shaped particles with an average diameter of 10 nm and an aspect ratio of approximately 10. The presence of the iron oxide is confirmed by EDX.

Example 8

Synthesis of CoPt$_3$ Nanoparticles in Ionic Liquid 3 mL of freshly dried [BMIM][Tf$_2$N] are mixed with 137 mg of 98% cetyltrimethylammonium bromide (CTAB) (Aldrich) in a 15 mL flask. The mixture is heated with a heating mantle under argon protection. The mixture is stirred vigorously with a magnetic stirrer. The mixture turns into a colorless transparent solution when the CTAB dissolves (or melts) at 40° C. 147 mg of 99.99% platinum acetylacetonate (Pt (acac)$_2$) (Aldrich) and 44 mg of 99.99% cobalt acetylacetonate (Co(acac)$_2$) (Aldrich) are dispersed in 1 mL of [BMIM] [Tf$_2$N] and injected into the reaction mixture using a syringe at 350° C. The reaction temperature drops to approximately 325° C. and returns to 350° C. in approximately five minutes. The reaction mixture is maintained at 350° C. for an additional hour before the reaction is terminated. At termination of the reaction, a black product is centrifuged from the reaction mixture at 12,000 RPM. The separated reaction product is washed twice with acetone and once with ethanol. A sample of the reaction product is dispersed acetone to prepare a specimen for analysis.

Figure 8A:
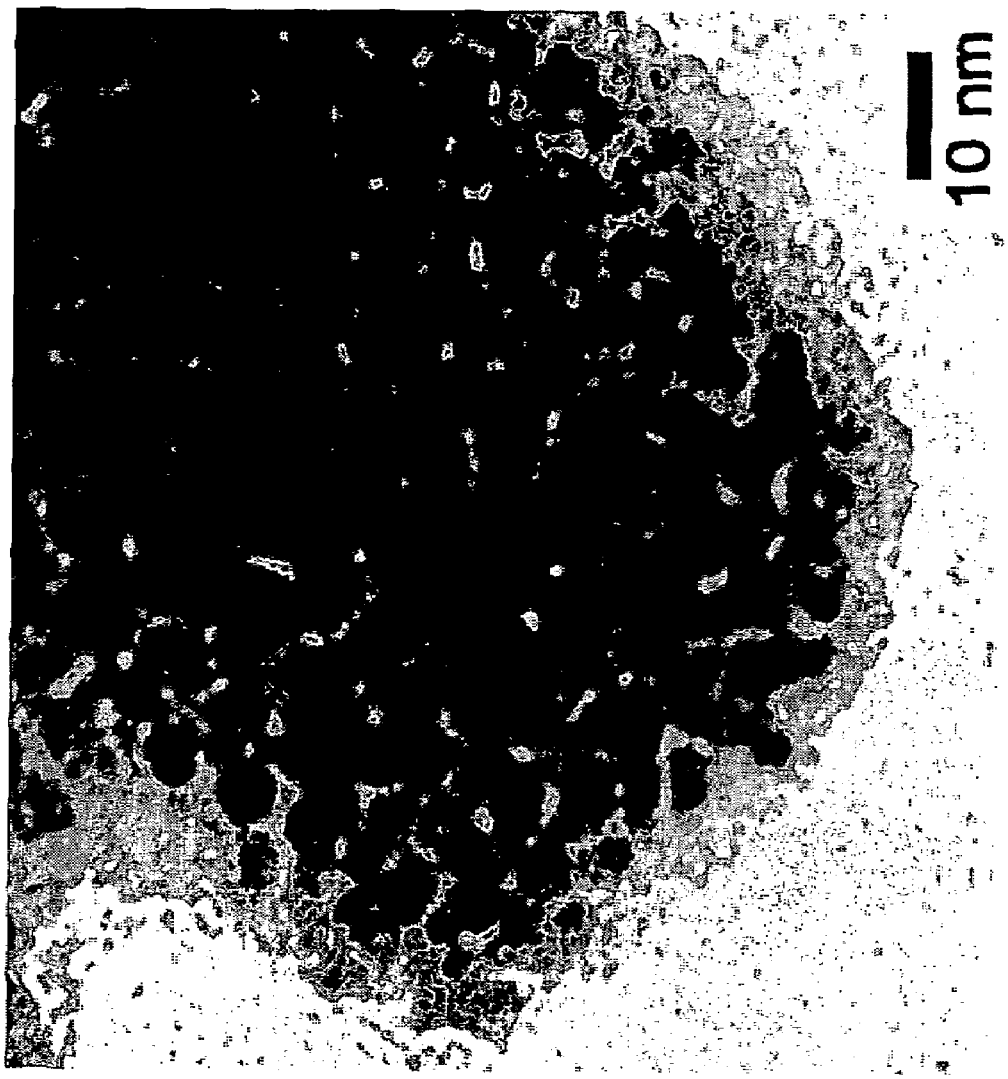
FIG. 8A is a TEM micrograph of exemplary nanoparticles according to this invention.
Figure 8B:
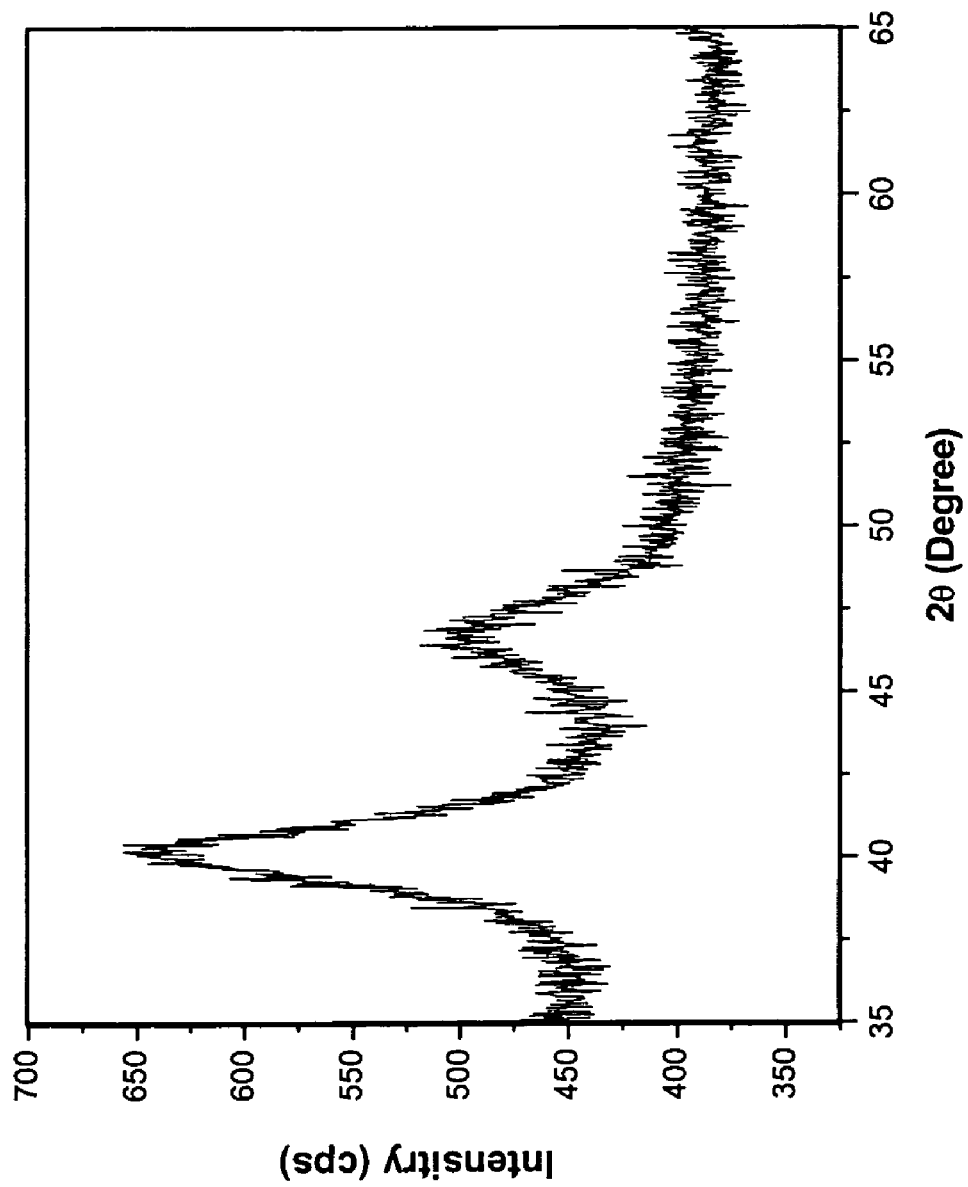
FIG. 8B is a graph showing XRD spectra of exemplary nanoparticles according to this invention.

TEM, XRD and EDX are conducted to characterize the obtained $CoPt_3$ nanoparticles. FIG. 8A is a TEM micrograph of the resulting nanoparticles. The main product of the reaction is spherical particles with an average size of 5 nm. FIG. 8B shows XRD analysis of the resulting particles. XRD analysis shows that the final product is $CoPt_3$. EDX shows that the particles are $Co_{22}Pt_{78}$.

Example 9

Synthesis of $CoPt_3$ Nanoparticles in Ionic Liquid 3 mL of freshly dried [BMI][$Tf_2N$] are mixed with 137 mg of 98% CTAB (Aldrich) in a 15 mL flask. The mixture is heated with a heating mantle under argon protection. The mixture is stirred vigorously with a magnetic stirrer. The mixture turns into a colorless transparent solution when the CTAB dissolves at 40° C. 50 mg of 99.99% Pt(acac)$_2$ (Aldrich) and 44 mg of 99.99% Co(acac)$_2$ (Aldrich) are dispersed in 1 mL of [BMIM][$Tf_2N$] and injected into the reaction mixture using a syringe at 350° C. The reaction temperature drops to approximately 325° C. and then returns to 350° C. in approximately five minutes. The reaction mixture is maintained at 350° C. for an additional hour before the reaction is terminated. At termination of the reaction, a black product is centrifuged from the reaction mixture at 12,000 RPM. The separated reaction product is washed twice with acetone and once with ethanol. A sample of the reaction product is dispersed acetone to prepare a specimen for analysis.

Figure 9A:
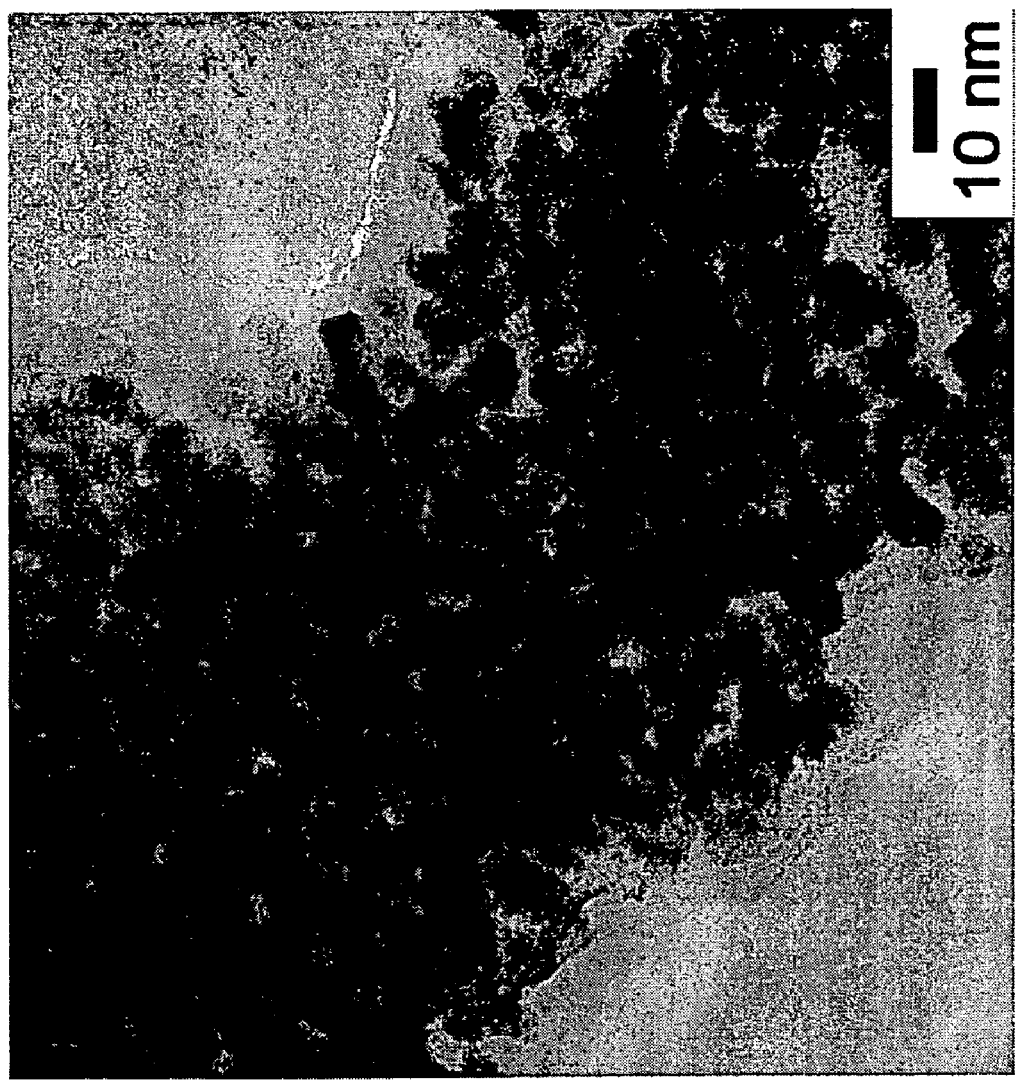
FIG. 9A is a TEM micrograph of exemplary nanoparticles according to this invention.
Figure 9B:
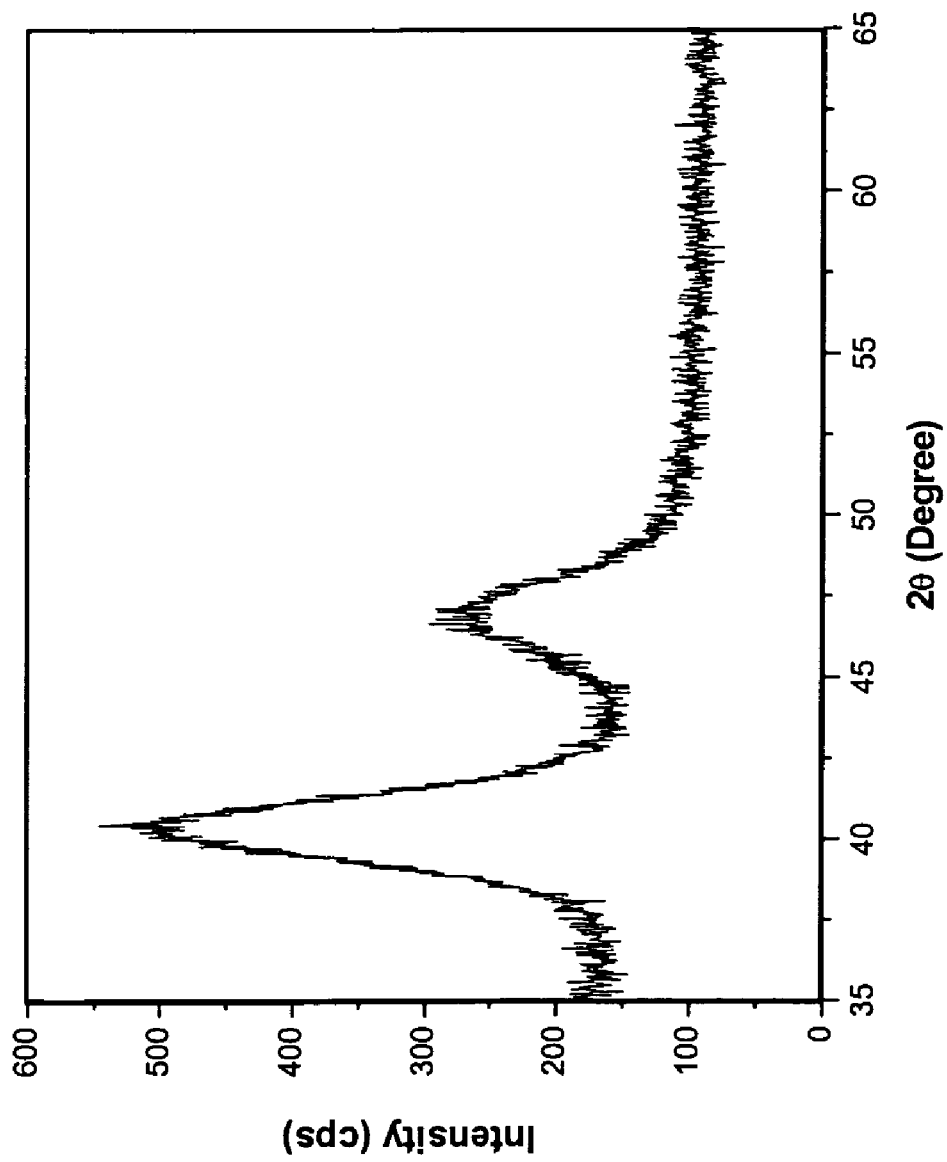
FIG. 9B is a graph showing XRD spectra of exemplary nanoparticles according to this invention.

TEM, XRD and EDX are conducted to characterize the obtained $CoPt_3$ nanoparticles. FIG. 9A is a TEM micrograph of the resulting nanoparticles. The main product of the reaction is spherical particles with an average size of 5 nm. FIG. 9B shows XRD analysis of the resulting particles. EDX shows that the particles are $Co_{35}Pt_{65}$.

Example 10

Synthesis of CoPt Nano-Rods in Ionic Liquid 3 mL of freshly dried [BMIM][$Tf_2N$] are mixed with 137 mg of 98% CTAB (Aldrich) in a 15 mL flask. The mixture is heated with a heating mantle under argon protection. The mixture is stirred vigorously with a magnetic stirrer. The mixture turns into a colorless transparent solution when the CTAB dissolves at 40° C. 50 mg of 99.99% Pt(acac)$_2$ (Aldrich) and 135 mg of 99.99% Co(acac)$_2$ (Aldrich) are dispersed in 1 mL of [BMIM][$Tf_2N$] and injected into the reaction mixture using a syringe at 350° C. The reaction temperature drops to approximately 325° C. and then returns to 350° C. in approximately five minutes. The reaction mixture is maintained at 350° C. for an additional hour before the reaction is terminated. At termination of the reaction, a black product is centrifuged from the reaction mixture at 12,000 RPM. The separated reaction product is washed twice with acetone and once with ethanol. A sample of the reaction product is dispersed acetone to prepare a specimen for analysis.

Figure 10A:
FIG. 10A is a TEM micrograph of exemplary nano-rods according to this invention.
Figure 10B:
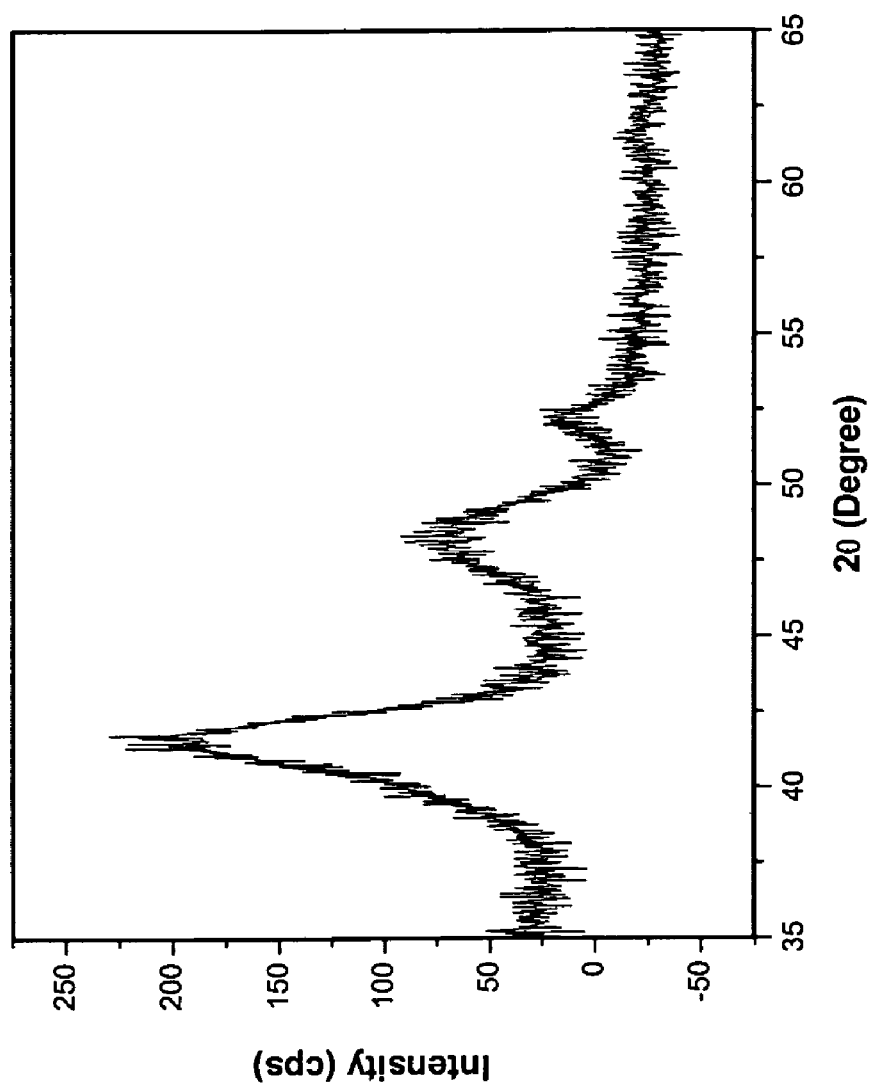
FIG. 10B is a graph showing XRD spectra of exemplary nano-rods according to this invention.

TEM, XRD and EDX are conducted to characterize the obtained CoPt nano-rods. FIG. 10A is a TEM micrograph of the resulting nano-rods. FIG. 10B shows XRD analysis of the resulting particles. EDX shows that the particles are $Co_{68}Pt_{32}$.

Example 11

Synthesis of CoPt Hyper-branched Nano-Rods in Ionic Liquid 3 mL of freshly dried [BMIM][$Tf_2N$] are mixed with 137 mg of 98% CTAB (Aldrich) in a 15 mL flask. The mixture is heated with a heating mantle under argon protection. The mixture is stirred vigorously with a magnetic stirrer. The mixture turns into a colorless transparent solution when the CTAB dissolves at 40° C. 5.5 mg of 99.99% Pt(acac)$_2$ (Aldrich) and 15 mg of 99.99% Co(acac)$_2$ (Aldrich) are dispersed in 1 mL of [BMIM][$Tf_2N$] and injected into the reaction mixture using a syringe at 350° C. The reaction temperature drops to approximately 325° C. and then returns to 350° C. in approximately five minutes. The reaction mixture is maintained at 350° C. for an additional hour before the reaction is terminated. At termination of the reaction, a black product is centrifuged from the reaction mixture at 12,000 RPM. The separated reaction product is washed twice with acetone and once with ethanol. A sample of the reaction product is dispersed acetone to prepare a specimen for analysis.

Figure 11:
FIG. 11 is a TEM micrograph of exemplary nano-rods according to this invention.

TEM is conducted to characterize the obtained CoPt hyper-branched nano-rods. FIG. 11 is a TEM micrograph of the resulting nano-rods.

Example 12

Synthesis of Co Nanoparticles in Ionic Liquid 3 mL of freshly dried [BMIM][$Tf_2N$] are mixed with 46 mg of 98% CTAB (Aldrich) in a 15 mL flask. The mixture is heated with a heating mantle under argon protection. The mixture is stirred vigorously with a magnetic stirrer. The mixture turns into a colorless transparent solution when the CTAB dissolves at 40° C. 48 mg of 99.99% Co(acac)$_2$ (Aldrich) are dispersed in 1 mL of [BMIM][$Tf_2N$] and injected into the reaction mixture using a syringe at 350° C. The reaction temperature drops to approximately 325° C. and then returns to 350° C. in approximately five minutes. The reaction mixture is maintained at 350° C. for an additional hour before the reaction is terminated. At termination of the reaction, a black product is centrifuged from the reaction mixture at 12,000 RPM. The separated reaction product is washed twice with acetone and once with ethanol. A sample of the reaction product is dispersed acetone to prepare a specimen for analysis.

Figure 12A:
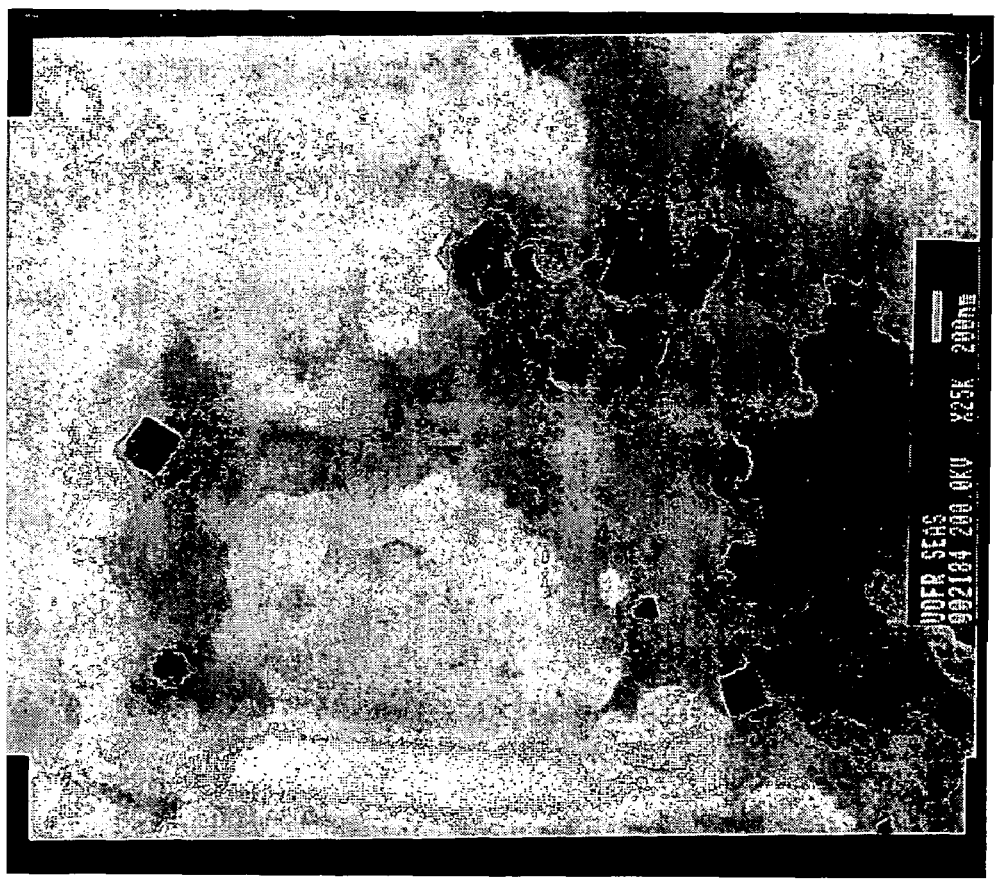
FIG. 12A is a TEM micrograph of exemplary nanoparticles according to this invention.
Figure 12B:
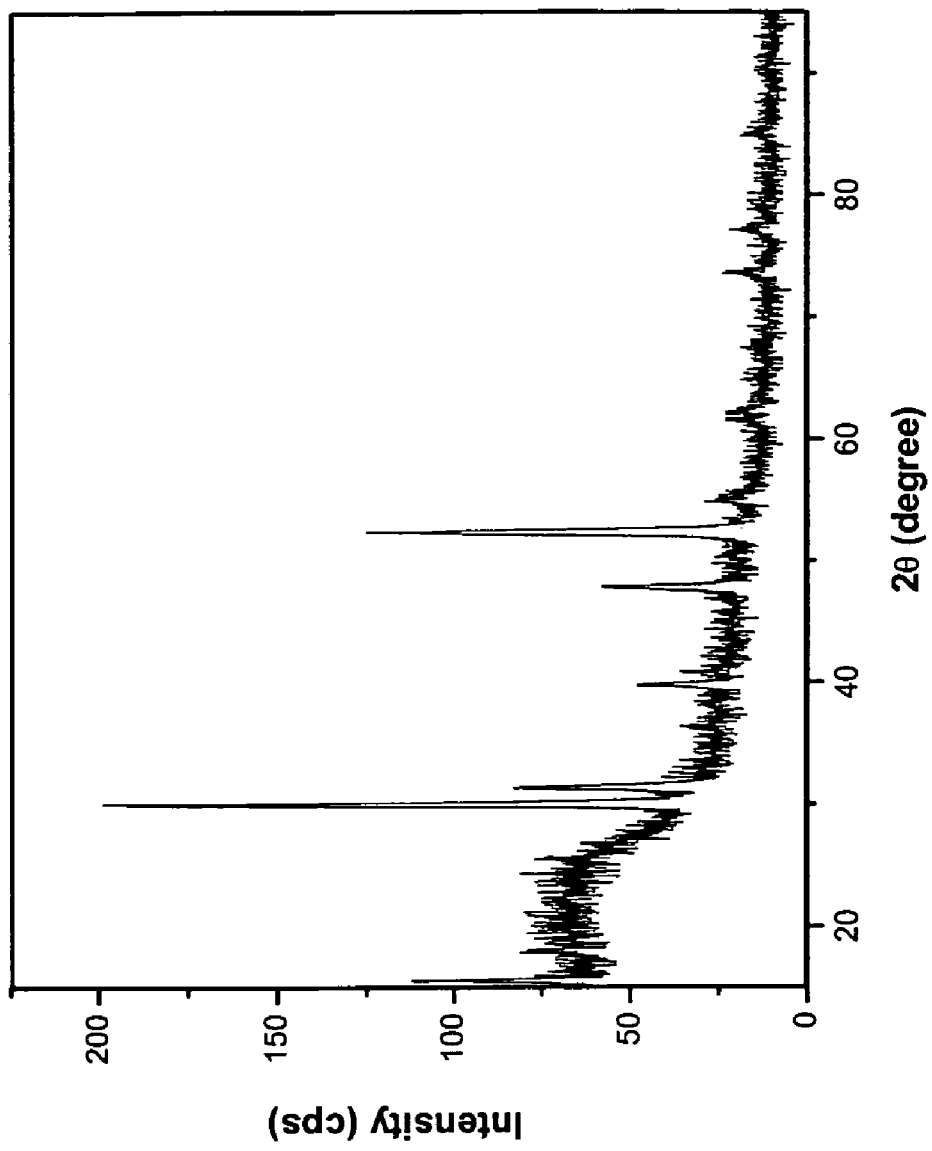
FIG. 12B is a graph showing XRD spectra of exemplary nanoparticles according to this invention.

TEM and XRD are conducted to characterize the obtained Co nanoparticles. FIG. 12A is a TEM micrograph of the resulting nanoparticles. FIG. 12B shows XRD analysis of the resulting particles. XRD analysis shows that the final product is Co.

Example 13

Synthesis of FePt Alloy Nanoparticles in Ionic Liquid 5 mL of freshly dried [BMIM][$Tf_2N$] are mixed with 49.5 mg of 99% Pt(acac)$_2$ (Aldrich), 40 μL of 99.99% oleic acid (Aldrich), 42.5 μL of 70% oleylamine (Aldrich) and 97.5 mg of 90% 1-hexandecandiol (Aldrich) in a 15 mL flask. The mixture is heated with a heating mantle under argon protection. The mixture is stirred vigorously with a magnetic stirrer.

The mixture turns into a transparent yellowish solution when the 1-hexandecandiol dissolves (or melts) at 75° C. 32.5 μL of 99.999% iron pentacarbonyl (Aldrich) are injected into the flask using a syringe at 110° C. The reaction mixture turns to a black-reddish color very quickly and turns completely dark when the temperature is raised to 140° C. The reaction mixture is heated to 280° C. over two hours from time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 13A:
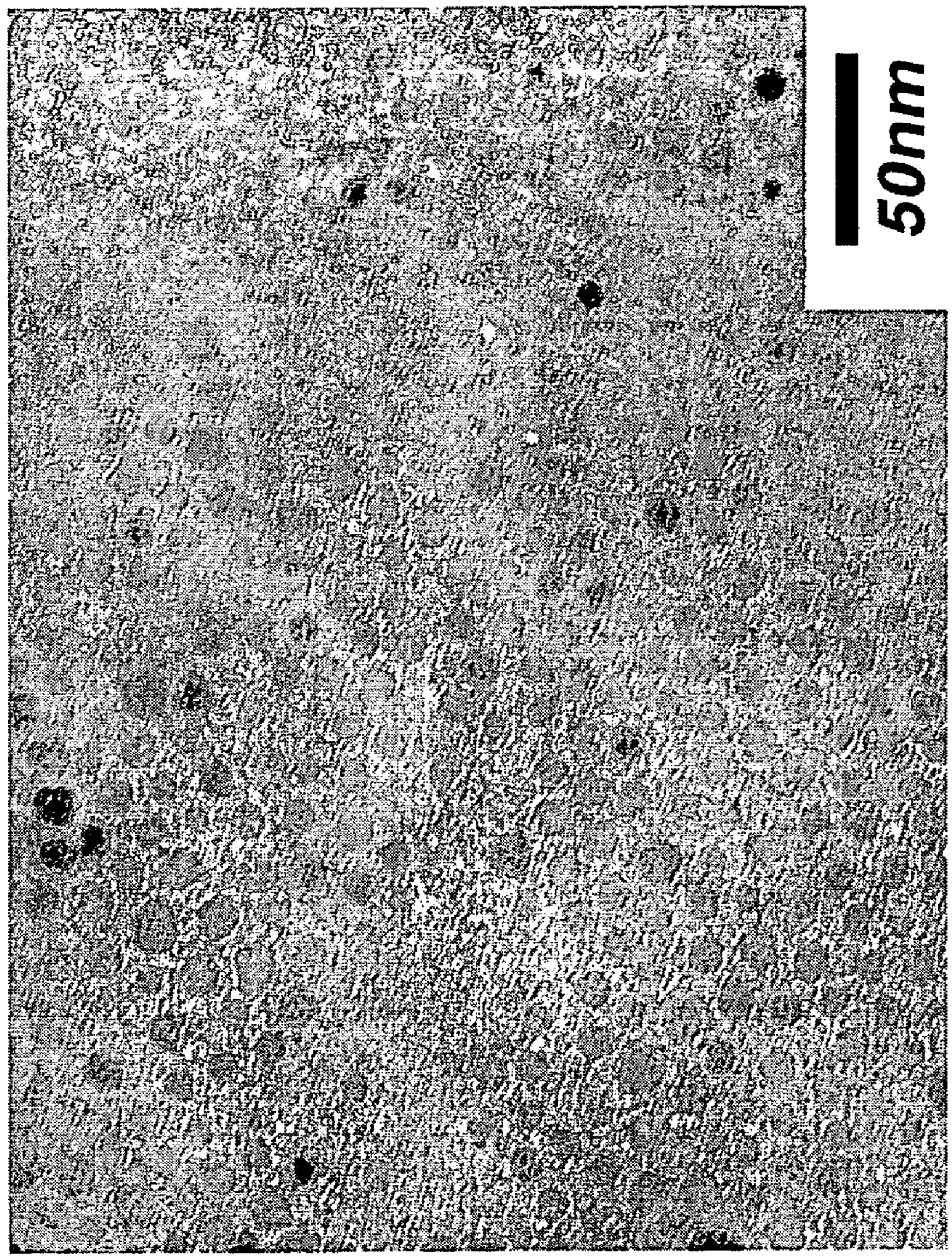
FIG. 13A is a TEM micrograph of exemplary nanoparticles according to this invention.
Figure 13B:
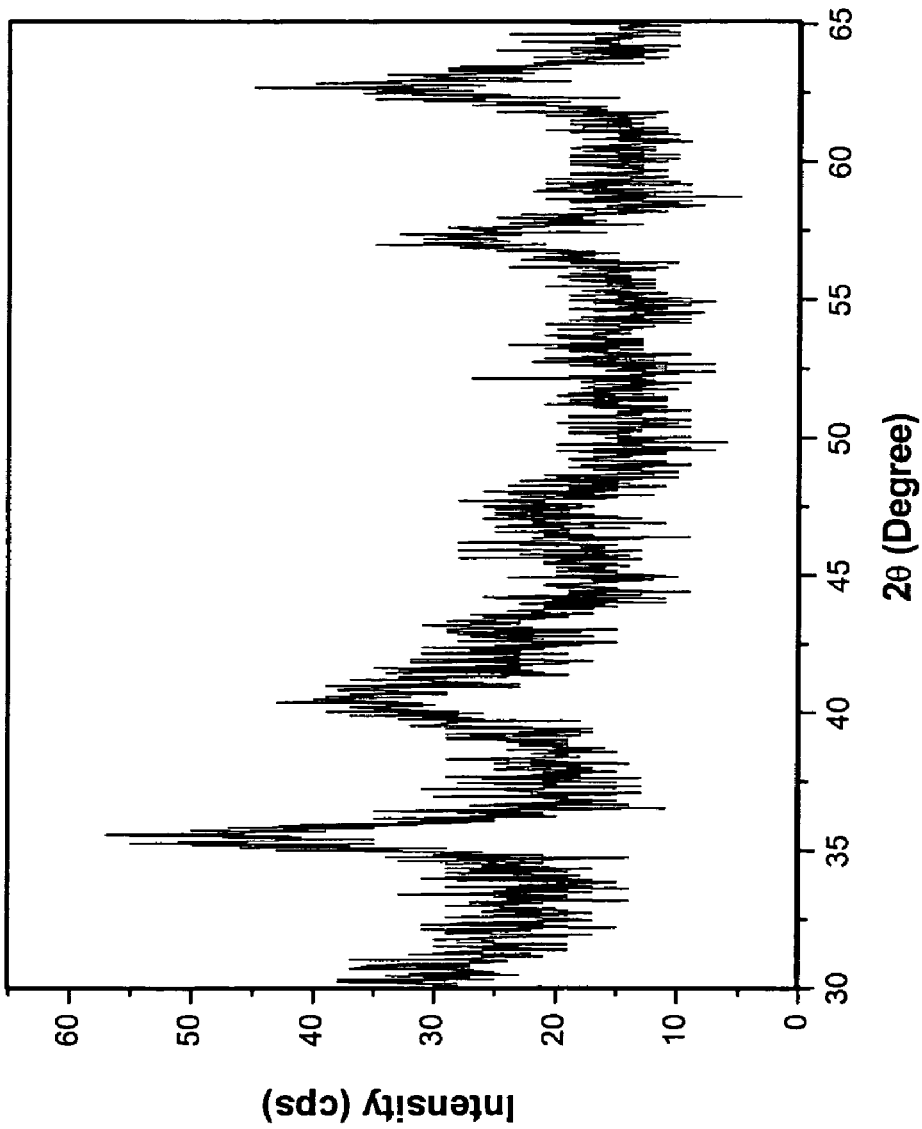
FIG. 13B is a graph showing XRD spectra of exemplary nanoparticles according to this invention.

TEM and XRD are conducted to characterize the obtained FePt nanoparticles. FIG. 13A is a TEM micrograph of the resulting nanoparticles. FIG. 13B shows XRD analysis of the resulting particles. XRD analysis shows that the final product is FePt alloy with $\gamma\text{-}Fe_2O_3$.

Example 14

Synthesis of Pt Nanoparticles in Ionic Liquid 3 mL of freshly dried [BMIM][Tf$_2$N] are mixed with 30.0 mg of 99% Pt(acac)$_2$ (Aldrich), 24 μL of 99.99% oleic acid (Aldrich), 25.5 μL of 70% oleylamine (Aldrich) and 58.5 mg of 90% 1-hexandecandiol (Aldrich) in a 15 mL flask. The mixture is heated with a heating mantle under argon protection. The mixture is stirred vigorously with a magnetic stirrer. The mixture turns into a transparent yellowish solution when the 1-hexandecandiol dissolves (or melts) at 75° C. The reaction mixture is heated to 230° C. over two hours from the time that the mixture was at room temperature and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane.

Figure 14A:
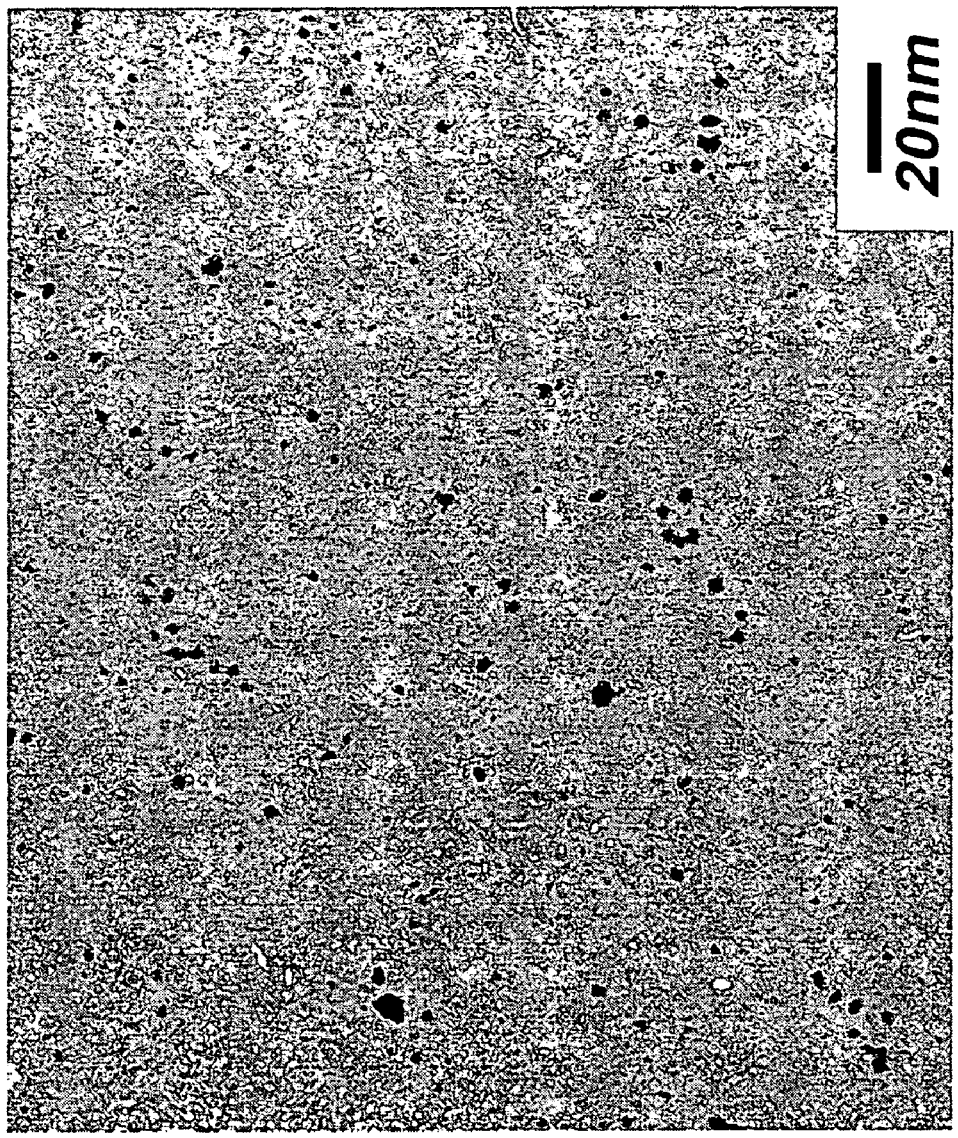
FIG. 14A is a TEM micrograph of exemplary nanoparticles according to this invention.
Figure 14B:
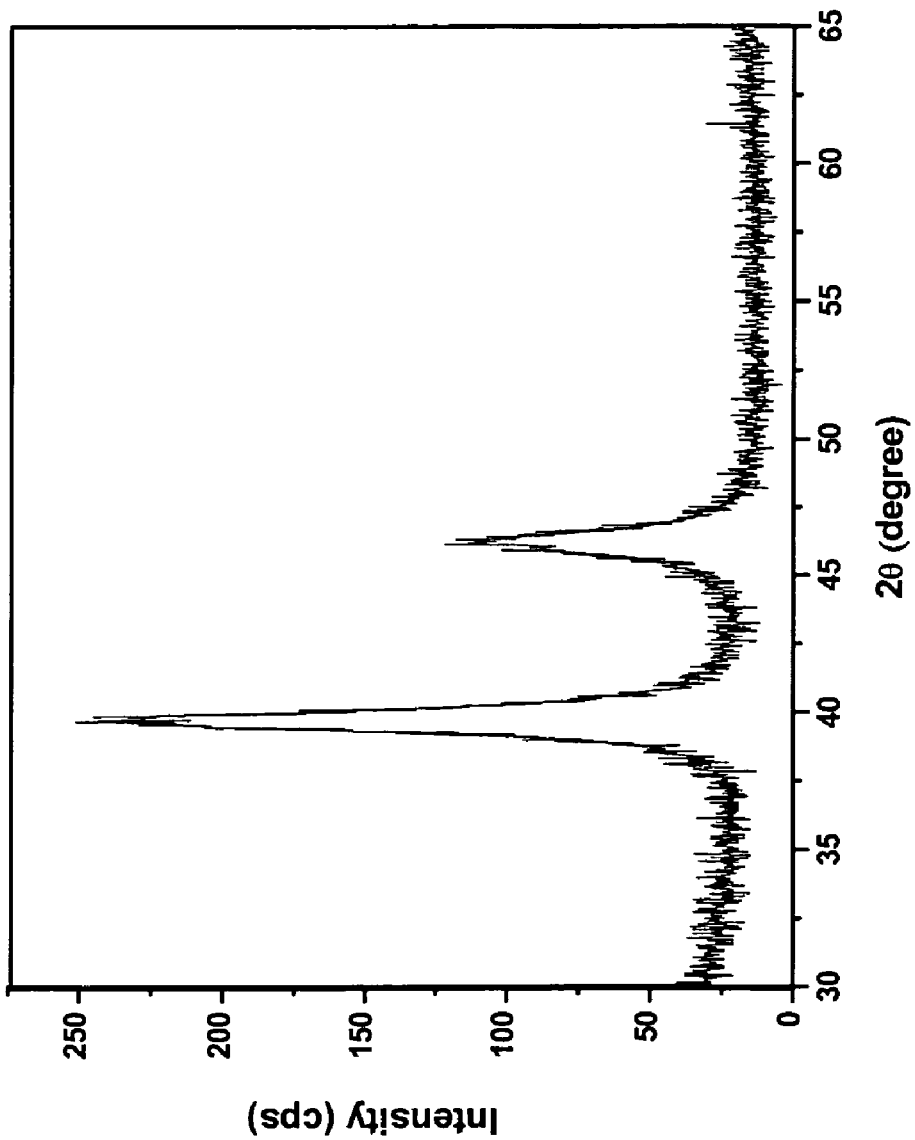
FIG. 14B is a graph showing XRD spectra of exemplary nanoparticles according to this invention.

TEM and XRD are conducted to characterize the obtained Pt nanoparticles. FIG. 14A is a TEM micrograph of the resulting nanoparticles. The main product of the reaction is spherical particles with an average size of approximately 2-3 nm. FIG. 14B shows XRD analysis of the resulting particles. The particles have the characteristic X-ray diffraction for cubic metallic Pt.

Example 15

Synthesis of SnO$_2$ Nanoparticles in Ionic Liquid 5 mL of freshly dried [BMIM][Tf$_2$N] are mixed with 86.7 mg of 99% SnCl$_4$ (Aldrich), 40.0 μL of 99.99% oleic acid (Aldrich) and 42.5 μL of 70% oleylamine (Aldrich) in a 15 mL flask. The mixture is heated with a heating mantle under argon protection. The mixture is stirred vigorously with a magnetic stirrer. The mixture turns into a transparent yellowish solution when the SnCl$_4$ dissolves at 75° C. The reaction mixture darkens and becomes completely dark at approximately 195° C. The reaction mixture is heated to 280° C. over approximately one hour from the time that the mixture was at room temperature and that temperature is maintained for another hour before the reaction is terminated. At termination of the reaction, the reaction mixture is a black solution with some solids suspended. Hexane is added as a layer over the reaction mixture. After mixing and separation, the hexane becomes brownish. Ethanol is added to the hexane to precipitate SnO$_2$ particles.

Figure 15:
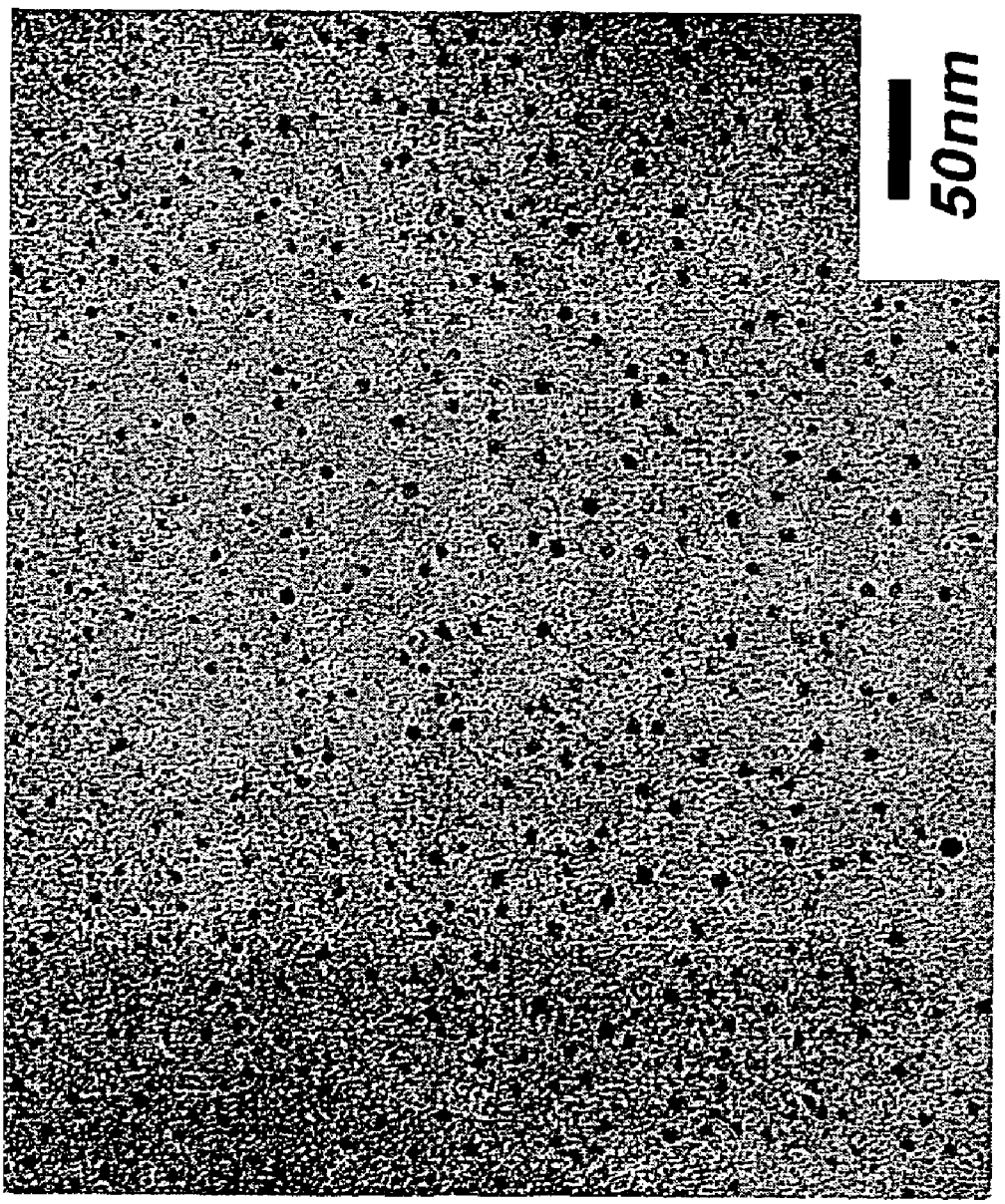
FIG. 15 is a TEM micrograph of exemplary nanoparticles according to this invention.

TEM is conducted to characterize the obtained SnO$_2$ nanoparticles. FIG. 15 is a TEM micrograph of the resulting nanoparticles. The main product of the reaction is monodisperse spherical particles with a size of 6 nm.

Example 16

Synthesis of CdS Nanoparticles in Ionic Liquid 5 mL of freshly dried [BMIM][Tf$_2$N] are mixed with 51 mg of 99% cadmium dimethyldicarbamate (Gelest), 80.0 μL of 99.99% oleic acid (Aldrich) and 396 μL of 70% oleylamine (Aldrich) in a 15 mL flask. The mixture is heated with a heating mantle under argon protection. The mixture is stirred vigorously with a magnetic stirrer. The mixture turns into a transparent greenish solution when the cadmium dimethyldicarbamate dissolves at 85° C. The reaction mixture darkens and becomes a brownish solution at approximately 200° C. The reaction mixture is heated to 300° C. over two hours from the time that the mixture was at room temperature and that temperature is maintained for another hour before the reaction is terminated. At termination of the reaction, the reaction mixture is a brownish solution with some solids suspended. Hexane is added as a layer over the reaction mixture. After mixing and separation, the hexane becomes brownish.

Example 17

Synthesis of Iron Oxide Nano-Cubes in Recycled Ionic Liquid 5 mL of freshly dried [BMIM][Tf$_2$N] are mixed with 160 μL of 99.99% oleic acid (Aldrich) in a 15 mL flask. The mixture is heated with a heating mantle under argon protection. The mixture is stirred vigorously with a magnetic stirrer. 32.5 μL of 99.999% iron pentacarbonyl (Aldrich) are injected into the flask using a syringe at 110° C. The reaction mixture turns light yellow after injection of the iron pentacarbonyl. The reaction mixture darkens and becomes completely dark at approximately 200° C. The reaction mixture is heated to 280° C. over two hours from the time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane. The collected materials are labeled Sample 1.

The ionic liquid from which Sample 1 is separated is recycled by passing the liquid through a short column of alumina. 3 mL of the freshly dried ionic liquid are mixed with 96 μL of 99.99% oleic acid in a 15 mL flask. The mixture is heated with a heating mantle under argon protection. The mixture is stirred vigorously with a magnetic stirrer. 20.0 μL of 99.999% iron pentacarbonyl (Aldrich) are injected into the flask using a syringe at 110° C. The reaction mixture turns yellow after injection of the iron pentacarbonyl. The reaction mixture darkens and becomes completely dark at approximately 200° C. The reaction mixture is heated to 280° C. over two hours from the time of the injection of the iron pentacarbonyl and that temperature is maintained for another hour before the reaction is terminated. At termination of the reaction, oil-like black solid materials adhere to the wall of the flask and a light yellowish transparent ionic liquid can easily be separated out. The solid materials on the wall are collected by washing with hexane. The collected materials are labeled Sample 2.

Figure 16A:
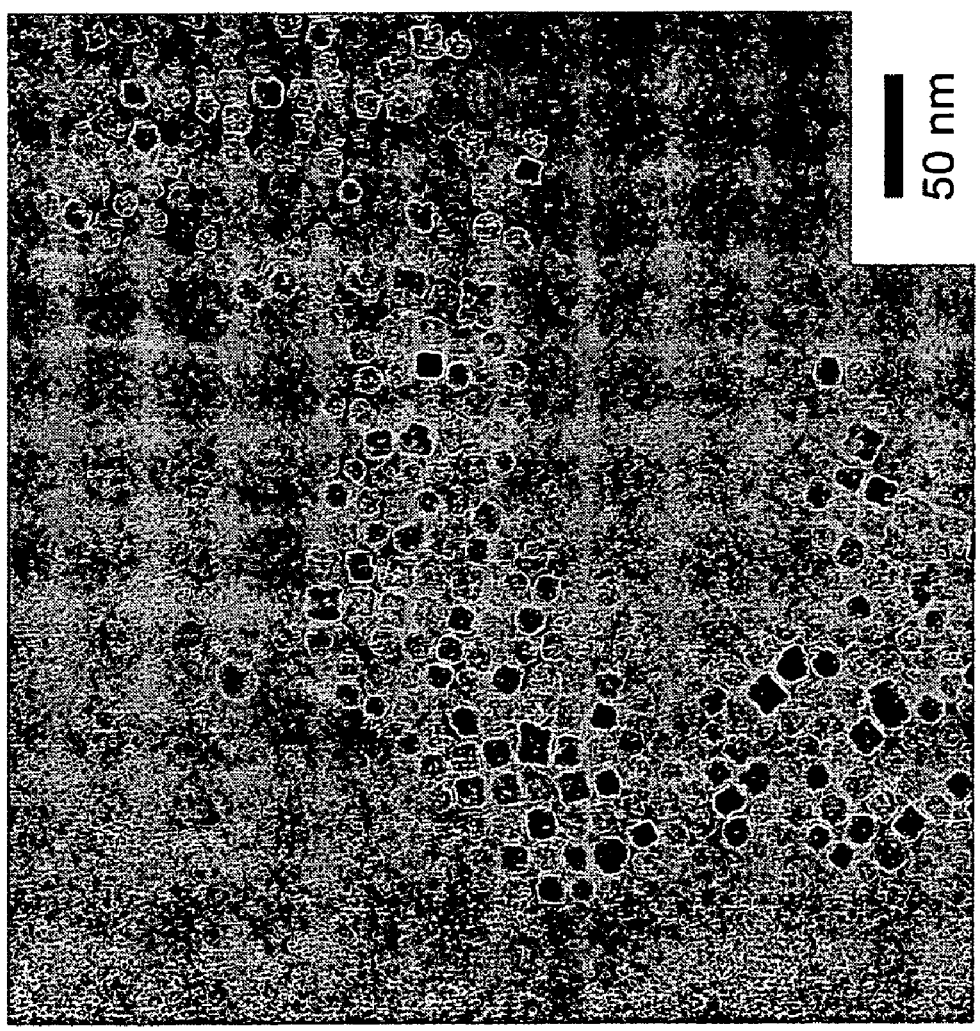
FIG. 16A is a TEM micrograph of exemplary nano-cubes according to this invention.
Figure 16B:
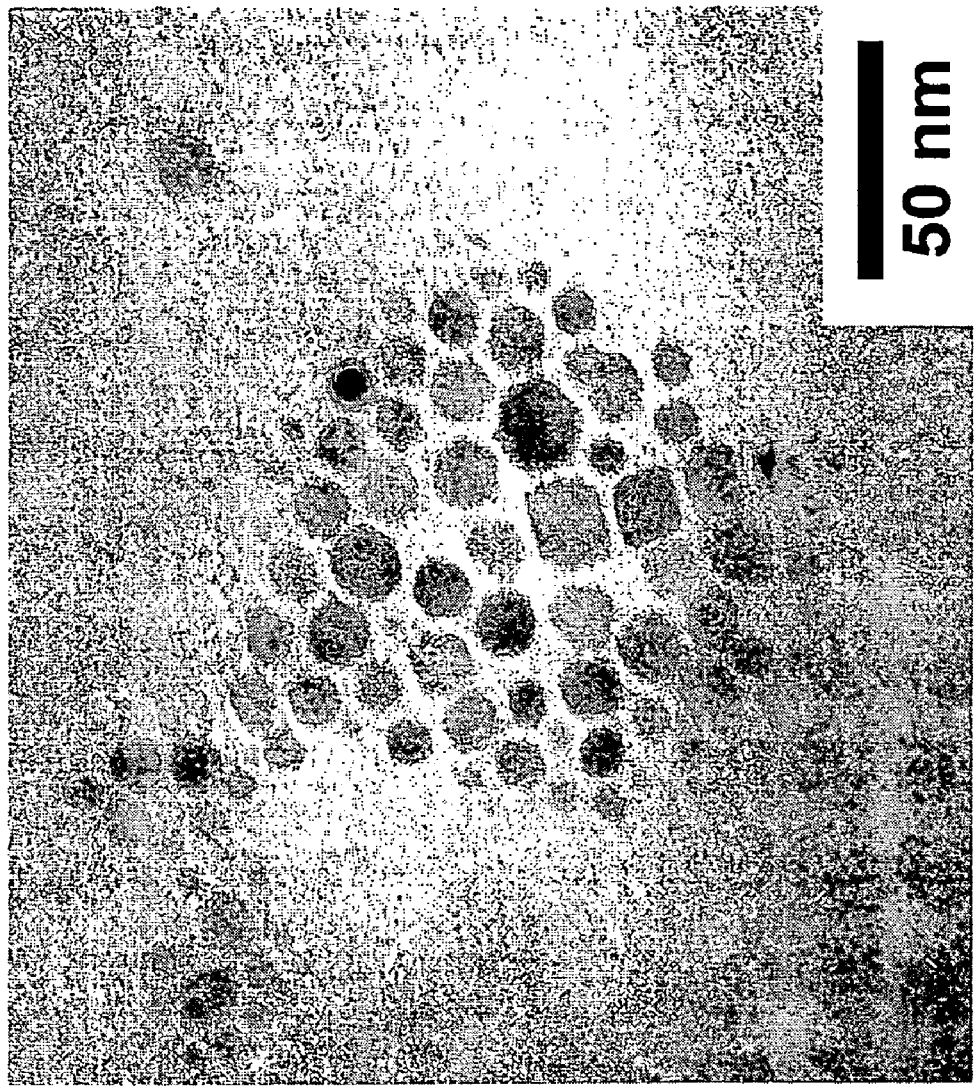
FIG. 16B is a TEM micrograph of exemplary nano-cubes according to this invention.

TEM is conducted to characterize the obtained iron oxide nano-cubes of Samples 1 and 2. FIG. 16A is a TEM micrograph of the nano-cubes of Sample 1. The main product of the reaction forming Sample 1 is cubic particles with an average size of 10 nm. FIG. 16B is a TEM micrograph of the nanocubes of Sample 2. The main product of the reaction forming Sample 2 is cubic particles with an average size of 10 nm.

Example 18

Preparation of Iron Oxide Nanoparticles in Repetitively Recycled Ionic Liquid

A. Preparation of Iron Oxide Nanoparticles From New Ionic Liquid.

5 mL of freshly dried [BMIM][Tf$_2$N] are mixed with 33 µL of 99.999% iron pentacarbonyl (Aldrich) in a 25 mL three-neck flask at room temperature. The mixture is heated with a heating mantle under argon protection. The mixture is vigorously stirred with a magnetic stirrer. The heating mantle is controlled with a temperature controller to increase the temperature to 280° C. at a rate of 2° C./minute. When the temperature of the mixture reaches 165° C., 120 µL of 99.99% oleic acid (Aldrich) are injected into the flask and the yellow (brownish) mixture turns white and a black product subsequently forms. When the temperature of the mixture reaches 280° C., the temperature is maintained for 1 hour. A solid reaction product can be found mostly and the wall of the flask. The flask further contains a light yellowish transparent ionic liquid. The solid reaction product can be decanted from the light yellowish transparent ionic liquid in the flask by decanting. The solid reaction product is dissolved and collected using approximately 4 mL of hexane.

The ionic liquid is collected using a pipette and the volume of the collected ionic liquid is measured. The ionic liquid is kept in centrifuge tubes and washed with equal amounts of hexane for 3 cycles. The washed ionic liquid is dried under vacuum at 110° C.

B. Preparation of Iron Oxide Nanoparticles From Recycled Ionic Liquid 3 mL of the washed ionic liquid are mixed with 2 mL of freshly dried [BMIM][Tf$_2$N]. Iron oxide nanoparticles and washed ionic liquid are obtained by the procedure set forth in section A above. This procedure was repeated four times to obtain five samples of iron oxide nanoparticles—one from new ionic liquid and four from recycled ionic liquid.

C. Characterization.

Figure 17A:
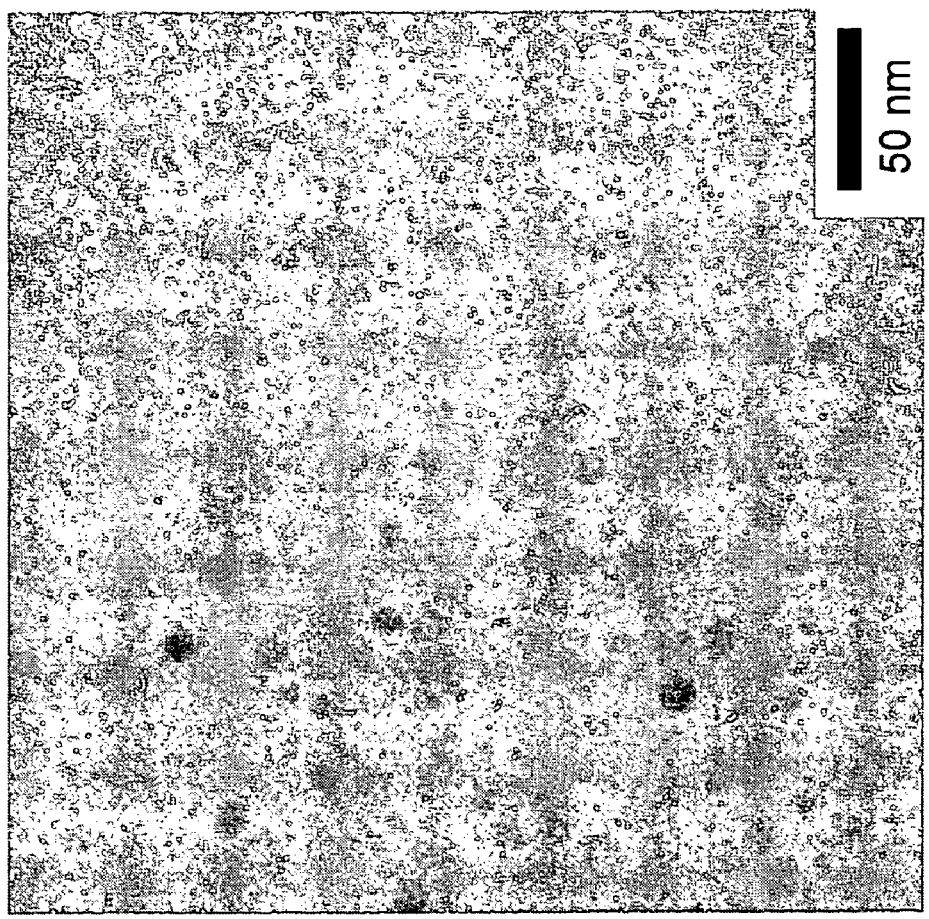
FIG. 17A is a TEM micrograph of exemplary nanoparticles according to this invention obtained using new ionic liquid.
Figure 17B:
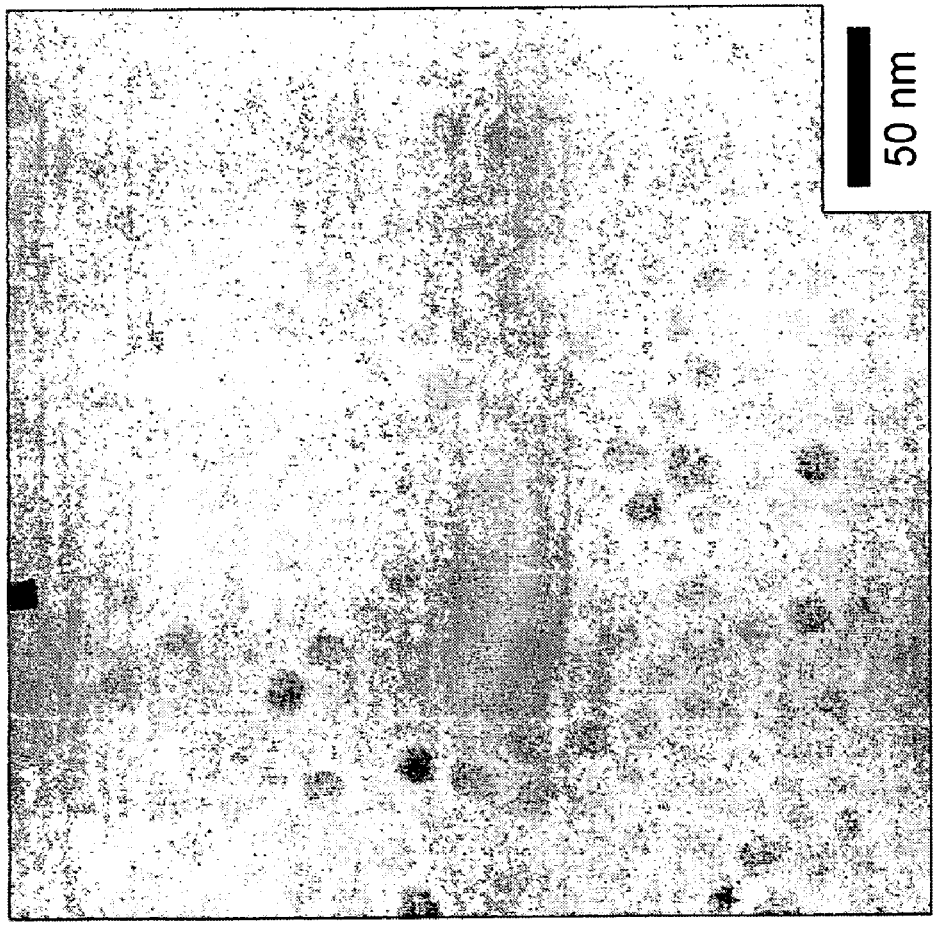
FIG. 17B is a TEM micrograph of exemplary nanoparticles according to this invention obtained using once recycled ionic liquid.
Figure 17C:
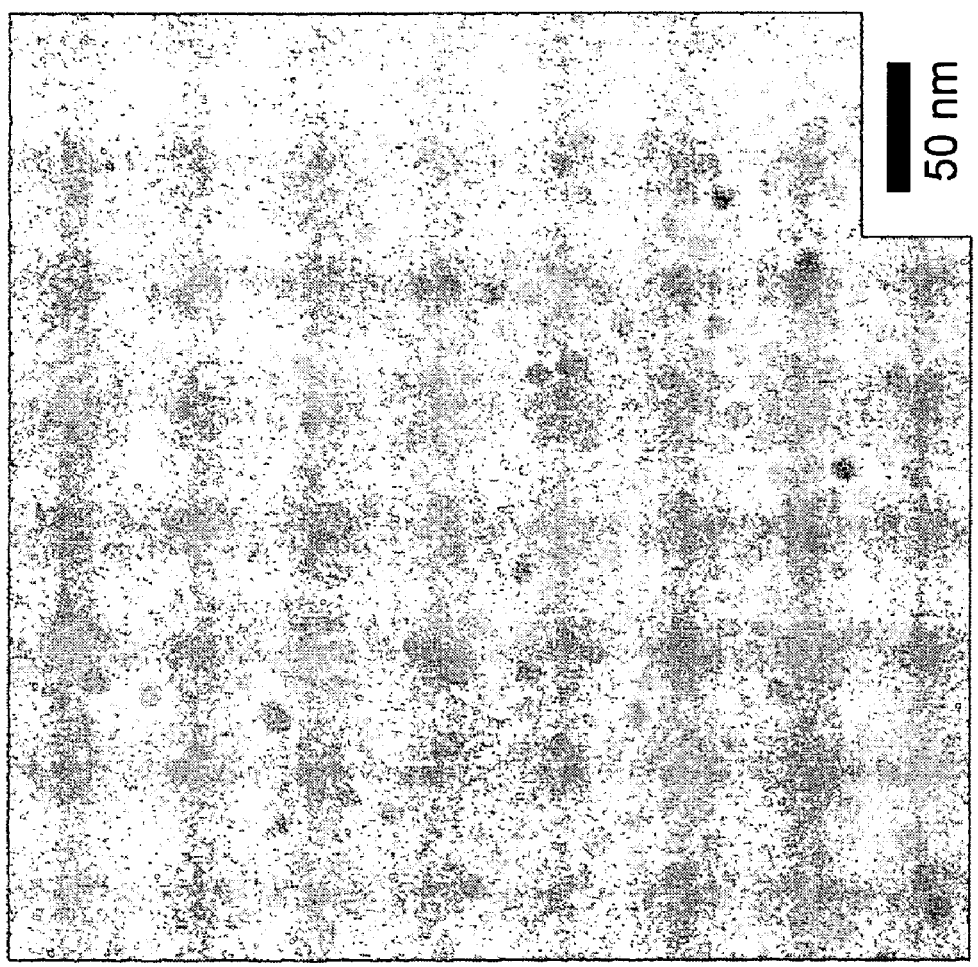
FIG. 17C is a TEM micrograph of exemplary nanoparticles according to this invention obtained using twice recycled ionic liquid.
Figure 17D:
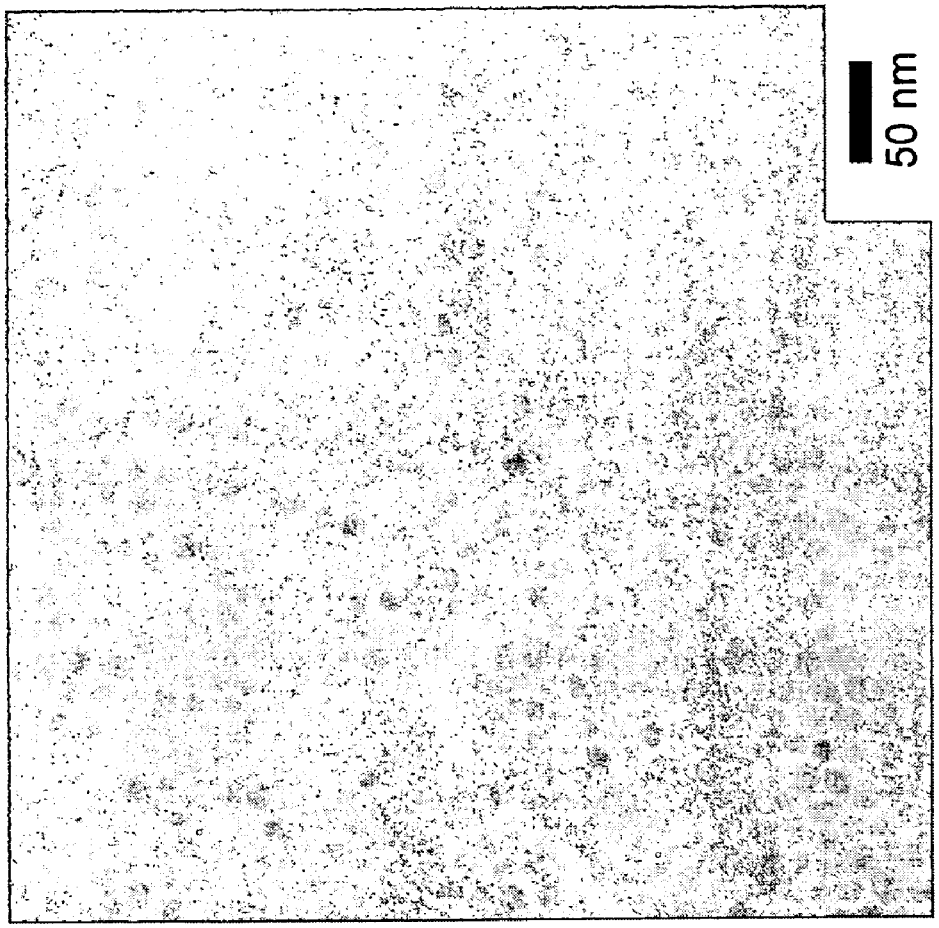
FIG. 17D is a TEM micrograph of exemplary nanoparticles according to this invention obtained using three times recycled ionic liquid.
Figure 17E:
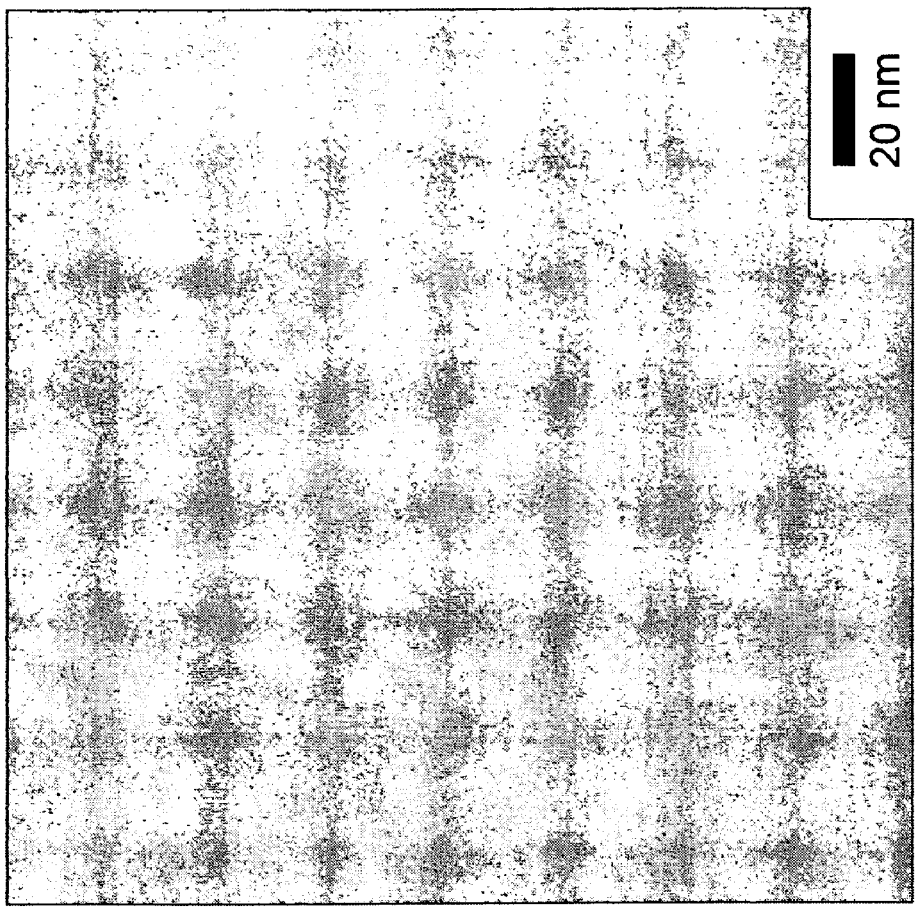
FIG. 17E is a TEM micrograph of exemplary nanoparticles according to this invention obtained using four times recycled ionic liquid.
Figure 17F:
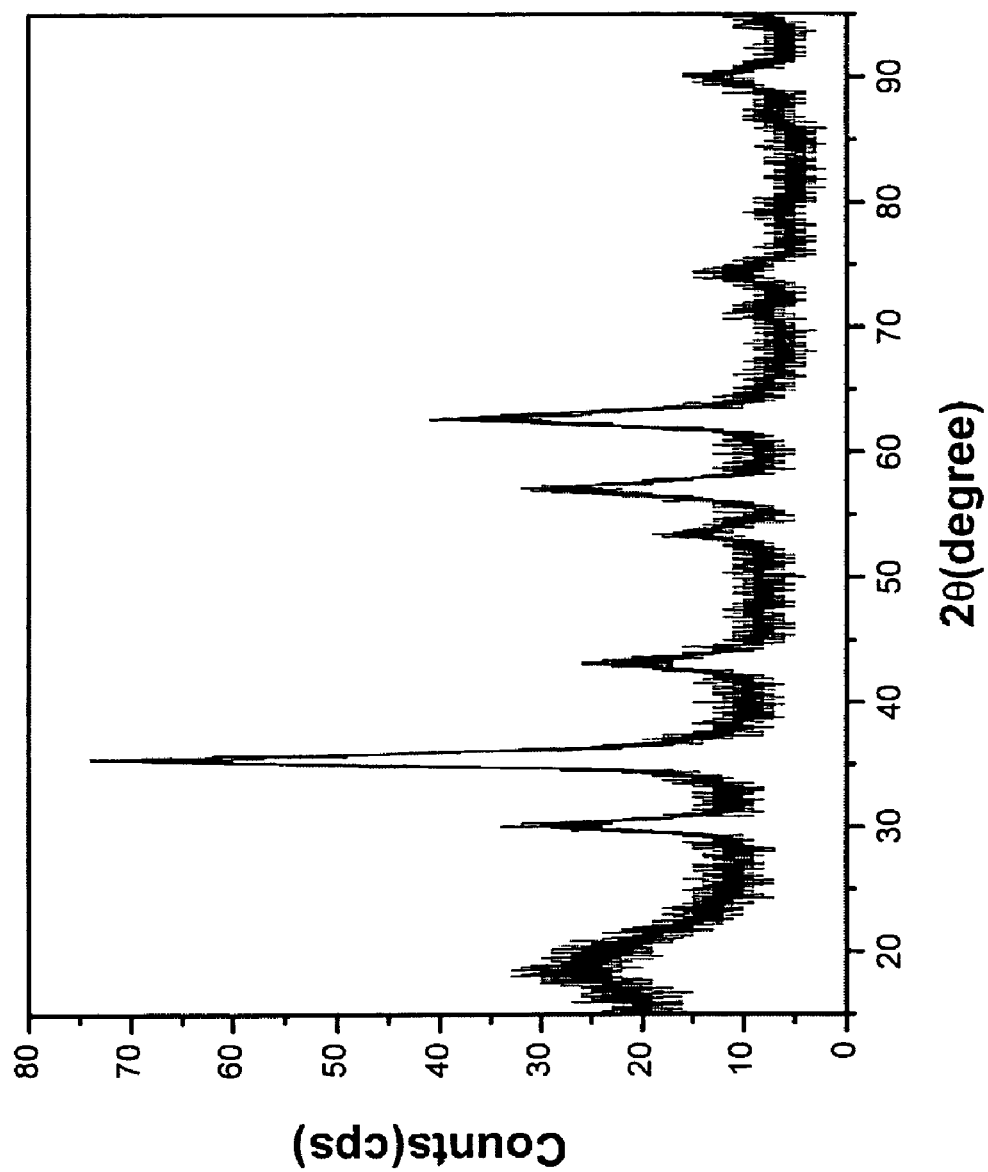
FIG. 17F is a graph showing XRD spectra of exemplary nanoparticles according to this invention obtained using new ionic liquid.
Figure 17G:
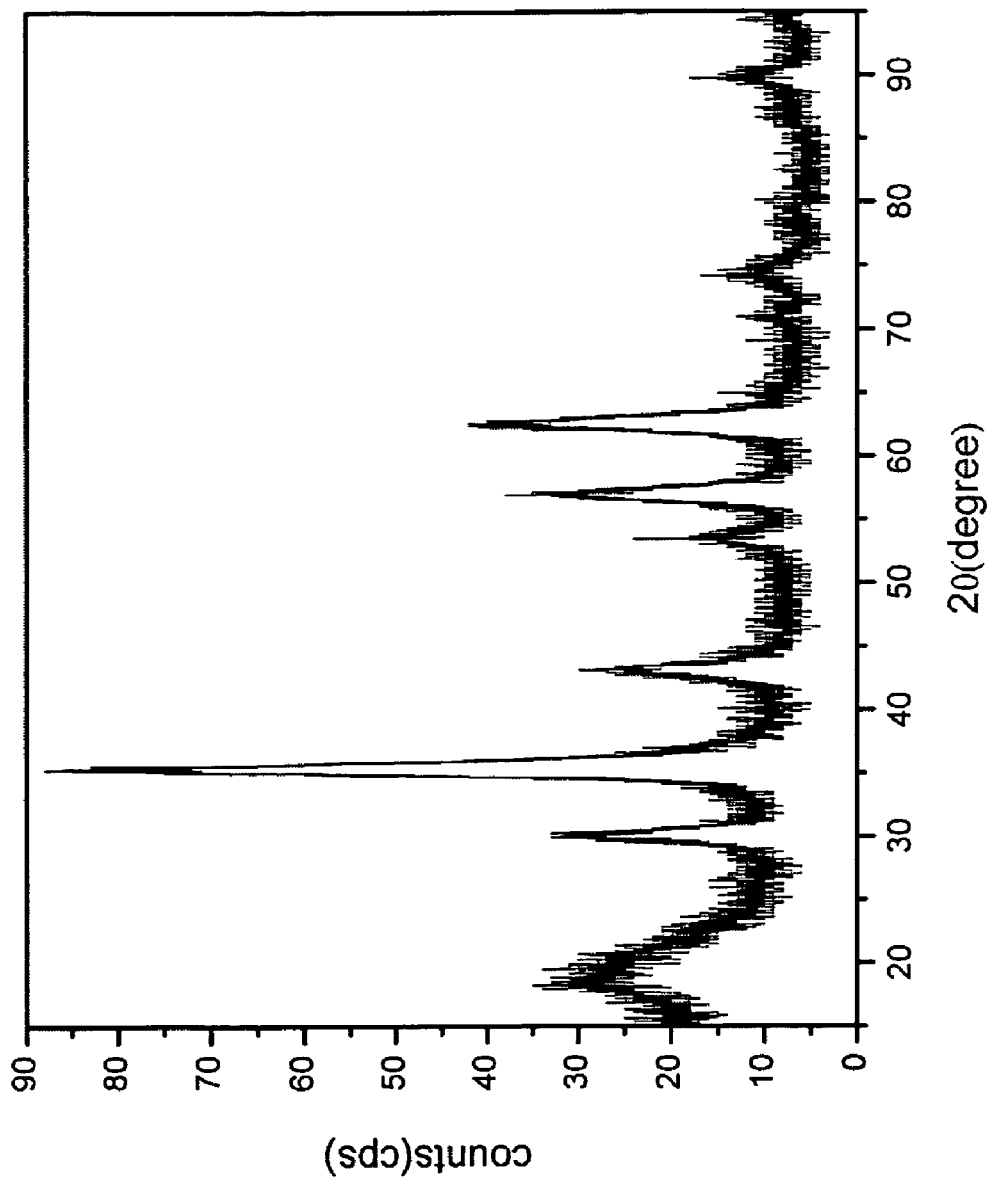
FIG. 17G is a graph showing XRD spectra of exemplary nanoparticles according to this invention obtained using four times recycled ionic liquid.

TEM and XRD are conducted to characterize the obtained iron oxide nanoparticles. FIG. 17A is a TEM micrograph of particles obtained using new ionic liquid. FIG. 17B is a TEM micrograph of particles obtained using ionic liquid obtained from the first recycling. FIG. 17C is a TEM micrograph of particles obtained using ionic liquid obtained from the second recycling. FIG. 17D is a TEM micrograph of particles obtained using ionic liquid obtained from the third recycling. FIG. 17E is a TEM micrograph of particles obtained using ionic liquid obtained from the fourth recycling. FIG. 17F shows XRD analysis of particles obtained using new ionic liquid. FIG. 17G shows XRD analysis of particles obtained using ionic liquid obtained from the fourth recycling. Analysis shows that all of the particles have a crystal structure of γ-Fe$_2$O$_3$.

Example 19

Synthesis of CdSe Nanoparticles in Ionic Liquid

A. Synthesis of CdSe Nanocrystals Smaller Than 3 nm 10 mg 90% CdO (Aldrich) are mixed with 3 mL freshly dried [BMIM][Tf$_2$N] and 205 µL 90% bis-(2,2,4-trimethylpentyl)phosphinic acid (TMPPA) (Aldrich) at room temperature and heated to 260° C. CdO only partially dissolves at 260° C. This mixture is further heated to 300° C. and the temperature is maintained for 6 hours. CdO dissolves completely and the mixture takes on a gray color. In a glove box, 45 mg 99.99% selenium powder (Aldrich) is mixed with 435 µL of 90% trioctylphosphine (TOP). The resulting mixture is vortexed for at least 10 minutes to form a colorless solution. The colorless solution and 2 mL freshly dried [BMIM][Tf$_2$N] are injected simultaneously into the gray mixture with two separate syringes. The resulting turns black and the temperature is quickly reduced to 190-200° C. The temperature is maintained for 20 minutes and then the heating source is removed. After the reaction, two layers are obtained: a bottom brownish layer of [BMIM][Tf$_2$N] and a top layer of oil-like black liquid.

The [BMIM][Tf$_2$N] is diluted with acetone and the mixture is centrifuged at 7,000 rpm for 5 minutes. A reddish precipitate is found at the bottom of the centrifuge tube. Hexane was added to the centrifuge tube and a light yellowish solution is obtained. The yellowish solution is centrifuged at 3,000 rpm to remove any suspended material. The resulting solution is placed under a 368 nm wavelength ultraviolet lamp, and yields greenish light.

The oil-like black liquid is diluted with hexane and ethanol is added. The resulting mixture is centrifuged at 7,000 rpm for 5 minutes. A reddish precipitate is found at the bottom of the centrifuge tube. Hexane was added to the centrifuge tube and a light yellowish solution is obtained. The yellowish solution is centrifuged at 3,000 rpm to remove any suspended material. The resulting solution is placed under a 368 nm wavelength ultraviolet lamp, and yields greenish light.

B. Synthesis of 3 nm CdSe Nanocrystals.

6.3 mg 90% CdO (Aldrich) are mixed with 3.208 µL freshly dried [BMIM][Tf$_2$N] and 69 µL 0% TMPPA (Aldrich) at room temperature and heated to 260° C. CdO only partially dissolves at 260° C. This mixture is further heated to 300° C. and the temperature is maintained for 6 hours. CdO dissolves completely and the mixture takes on a brownish yellow color. In a glove box, 33 mg 99.99% selenium powder (Aldrich) is mixed with 296 µL of 90% TOP. The resulting mixture is vortexed for at least 10 minutes to form a colorless solution. The colorless solution, 69 µL TMPPA and 1.07 mL freshly dried [BMIM][Tf$_2$N] are injected simultaneously into the brownish yellow mixture, and the resulting mixture turns reddish. The temperature is quickly reduced to 190-200° C. and the mixture takes on a black color. The temperature is maintained for 60 minutes and then the heating source is removed. After the reaction, a reddish solid forms on the reaction flask wall. The reddish solid is extracted with hexane. The extraction solution is precipitated with alcohol and the precipitate is dissolved in hexane. The solution is characterized with ultraviolet-vis spectroscopy. The absorbance peak for the sample is 530 to 540 nm. The particles have a diameter of from 2.4 to 2.9 nanometers based on reference.

C. Synthesis of 6 nm Spherical CdSe Nanocrystals.

15 mg 90% CdO (Aldrich) are mixed with 5 mL freshly dried [BMIM][Tf$_2$N] and 0.2 mL 90% oleic acid (Aldrich) at room temperature. The mixture is stirred and takes on rust/reddish color. The mixture is heated and separates into two phases, the upper phase having a red color. The upper layer disappears at 190° C. and the mixture becomes uniformly light yellowish. This mixture is further heated to 300° C. In a glove box, 5 mg 99.99% selenium powder (Aldrich) are mixed with 200 µL of 90% TOP. The resulting mixture is vortexed for at least 10 minutes to form a colorless solution. The colorless solution is injected into the light yellowish mixture, and the resulting mixture turns black. The temperature is quickly reduced to 220° C. The temperature is maintained for 30 minutes and then the heating source is removed. After the reaction, a black solid forms on the reaction flask wall. The black solid is extracted with hexane. The extraction solution is diluted. The resulting solution is placed under a 368 nm wavelength ultraviolet lamp, and yields reddish light. The solution is characterized with ultraviolet-vis spectroscopy. A broad absorbance peak for the sample is found at 624 nm.

D. Synthesis of Rod-Shaped CdSe Nanocrystals.

17 mg 90% CdO (Aldrich) are mixed with 5 mL freshly dried [BMIM][Tf$_2$N] and 0.5 mL 90% oleic acid (Aldrich) at room temperature. The mixture is stirred and takes on rust/reddish color. The mixture is heated and separates into two phases, the upper phase having a red color. The upper layer disappears at 170° C. and the mixture becomes uniformly light yellowish. This mixture is further heated to 300° C. In a glove box, 10 mg 99.99% selenium powder (Aldrich) are mixed with 450 μL of 90% TOP (Aldrich). The resulting mixture is vortexed for at least 10 minutes to form a colorless solution. The colorless solution is injected into the light yellowish mixture, and the resulting mixture turns black. The temperature is quickly reduced to 230° C. The temperature is maintained for 60 minutes and then the heating source is removed. After the reaction, a black solid forms on the reaction flask wall. The black solid is extracted with hexane. The extraction solution is diluted. The resulting solution is placed under a 368 nm wavelength ultraviolet lamp, and yields reddish light. The solution is characterized with ultraviolet-vis spectroscopy. A broad absorbance peak for the sample is found at 650 mn. TEM characterization shows rod-shaped particles.

E. Characterization.

Figure 18A:
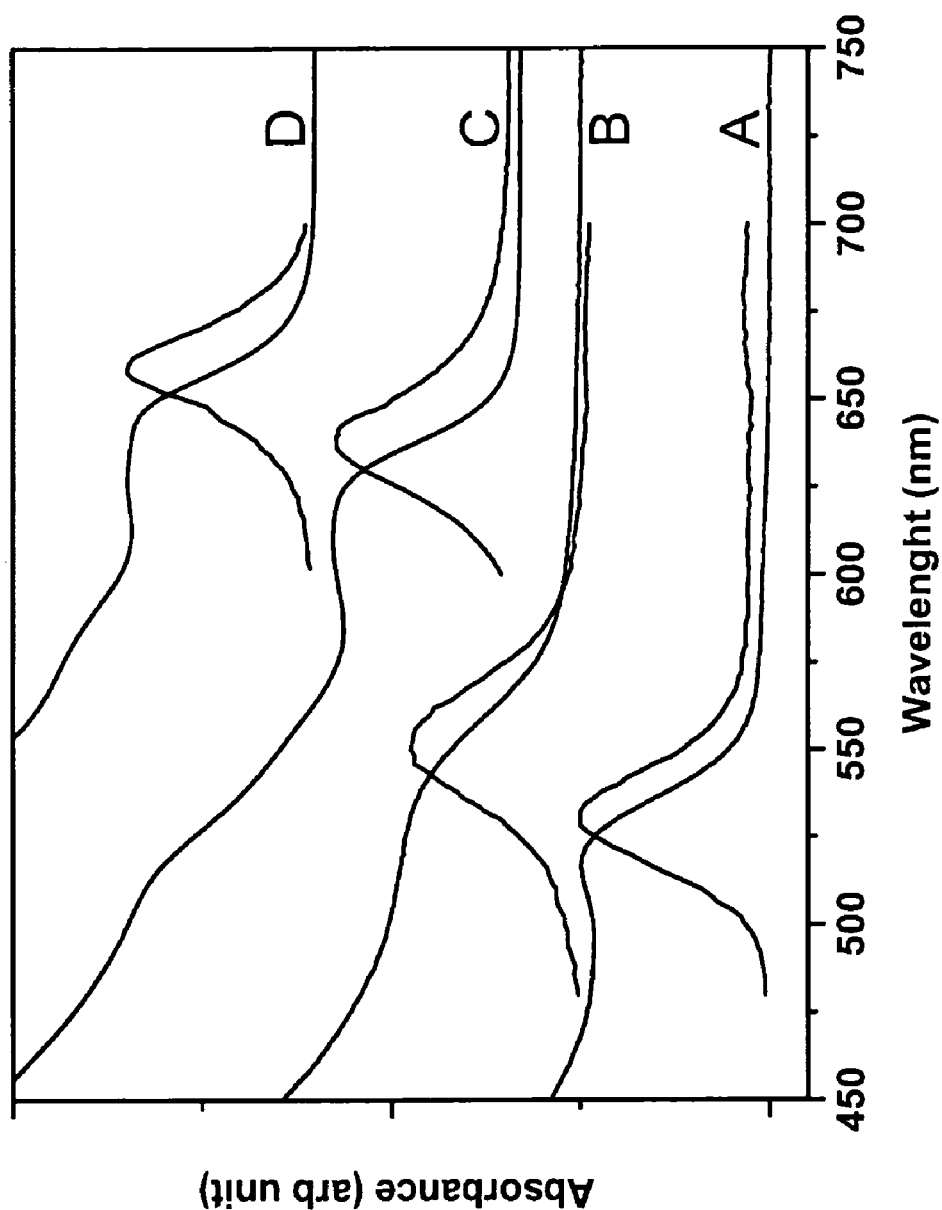
FIG. 18A is a graph showing ultraviolet-vis spectroscopy analysis of exemplary CdSe nanocrystals according to this invention.
Figure 18B:
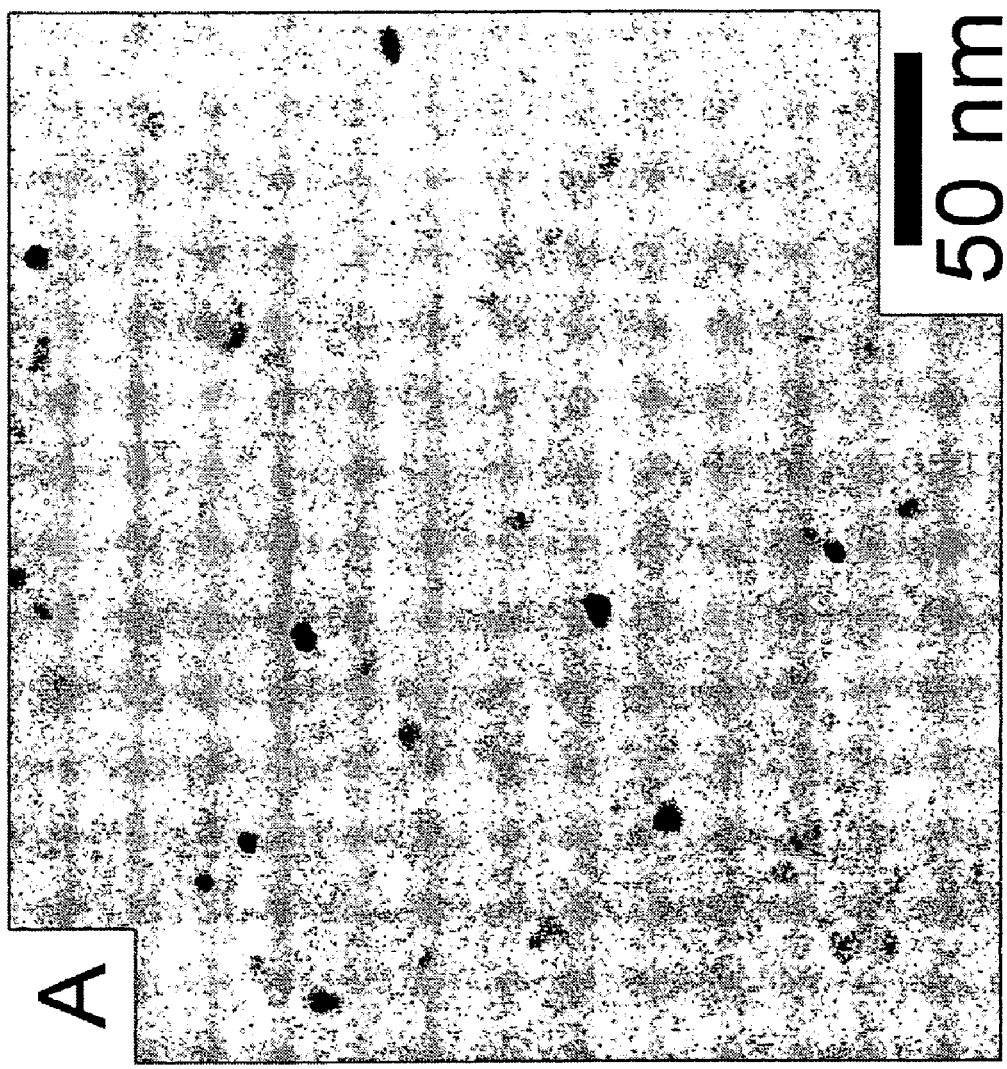
FIG. 18B is a TEM micrograph of exemplary CdSe nanocrystals according to this invention.
Figure 18C:
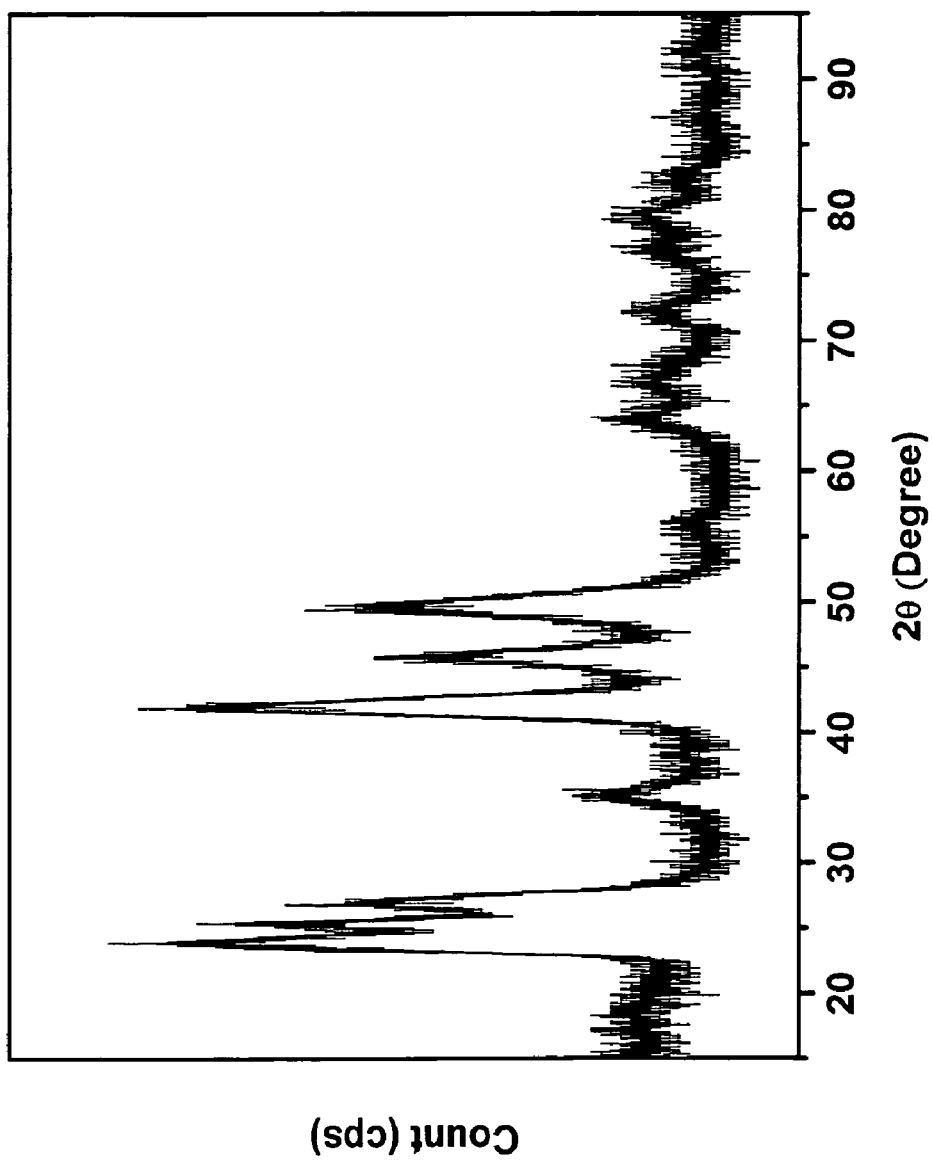
FIG. 18C is a graph showing XRD analysis of exemplary CdSe nanocrystals according to this invention.

TEM, XRD and ultraviolet-vis spectroscopy are conducted to characterize the obtained CdSe nanocrystals. FIG. 18A shows ultraviolet-vis spectroscopy analysis of CdSe nanocrystals obtained as described above. FIG. 18A demonstrates that oleic acid and TMPPA are efficient ripening and nucleating agents in ionic liquids and that the size of nanocrystals can be tuned by changing amounts of oleic acid and TMPPA. TMPPA improves the size distribution of the nanocrystals in comparison with oleic acid. FIG. 18B is a TEM micrograph of CdSe nanocrystals obtained as described in section C above. TEM observation reveals that the nanocrystals have an average size of approximately 6 nm, consistent with the observed absorbance peak at 624 nm (see FIG. 18A). This result is consistent with the reported relationship between particle size obtained from TEM and ultraviolet-vis absorption. FIG. 18C shows XRD analysis of CdSe nanocrystals obtained as described in section C above. XRD analysis shows that the nanocrystals have Wurtzite structure.

Figure 18D:
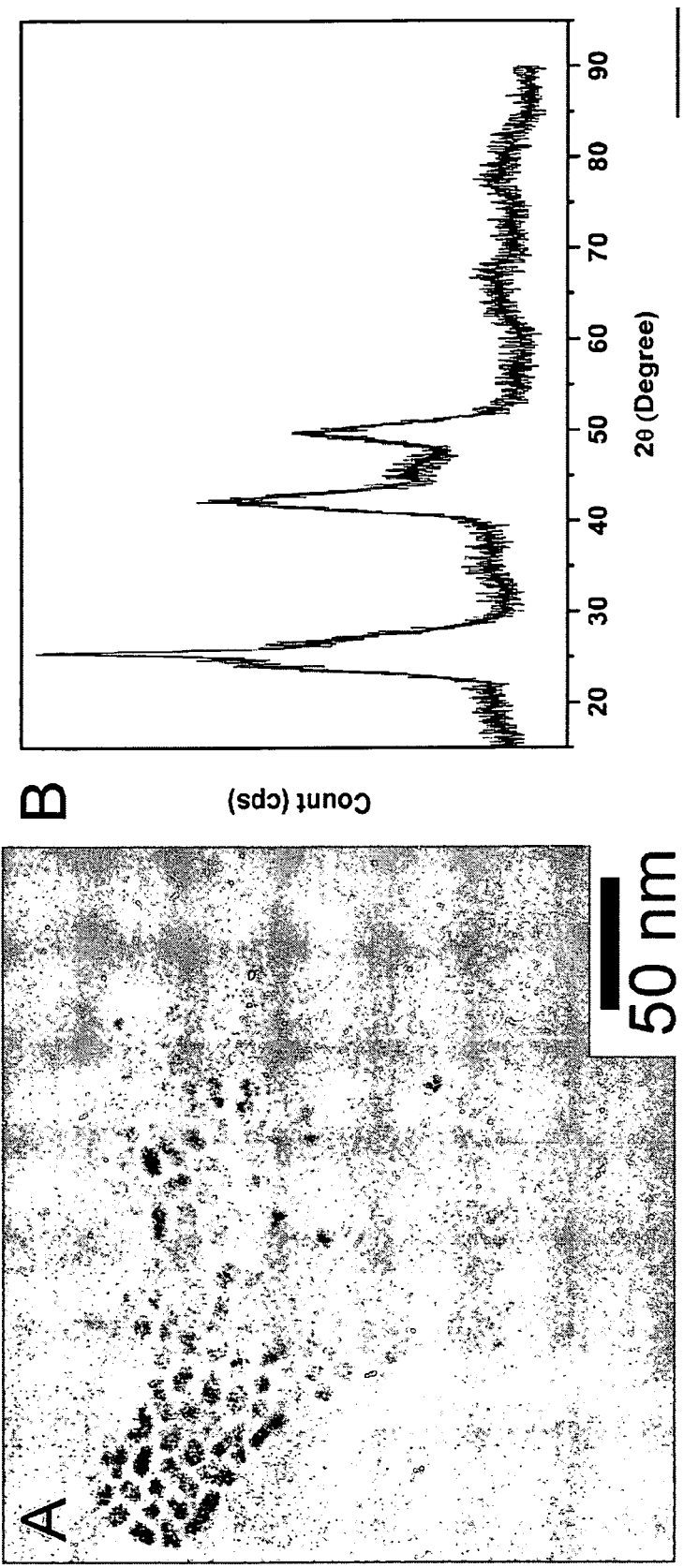
FIG. 18D includes a TEM micrograph and a graph showing XRD analysis of CdSe short nanorods according to this invention.

FIG. 18D shows a TEM micrograph and XRD analysis of CdSe nanorods obtained as described in section D above. The nanorods have an average diameter of 6 nm and an aspect ratio of approximately 5. The nanorods have a zinc-blend structure. The first absorbance peak for the nanorods appears at about 650 nm (see FIG. 18A).

Example 20

Synthesis of Silver Nanoparticles 3 mL freshly dried colorless [BMIM][Tf2N] is mixed with 160 mL 99.99% oleic acid (Aldrich) and 20 mg (or 40 mg) 99.99% silver trifluoroacetate (Aldrich) in a 15 mL three-neck flask. The mixture is heated with a heating mantle under argon protection and stirred vigorously with a magnetic stirrer. The temperature of the reaction mixture is raised from room temperature to a reaction temperature of 160° C. (or 200° C.) over 90 minutes. The color of the reaction mixture turns brown the temperature reaches 150° C. The reaction temperature is maintained for 40 minutes, and the reaction is terminated by removing the heating source. The ionic liquid in the reaction vessel is collected using a pipette. The reaction product, in the form of a brownish solid on the flask wall, is extracted by washing with 6 mL hexane.

Figure 19A:
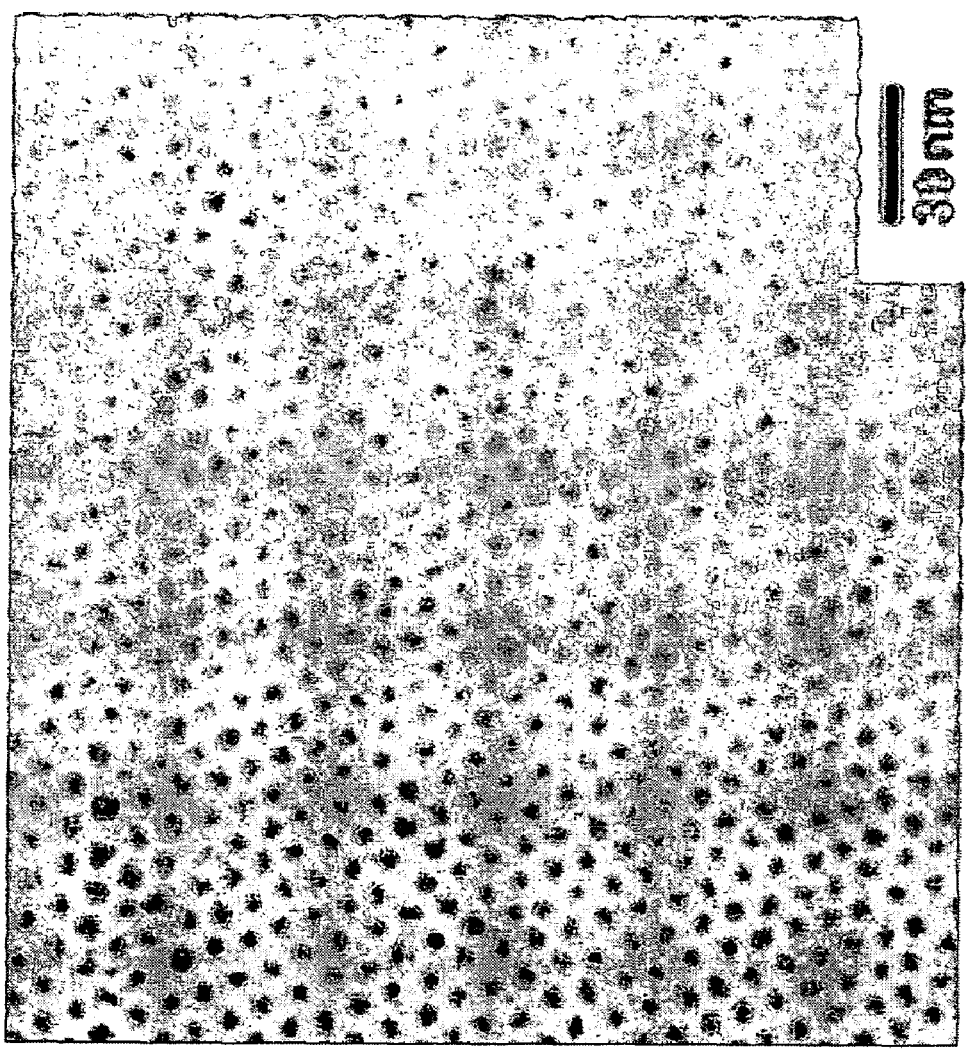
FIG. 19A is a TEM micrograph of exemplary silver nanoparticles according to this invention.

The reaction including 20 mg of silver trifluoroacetate conducted at 200° C. provided silver nanoparticles having an average diameter of 4.5±0.4 nm and provided a yield of 69.9% based on silver. The reaction including 40 mg of silver trifluoroacetate conducted at 200° C. provided silver nanoparticles having an average diameter of 5.01±0.7 nm and provided a yield of 53.9% based on silver. The reaction including 20 mg of silver trifluoroacetate conducted at 160° C. provided silver nanoparticles having an average diameter of 4.1±0.5 nm and provided a yield of 21.2% based on silver. The reaction including 40 mg of silver trifluoroacetate conducted at 160° C. provided silver nanoparticles having an average diameter of 6.1±0.8 nm and provided a yield of 17.7% based on silver. FIG. 19A is a TEM micrograph of silver nanoparticles obtained from the reaction of 20 mg of silver trifluoroacetate conducted at 200° C. The micrograph shows nanoparticles in an ordered hexagonal configuration, which suggests monodispersity in size and excellent solvent dispersity.

Figure 19B:
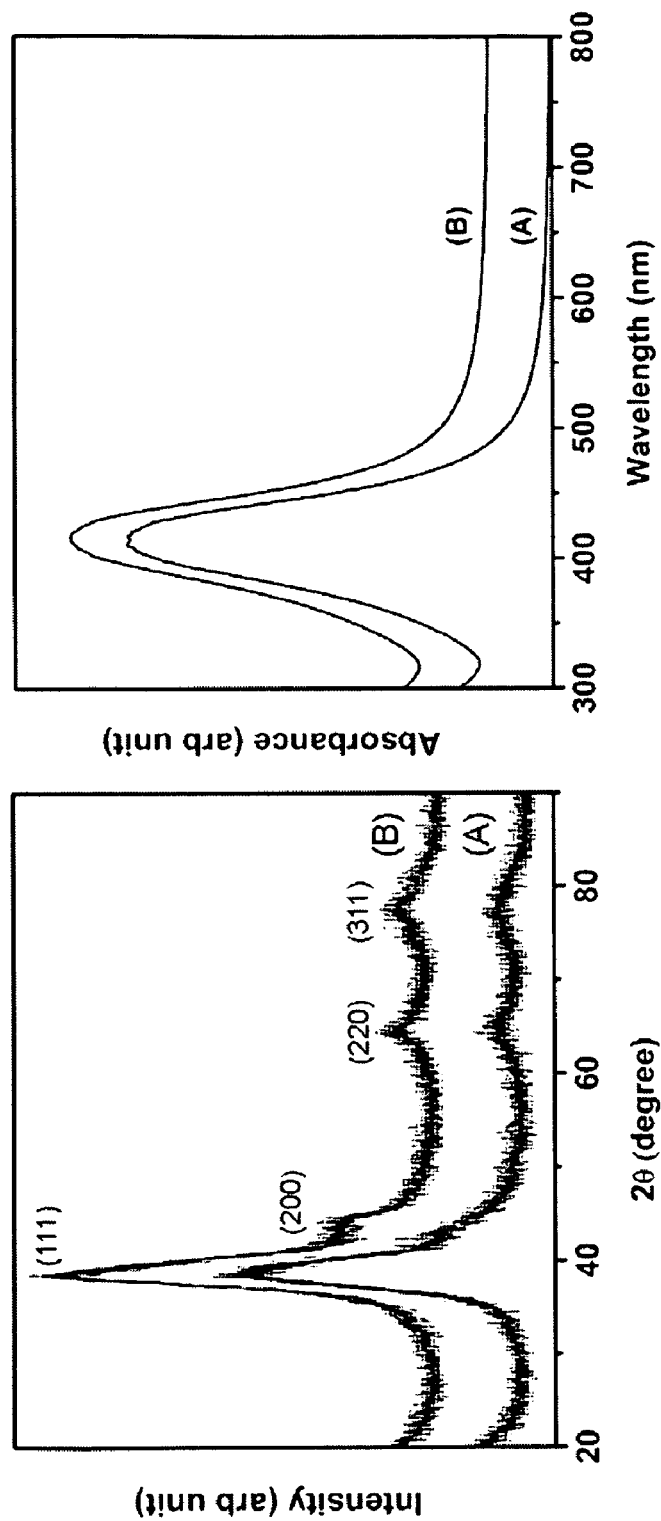
FIG. 19B includes a graph showing XRD analysis and a graph showing ultraviolet-vis spectroscopy analysis of exemplary silver nanoparticles according to this invention.
Figure 19C:
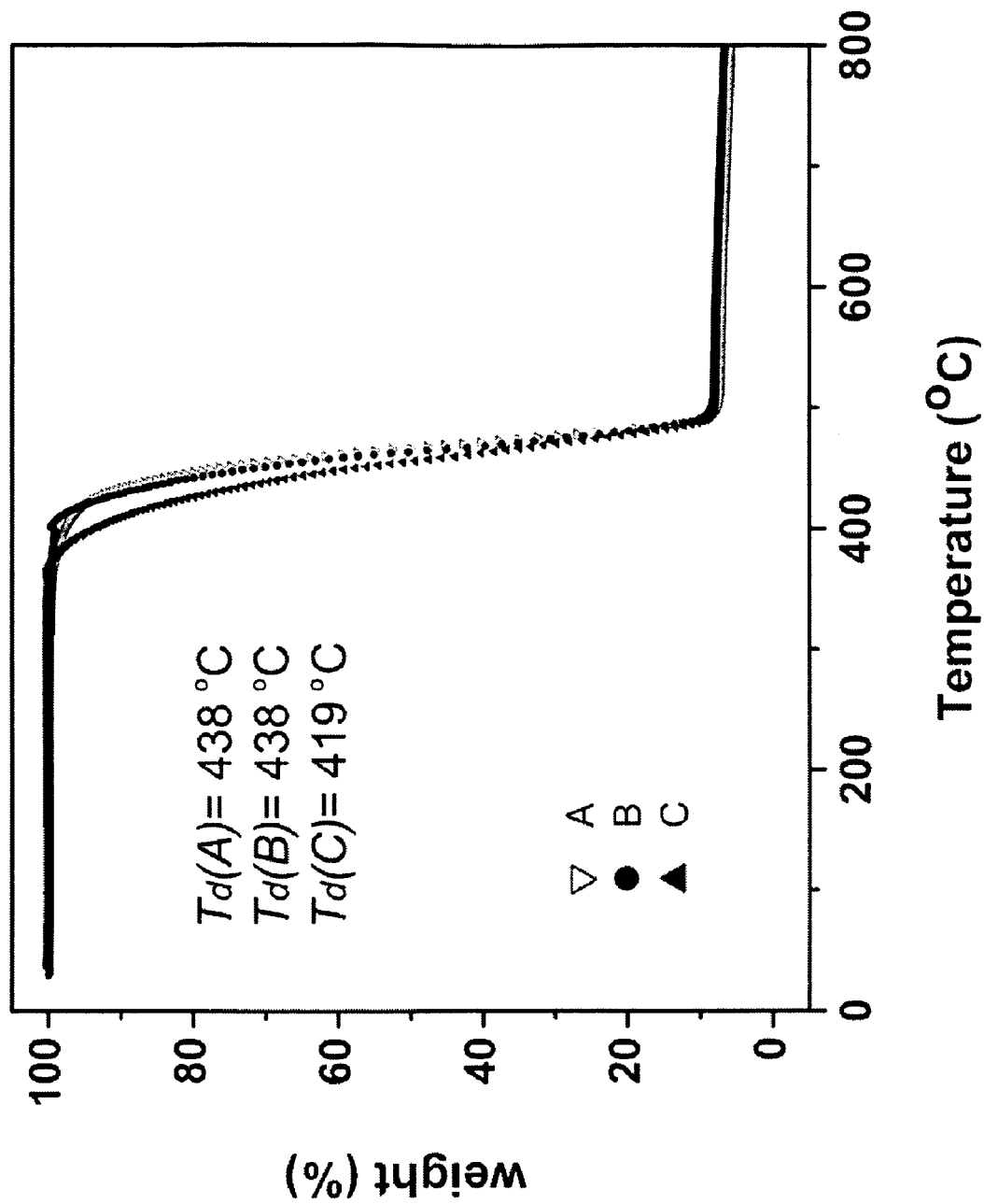
FIG. 19C is a graph showing TGA data for fresh ionic liquid, ionic liquid after a reaction to obtain silver nanoparticles according to this invention employing a fatty acid capping agent, and ionic liquid after a reaction to obtain silver nanoparticles according to this invention not employing a fatty acid.

FIG. 19B shows XRD analysis and ultraviolet-vis spectroscopy analysis of silver nanoparticles obtained from the reaction of 20 mg and 40 mg of silver trifluoroacetate conducted at 200° C. The two samples have similar X-ray diffraction patterns, which can be assigned to metal silver in Fm3m space group. The nanoparticles show maximum absorbance centered at 416 nm and full width at half maximum of about 84 nm. FIG. 19C shows TGA data for new [BMIM][Tf2N] (trace A), [BMIM][Tf2N] obtained at the conclusion of a reaction employing a fatty acid capping agent (trace B), and [BMIM][Tf2N] obtained at the conclusion of a reaction not employing a fatty acid capping agent (trace B). The TGA data shows that the used [BMIM][Tf$_2$N] retains its thermal stability after being used in the above-described reaction.

Example 21

Synthesis of Platinum Nanoparticles 5 mL freshly dried [BMIM][Tf$_2$N] is mixed with 25 mg Pt(acac)$_2$ (Gelest), 40 mL 99.99% oleic acid (Aldrich), 43 mL 70% oleylamine (Aldrich) and 98 mg 90% 1,2-hexandecandiol (Aldrich) in a 15 mL three-neck flask. The mixture is heated with a heating mantle under argon protection and stirred vigorously with a magnetic stirrer. The mixture turns transparent bright yellowish after 1,2-hexandecandiol and Pt(acac)$_2$ dissolve at 75° C. The mixture turns brown when the reaction temperature reaches 200° C. and becomes dark black when reaction temperature reaches ° C. The reaction temperature is maintained for one hour, and the reaction is terminated by removing the heating source. The ionic liquid in the reaction vessel is collected using a pipette. The reaction product, in the form of a solid on the flask wall, is extracted by washing with 6 mL hexane.

Figure 20:
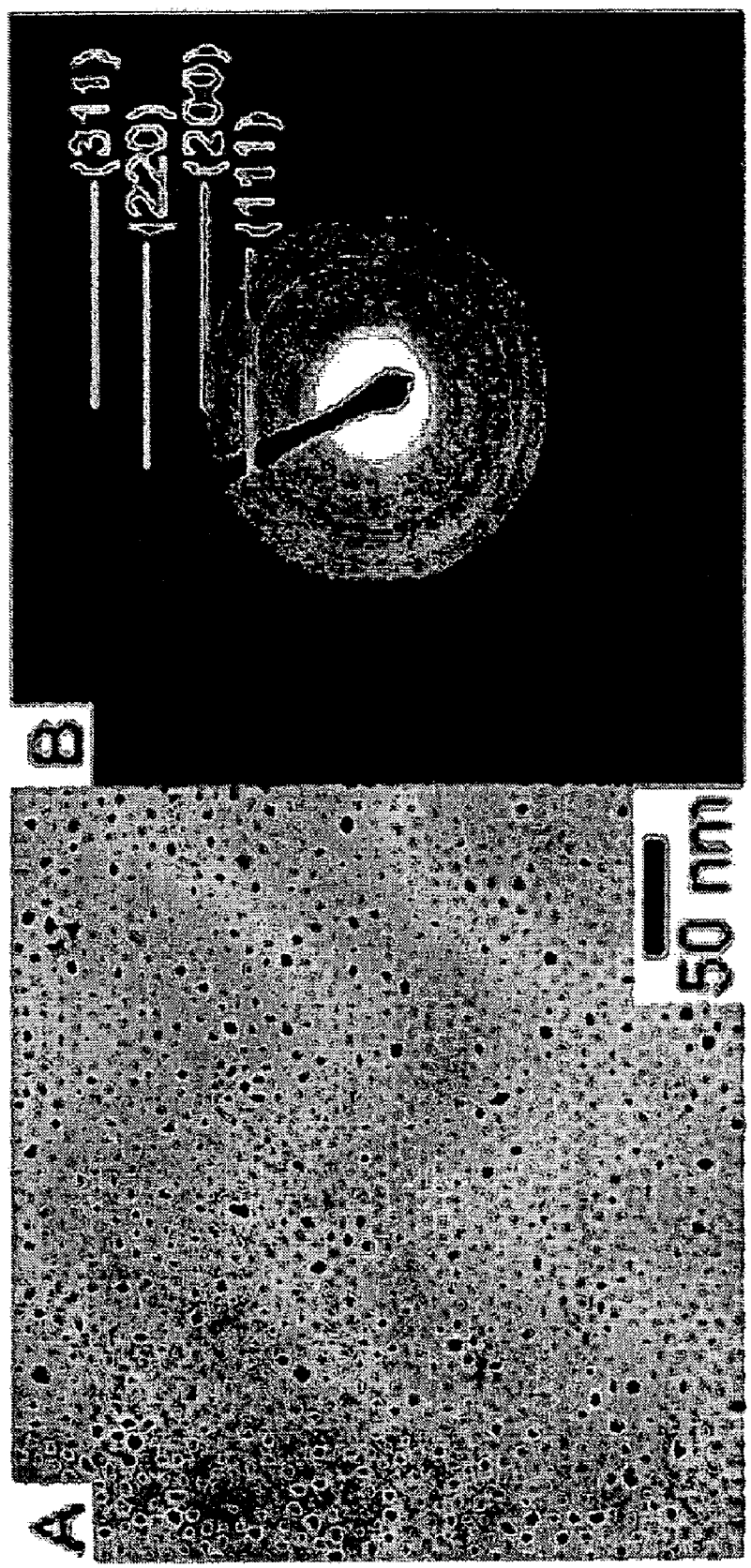
FIG. 20 includes a TEM micrograph and a graph showing SAED analysis of exemplary platinum nanoparticles according to this invention.

FIG. 20 shows a TEM micrograph and SAED (selected area electron diffraction) analysis of platinum nanoparticles nanorods in the reaction described above. The platinum nanoparticles have an average diameter of 4.5±0.8 nm. The SAED analysis reveals that the nanoparticles are face-centered platinum metal (Fm3m).

While this invention has been described in conjunction with the exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later developed alternatives, modifications, variations, improvements and/or substantial equivalents.

What is claimed is:

1. A method of synthesizing nanoparticles formed of a material selected from the group consisting of metals, alloys, and intermetallics, comprising:
   combining at least one stabilizing agent, at least one precursor and an ionic liquid to form a reaction mixture;
   heating the reaction mixture to a first predetermined temperature to form the nanoparticles;
   heating the reaction mixture to a second predetermined temperature to cause the nanoparticles to separate from the ionic liquid;
   collecting the nanoparticles from the reaction mixture; and
   reusing the separated ionic liquid.

2. The method of claim 1, wherein reusing the separated ionic liquid comprises purifying the separated ionic liquid.

3. The method of claim 2, wherein purifying the separated ionic liquid comprises passing the separated ionic liquid through a filter paper or a column comprising at least one of an alumina gel and a silica gel.

4. The method of claim 1, wherein reusing the separated ionic liquid comprises using the separated ionic liquid to form further nanoparticles.

5. The method of claim 4, wherein using the separated ionic liquid to form further nanoparticles comprises using the separated ionic liquid in at least two subsequent nanoparticle syntheses.

6. The method of claim 1, wherein the method is repeated at least once.

* * * * *